United States Patent
Naganuma et al.

(10) Patent No.: US 8,694,727 B2
(45) Date of Patent: Apr. 8, 2014

(54) FIRST STORAGE CONTROL APPARATUS AND STORAGE SYSTEM MANAGEMENT METHOD

(75) Inventors: Yuki Naganuma, Yokohama (JP); Hirokazu Ikeda, Yamato (JP); Wataru Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 13/203,366

(22) PCT Filed: Aug. 1, 2011

(86) PCT No.: PCT/JP2011/004355
§ 371 (c)(1),
(2), (4) Date: Aug. 25, 2011

(87) PCT Pub. No.: WO2013/018128
PCT Pub. Date: Feb. 7, 2013

(65) Prior Publication Data
US 2013/0036266 A1 Feb. 7, 2013

(51) Int. Cl.
*G06F 12/00* (2006.01)
*G06F 12/02* (2006.01)
(52) U.S. Cl.
USPC ........... 711/117; 711/114; 711/162; 711/170; 711/E12.002
(58) Field of Classification Search
USPC .................. 711/117, 114, 162, 170, E12.002
See application file for complete search history.

(56) References Cited

U.S. PATENT DOCUMENTS

| 7,051,121 B2 | 5/2006 | Ohno et al. |
| 2009/0235269 A1* | 9/2009 | Nakajima et al. ............. 718/104 |
| 2009/0300285 A1 | 12/2009 | Nagai et al. |

FOREIGN PATENT DOCUMENTS

| EP | 2 348 395 A2 | 7/2011 |
| JP | 2004-005370 | 1/2004 |
| JP | 2007-066259 | 3/2007 |
| WO | WO 2010/095176 A1 | 8/2010 |

OTHER PUBLICATIONS

PCT International Search Report and Written Opinion on application PCT/JP2011/004355 mailed Apr. 23, 2012; 4 pages.

* cited by examiner

*Primary Examiner* — Yong Choe
(74) *Attorney, Agent, or Firm* — Foley & Lardner LLP

(57) ABSTRACT

An object of the present invention is to allocate a volume to an appropriate tier in a pool in accordance with the performance of the volume. Multiple tiers 1K are created in a pool 1B. A pool volume that matches the performance required by a tier is allocated to each tier. An information acquisition part 1D acquires information related to respective storage apparatuses 1, 2, and information related to the performance of each volume. A tier control part 1E allocates a pool volume to any tier of the respective tiers, based on the performance information.

14 Claims, 45 Drawing Sheets

| Volume management table | | | | | | |
|---|---|---|---|---|---|---|
| C100 | C101 | C102 | C103 | C104 | C105 | C106 |
| VOL ID | Capacity | Storage ID | Drive type | RAID level | Status | Potential IOPS |
| VOL1 | 600 GB | Internal | SSD | 5 (3D+1P) | Normal | 3000 |
| VOL2 | 1.8 TB | Internal | SAS | 6 (6D+2P) | Normal | 600 |
| VOL3 | 1.2 TB | Internal | SATA | 1 (3D+3D) | Normal | 150 |
| ... | ... | ... | ... | ... | ... | ... |
| VOL11 | 600GB | Storage2 | SSD | 5 (3D+1P) | Normal | - |
| ... | ... | ... | ... | ... | ... | ... |

Fig. 10

Pool management table — T13

| Pool ID | Pool Volume | Tier | Page ID | Start LBA | End LBA | IOPS |
|---|---|---|---|---|---|---|
| Pool1 | VOL1 | Tier1 | 0000 | 0 | 999 | 100 |
| | | | 0001 | 1000 | 1999 | 0 |
| | | | ... | ... | ... | ... |
| | VOL2 | Tier2 | 0100 | 0 | 999 | 10 |
| | | | 0101 | 1000 | 1999 | 0 |
| | | | ... | ... | ... | ... |
| ... | ... | ... | ... | ... | ... | ... |

Virtual volume management table — T14

| Virtual VOL ID | Capacity | Start Virtual LBA | End Virtual LBA | Page ID |
|---|---|---|---|---|
| VVOL1 | 10 TB | 0 | 999 | 0001 |
| | | 1000 | 1999 | NULL |
| | | 2000 | 2999 | 0100 |
| | | ... | ... | ... |
| VVOL2 | 5 TB | ... | ... | ... |
| ... | ... | ... | ... | ... |

Tier decision policy T15A

| C150A \ | Internal | Second storage performance | | | |
|---|---|---|---|---|---|
| | | High | Middle | Low | Unknown |
| Drive type — SSD | 1 | 2 | 3 | 4 | 7 |
| SAS | 2 | 3 | 4 | 5 | 7 |
| SATA | 3 | 4 | 5 | 6 | 7 |
| Unknown | 7 | 7 | 7 | 7 | 7 |

C151A is the "Internal" column; C152A is the "Second storage performance" column group.

Fig. 13

Tier decision policy T15B

| Tier (C150B) | Potential IOPS (C151B) |
|---|---|
| Tier1 | Equal to or larger than 1000 |
| Tier2 | Equal to or larger than 500 |
| Tier3 | Less than 500 |

Fig. 30

Volume management table T40

| VOL ID | Capacity | Storage ID | Drive type | RAID level | Status | Potential IOPS | Utilization status |
|---|---|---|---|---|---|---|---|
| VOL1 | 600 GB | Storage1 | SSD | 5 (3D+1P) | Normal | 3000 | Unused |
| VOL21 | 1.8 TB | Storage2 | SATA | 6 (6D+2P) | Normal | 150 | Unused |
| VOL22 | 600 GB | Storage2 | SSD | 5 (3D+1P) | Normal | 3000 | Unused |
| ... | ... | ... | ... | ... | ... | ... | ... |

Externally coupled volume management table T41

| VOL ID (C410) | Storage ID (C411) | External storage ID (C412) | Substantial VOL ID (C413) | Potential IOPS (C414) | Path (C415) | Usable bandwidth (C416) | Number of hops (C417) |
|---|---|---|---|---|---|---|---|
| VOL2 | Storage1 | Storage2 | VOL22 | 900 | Port1-Port51-Port22 | 900 | 1 |
| VOL3 | Storage1 | Storage2 | VOL21 | 150 | Port2-Port21 | 400 | 1 |
| ... | ... | ... | ... | ... | ... | ... | ... |

Port management table

| Port ID | Device ID | Processing performance IOPS | Maximum IOPS | Performance capacity IOPS |
|---|---|---|---|---|
| Port1 | Storage1 | 3000 | 1300 | 1700 |
| Port2 | Storage1 | 3000 | 1000 | 2000 |
| Port21 | Storage2 | 2500 | 1000 | 1500 |
| Port22 | Storage2 | 2500 | 1600 | 900 |
| Port51 | Switch1 | 1000 | 600 | 400 |
| ... | ... | ... | ... | ... |

Tier definition table T46

| Storage ID | Capacity | Tier | Internal / External | Drive type | RAID level | Status | Potential IOPS | Number of hops |
|---|---|---|---|---|---|---|---|---|
| C460 | C461 | C462 | C463 | C464 | C465 | C466 | C467 | C468 |
| Storage1 | 600 GB | Tier1 | Internal | SSD | 5 (3D+1P) | Normal | 3000 | - |
| Storage2 | 600 GB | Tier2 | External | SSD | 6 (6D+2P) | Normal | 900 | 0 |
| Storage2 | 1.2 TB | Tier3 | External | SAS | 5 (3D+1P) | Normal | 150 | 1 |
| ... | ... | ... | ... | ... | ... | ... | ... | ... |

Fig. 38

Edit Tier of Volume

Volume Information : Vol5

G20

GP21

| Capacity | Internal / External | Drive Type | RAID Level | Status | Potential IOPS | Number of hops |
|---|---|---|---|---|---|---|
| 1.2TB | External | SAS | 5(3D+1P) | Normal | 150 | 1 |

Tier

| Tier1 ▼ |
|---|
| Tier2 |
| ... |

GP22

[ OK ]  [ Cancel ]

Fig. 39

Volume Information — G30

| Check | VOL ID | Capacity | Internal / External | Drive Type | RAID Level | Status | Potential IOPS | Number of hops | Proposal |
|---|---|---|---|---|---|---|---|---|---|
| ☑ | VOL5 | 1.2 TB | External | SAS | 5 (3D+1P) | Normal | 150 | 1 | Teir2 |
| ... | ... | ... | ... | ... | ... | ... | ... | ... | ... |

GP31

Registration-destination tier:
- Tier1
- Tier2
- ...

GP32

[ OK ]  [ Cancel ]

Fig. 41

| Pool ID (C470) | Storage ID (C471) | Total capacity (C472) | | | Used capacity (C473) | | | Threshold (C474) |
|---|---|---|---|---|---|---|---|---|
| | | Tier1 | Tier2 | Tier3 | Tier1 | Tier2 | Tier3 | |
| Pool1 | Storage1 | 1 TB | 5 TB | 10 TB | 900 GB | 4 TB | 3 TB | 80% |
| ... | ... | ... | ... | ... | ... | ... | ... | ... |

Pool capacity management table (T47)

Fig. 45

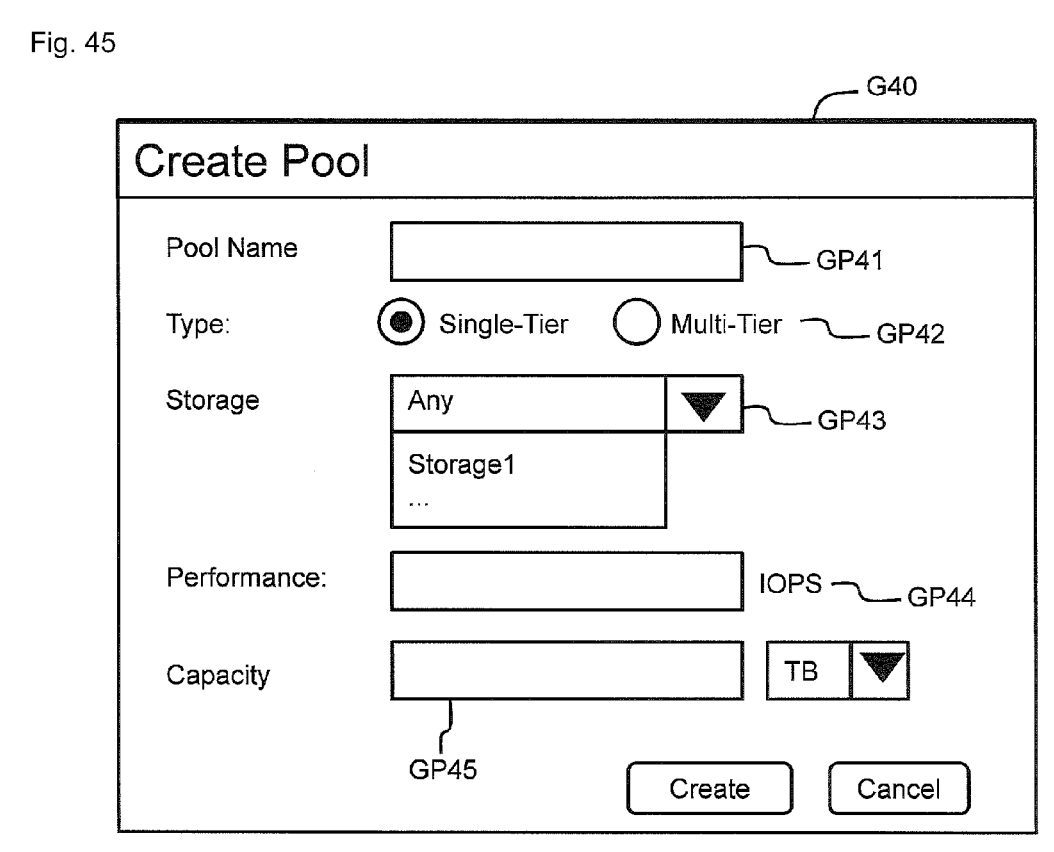

Create Pool — G40

| Pool Name | [                    ] — GP41 |
| Type: | ● Single-Tier   ○ Multi-Tier — GP42 |
| Storage | [ Any ▼ ] — GP43 <br> [ Storage1 <br> ... ] |
| Performance: | [                    ] IOPS — GP44 |
| Capacity | [         GP45        ] [ TB ▼ ] |

[ Create ]  [ Cancel ]

Fig. 49

Tier definition table (T46A)

| VOL ID (C469) | Storage ID (C460) | Capacity (C461) | Tier (C462) | Internal / External (C463) | Drive type (C464) | RAID level (C465) | Status (C466) | Potential IOPS (C467) |
|---|---|---|---|---|---|---|---|---|
| VOL1 | Storage1 | 600 GB | Tier1 | Internal | SSD | 5 (3D+1P) | Normal | 3000 |
| VOL2 | Storage1 | 1.8 TB | Tier3 | Internal | SAS | 5 (3D+1P) | Normal | 600 |
| VOL3 | Storage1 | 600 GB | Tier2 | External | SSD | 6 (6D+2P) | Normal | 900 |
| VOL4 | Storage1 | 1.2 TB | Tier3 | External | SAS | 5 (3D+1P) | Normal | 150 |
| ... | ... | ... | ... | ... | ... | ... | ... | ... |

Fig. 50

Select Merged Pool — G50

| Merge destination | | Merge source | | Post-merger pool | | | |
|---|---|---|---|---|---|---|---|
| Pool ID | Storage ID | Pool ID | Storage ID | Capacity | Performance | Stoarge ID | Cache Size |
| ● Pool A | Storage1 | Pool B | Storage2 | 4.2TB | 4650 IOPS | Storage1 | 2TB |
| ○ Pool B | Storage2 | Pool A | Storage1 | 4.2TB | 4000 IOPS | Storage2 | 1TB |

[Merge] [Cancel]

FIRST STORAGE CONTROL APPARATUS AND STORAGE SYSTEM MANAGEMENT METHOD

TECHNICAL FIELD

The present invention relates to a first storage control apparatus and a storage system management method.

BACKGROUND ART

A technology called thin provisioning for dynamically allocating a virtual volume page from a pool, which is a collection of storage areas (pages), in accordance with a request from a host computer is known. This pool is a collection of one or more logical volumes. One page is one storage area obtained by partitioning the logical volume comprising the pool into an arbitrary size. In thin provisioning technology, pool storage areas can be used effectively because an in-pool storage area is allocated only with respect to the portion accessed by the host computer. In a first prior art, multiple types of storage areas (pages) featuring different performance are mixed together in the pool, and a page is sorted by tier based on a performance or other such prescribed criteria. In the first prior art, an appropriate tier is selected in accordance with the characteristics of a virtual volume, and a page belonging to the selected tier is allocated to the virtual volume (Patent Literature 1). This makes it possible in the first prior art to make proper use of a high-performance, high-cost storage area and a low-performance, low-cost storage area, enabling the realization of a virtual volume that reconciles performance and cost.

In addition, as a second prior art, a technology for making it appear as though a logical volume of a second storage control apparatus, which exists outside of a first storage control apparatus, has been incorporated in the first storage control apparatus and is the same as a logical volume unique to the first storage control apparatus is known (Patent Literature 2).

CITATION LIST

Patent Literature

PTL 1: Japan Patent Application Laid-open No. 2007-066259
PTL 2: U.S. Pat. No. 7,051,121 B2

SUMMARY OF INVENTION

Technical Problem

It is also possible to use a logical volume of a second storage control apparatus as a pool volume, which is registered in a pool of the first storage control apparatus. However, the performance of each pool volume must be known in order to appropriately control the tiers in the pool.

However, in the prior art, it is difficult for the first storage control apparatus to correctly know the performance of a logical volume that exists externally, and it is impossible for the first storage control apparatus to decide the appropriate tier to which the external logical volume should belong. There are also cases in which the second storage control apparatus is provided from a different vendor than the first storage control apparatus, and it is not always possible to acquire all the information required to make a determination as to the performance of the second storage control apparatus. In addition, there are all sorts of different models of storage control apparatuses and different types of storage devices in the storage control apparatus. Additionally, the state of the communication path between the first storage control apparatus and the second storage control apparatus, which is used to utilize the logical volume of the second storage apparatus as a first storage control apparatus logical volume, also has an effect.

In a case where a relatively high-performance logical volume is allocated to a low-level tier, or a relatively low-performance logical volume is allocated to a high level tier, it becomes impossible to maintain the anticipated pool performance, raising the possibility that pool reliability could also drop. Therefore, in a case where an external logical volume is used in the prior art, it is not possible to obtain the advantages of the first prior art-disclosed pool technology that efficiently creates a virtual volume that is compatible from the standpoints of performance and cost.

With the foregoing problems in view, an object of the present invention is to provide a first storage control apparatus and a storage system management method that make it possible to assess the performance of a logical volume that exists outside of the first storage control apparatus, and to associate this logical volume with an appropriate tier of the multiple tiers in a pool.

Solution to Problem

To solve for the above-mentioned problems, a first storage control apparatus according to the present invention is communicatably coupled via a communication path to at least one second storage control apparatus, and comprises a pool, which is divided into multiple different tiers, and has at least one pool volume disposed in each tier, a virtual volume, which is created based on the pool, a command processing part, which processes a command with respect to the virtual volume, an information acquisition part, which acquires prescribed performance information related to the performance of the pool volume, and a tier control part, which decides the tier to which a pool volume is to be associated based on the acquired prescribed performance information.

At least one pool volume of the respective pool volumes may be associated with a logical volume in the second storage control apparatus via the communication path, and the command processing part may convert a command corresponding to a logical volume in the second storage control apparatus from among the commands for the virtual volume to a second storage control apparatus command, and send this converted command to the second storage control apparatus, and the information acquisition part may acquire, as the prescribed performance information, information related to the logical volume in the second storage control apparatus and information related to the performance of the second storage control apparatus.

The tier control part, based on the prescribed performance information and a preset policy, may decide the logical volume of the second storage control apparatus, which is associated with the first storage control apparatus logical volume, belong to any tier of the respective tiers in the pool.

The tier control part, in a case where there is unknown information with respect to the prescribed performance information, may comprise an inference part for inferring the unknown information.

The inference part may send a read command for prepared testing to the second storage control apparatus, and infer the unknown information based on the response time of the second storage control apparatus.

The tier control part, in either a case where there is unknown information, or a case where the unknown information cannot be inferred, can also cause the pool volume associated with the logical volume of the second storage control apparatus to belong to the tier with the lowest performance of the respective tiers.

The first storage control apparatus further comprises a data migration part for migrating data stored in the virtual volume between respective tiers, and a virtual data storage area to which the data is written from among the virtual data storage areas in the virtual volume is associated with a real storage area of a pool volume in any tier of the respective tiers, and the data migration part may change the real storage area associated with the virtual data storage area between tiers in accordance with the utilization status of the virtual data storage area.

In a case where the data migration part changes the association-destination of the virtual data storage area from a migration-source real storage area to a migration-destination real storage area in a higher-level tier, the data migration part compares the performance of the migration-source pool volume in which the migration-source real storage area resides to the performance of the migration-destination pool volume in which the migration-destination real storage area resides, and in a case where it has been determined that the performance of the migration-destination pool volume is higher than the migration-source pool volume, can also change the association destination of the virtual data storage area from the migration-source storage area to the migration-destination storage area.

The tier control part may exercise control so as to monitor a performance drop in each pool volume, and either cause the pool volume for which a drop in performance was detected among the respective pool volumes to belong to the tier with the lowest performance of the respective tiers, or not use this degraded-performance pool volume as the migration-destination pool volume of the data.

The tier control part, in a case where a pool volume performance drop has been eliminated, may exercise control so as to return the pool volume to its original tier from the lowest-performance tier.

The characteristic features of the present invention described above can be combined in ways other than those stated. In addition, the present invention can also be understood as a computer program. The computer program will be installed in the computer via either a communication medium or a recording medium.

BRIEF DESCRIPTION OF DRAWINGS

FIG. 10 is a block diagram of a table for managing a pool.

FIG. 11 is a block diagram of a table for managing a virtual volume.

FIG. 12 is an example of a policy for deciding a tier.

FIG. 13 is an example of another policy for deciding a tier.

FIG. 30 is a block diagram of a table for managing a volume.

FIG. 31 is a block diagram of a table for managing an externally coupled volume.

FIG. 32 is a block diagram of a table for managing a port.

FIG. 37 is a block diagram of a table for defining a tier.

FIG. 38 is a screen in a case where the destination tier of a pool volume changes.

FIG. 39 is a screen for proposing to a user a pool volume to be allocated to a tier.

FIG. 41 is a block diagram of a table for managing a pool capacity.

FIG. 45 is a screen in a case where a pool is to be created.

FIG. 49 is a block diagram of a table for defining a tier.

FIG. 50 is a screen in a case where pools are to be merged.

DESCRIPTION OF EMBODIMENT

An embodiment of the present invention will be explained below by referring to the attached drawings. In this embodiment, as will be explained further below, the performance of a pool volume registered in a pool can be appropriately assessed. In addition, in this embodiment, a pool volume can be allocated to a tier in accordance with the performance of this pool volume. This makes it possible in this embodiment to create and operate a pool without lowering the performance and reliability thereof. Furthermore, the configuration shown in FIG. 1 is an overview of this embodiment, but the scope of the present invention is not limited to the configuration shown in FIG. 1.

Figure 1:
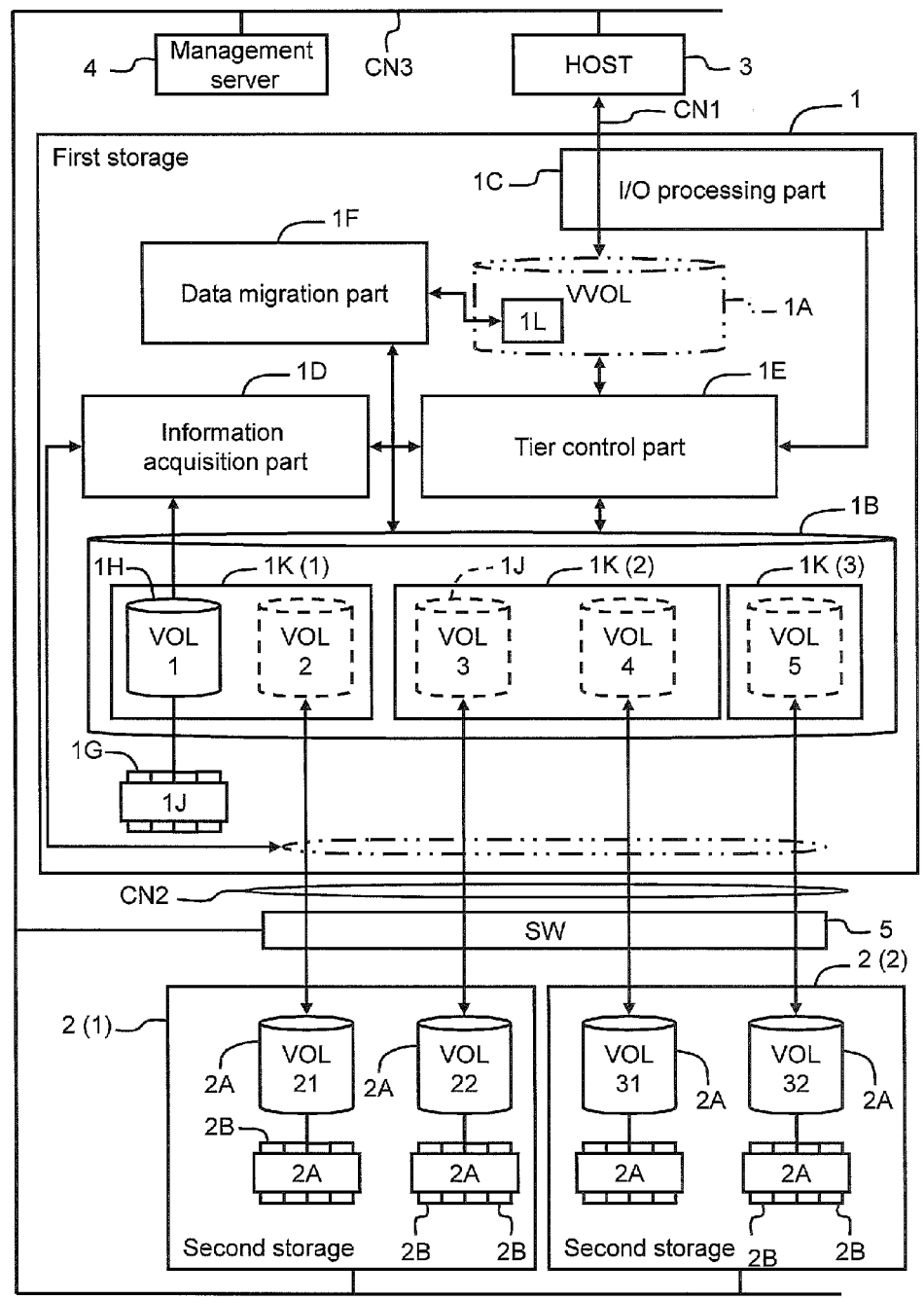
FIG. 1 is an illustration showing an overall concept of this embodiment.

As shown in FIG. 1, a computer system comprising a storage system, for example, can comprise a first storage apparatus 1, a second storage apparatus 2, a host computer (hereinafter abbreviated as host) 3, a management server 4, and a switching apparatus 5. The first storage apparatus 1 is equivalent to the "first storage control apparatus". The second storage apparatus 2 is equivalent to the "second storage control apparatus". The management server 4 is equivalent to the "management apparatus".

The first storage apparatus 1 and the host 3 are coupled via a first communication network CN1. The first storage apparatus 1 and the second storage apparatus 2 are coupled via a second communication network CN2 (and the switching apparatus 5). The management server 4 is coupled to the respective storage apparatuses 1 and 2, and the host 3 via a third communication network CN3.

The first communication network CN1 and the second communication network CN2, for example, are configured as communication networks such as an IP-SAN (Internet Protocol-Storage Area Network) or a FC-SAN (Fibre Channel-SAN). The third communication network CN3, for example, is configured as a communication network such as either the Internet or a LAN (Local Area Network). Furthermore, either all or multiple of any of the respective communication networks CN1, CN2, and CN3 may be integrated into a single communication network.

The first storage apparatus 1, for example, comprises a virtual volume 1A, a pool 1B, an I/O (Input/Output) processing part 1C, an information acquisition part 1D, a tier control part 1E, a data migration part 1F, and multiple storage devices 1G.

The virtual volume 1A is a logical volume that is created virtually, and can also be called a thin provisioning volume. Immediately after being created, only the volume size and access method of the virtual volume 1A are decided; the virtual volume 1A does not possess an entity for storing data.

When the host 3 accesses and attempts to write data to the virtual volume 1A, a real storage area in the pool 1B is allocated to this write-destination storage area (page) 1L. The data from the host 3 is transferred to the pool volume that comprises the allocated real storage area, and written to the storage device that comprises this pool volume. In so doing, the size of the real storage area allocated to the virtual volume 1A is dynamically changed in accordance with the access from the host 3, and only the real storage area that is needed is used. Therefore, it is possible to create a maximum capacity virtual volume 1A using the minimum real storage areas required.

The pool 1B provides the real storage area to the virtual volume 1A. The inside of the pool 1B is partitioned into multiple tiers 1K(1) through 1K(3). The tiers partition groups of real storage areas in the pool 1B by performance. For example, the high level tier 1K(1) is defined as the tier with the highest performance. The middle level tier 1K(2) is defined as the medium-performance tier. The low level tier 1K(3) is defined as the tier with the lowest performance. Furthermore, the number of tiers is limited to three. But there may be two tiers, or there may be four or more tiers.

At least one pool volume 1H, 1J is allocated to each tier of the pool 1B. The pool volume 1H is a logical volume created based on the storage device 1G in the first storage apparatus 1. Therefore, the pool volume 1H is called an internal volume.

The storage device 1G, for example, is configured from a hard disk drive. In the case of a hard disk drive, for example, a FC (Fibre Channel) disk, a SCSI (Small Computer System Interface) disk, a SATA (Serial Advanced Technology Attachment) disk, an ATA (AT Attachment) disk, or an SAS (Serial Attached SCSI) disk can be used.

The storage device 1G, for example, may be configured from a flash memory device, a FeRAM (Ferroelectric Random Access Memory), a MRAM (Magnetoresistive Random Access Memory), an Ovonic Unified Memory, or a RRAM (Resistance RAM, which is a registered trademark).

The pool volume 1J is a logical volume created based on a logical volume 2A in the second storage apparatus 2. The pool volume 1J exists virtually, and an entity for storing data does not exist in the first storage apparatus 1. The address space of the pool volume 1J is associated with the address space of the logical volume 2A in the second storage apparatus 2, and the actual data is written to the logical volume 2A. More specifically, write data targeted at the pool volume 1J is transferred from the first storage apparatus 1 to the second storage apparatus 2, and written to the respective storage devices 2B that configure the logical volume 2A.

From the standpoint of the first storage apparatus 1, the second storage apparatus 2 exists externally to the first storage apparatus 1, and as such, can be called the external storage apparatus. Therefore, the logical volume 2A in the second storage apparatus 2 can be called the external volume. The virtual pool volume 1J in the first storage apparatus 1 is a volume coupled to the external volume 2A, and as such can be called the externally coupled volume.

The I/O processing part 1C is equivalent to the "command processing part". The I/O processing part 1C inputs/outputs data to/from the virtual volume 1A in accordance with either a read command or a write command received from the host 3, and sends the result of the command processing to the host 3. The I/O processing part 1C, in a case where the host 3 writes data to an unused area in the virtual volume 1A, allocates a real storage area (a page) in the pool 1B to this unused area.

In addition, the I/O processing part 1C, in a case where the access-destination storage area (page) 1L for the virtual volume 1A is associated with the externally coupled volume 1J, creates a command for reading/writing data from/to the external volume 2A coupled to the externally coupled volume 1J. That is, the I/O processing part 1C converts the command received from the host 3 to a command for processing in the second storage apparatus 2. The I/O processing part 1C receives the processing result of the second storage apparatus 2, and reports the completion of command processing to the host 3.

The information acquisition part 1D acquires and manages prescribed performance information related to the performance of the pool volumes 1H and 1J. The prescribed performance information, for example, includes the type (for example, SSD or SAS) of storage device providing the physical storage area to the pool volume, and the configuration of the RAID (Redundant Arrays of Inexpensive Disks) group.

In addition, in a case where the pool volume is the externally coupled volume 1J, information related to the performance of the second storage apparatus 2 can also be included in the prescribed performance information. For example, the model name, model number, and basic specifications (size of the cache memory, number of ports, and so forth) of the second storage apparatus 2 can be cited as information related to the performance of the second storage apparatus 2. The information related to the performance of the second storage apparatus 2 is not limited to information specifically showing the performance values of the second storage apparatus 2, but rather may be information that enables the performance of the second storage apparatus 2 to be indirectly inferred. For example, knowing the model name can provide a rough idea of the performance.

In addition, in a case where the pool volume is the externally coupled volume 1J, the prescribed performance information can also include the status of the communication path coupling the first storage apparatus 1 and the second storage apparatus 2. For example, communication speed, communication bandwidth, communication capacity, and communication delay time can be given as communication path states.

The tier control part 1E controls the pool 1B. The tier control part 1E manages the configuration of the multiple tiers 1K(1) through 1K(3), which are formed in the pool 1B. The tier control part 1E decides which pool volume to allocate to which tier based on the performance of the pool volumes 1H and 1J, and a prescribed policy. The tier control part 1E allocates a high-performance pool volume to the high level tier 1K(1), allocates a medium-performance pool volume to the middle level tier 1K(2), and allocates a low-performance pool volume to the low level tier 1K(3).

In a case where the information acquisition part 1D was unable to acquire a portion of the pool volume performance information, that is, a case where there is unknown information with respect to the prescribed performance information, the tier control part 1E infers this unknown information. In a case where the pool volume is the externally coupled volume 1J, which is coupled to the external volume 2A of the second storage apparatus 2, there is the likelihood that this performance information can only be partially acquired. This is because the second storage apparatus 2 is a separate apparatus from the first storage apparatus 1, and the manufacturing date and vendor will often differ.

Consequently, the tier control part 1E comprises a function for inferring the unknown information. The tier control part 1E, for example, sends a preset read command for testing purposes to the second storage apparatus 2, and measures the response time of the second storage apparatus 2. Based on this response time measurement result, it is possible to infer the performance of the external volume 2A (that is, the performance of the externally coupled volume 1J) of the second storage apparatus 2.

As will be explained in more detail further below, the read command response time can be divided into two types. One of these is a cache hot response time. The other is a cache miss response time. The response time at cache hit depends greatly on the performance of the cache memory of the second storage apparatus 2. The response time at cache miss depends greatly on the data transmission speed of the storage device 2B of the second storage apparatus 2.

In addition, the response time at cache hit is shorter than at cache miss. This is because at cache miss, data is read from the storage device 2B and transferred to the cache memory in the second storage apparatus 2, and, in addition, the data must be sent from this cache memory to the first storage apparatus 1. Therefore, the response times of the second storage apparatus 2 are divided into a group having small values and a group having larger values.

The response time of the group of small values is the response time at cache hit, and depends on the performance of the second storage apparatus 2. The response time of the group of large values is the response time at cache miss, and also relates to the performance of the storage device 2B. There may be a case where there is only one response time group as a result of the second storage apparatus settings and the like. For example, there are cases where the second storage apparatus will process a command without using the cache. In this case, for example, the detected group may be handled as the cache miss response time. Furthermore, it is also possible to have a volume that is comprised solely of cache memory, in which case the response time is handled as volume performance. That is, the response time with respect to a volume that resides on a cache memory can be handled as a response time at cache miss.

Checking out the response time from the second storage apparatus 2 like this makes it possible to infer the performance of the external volume 2A of the second storage apparatus 2.

The tier control part 1E, in a case where there is a volume the performance of which cannot be discerned, can allocate this volume to the low level tier 1K(3). This is because, in a case where a volume of unknown performance is low performance, allocating this low-performance volume to the high level tier 1K(1) or the middle level tier 1K(2) could make it impossible to achieve the performance expected from the high level tier or the middle level tier. Consequently, in this embodiment, a volume of unknown performance is allocated to the low level tier 1K(3).

In this embodiment, since the pool 1B is divided into three tiers 1K(1) through 1K(3), the low level tier 1K(3) is also the lowest level tier. In a case where the pool 1B is partitioned into more numerous tiers, the volume of unknown performance may be allocated to the lowest level tier, or to another low-level tier besides the lowest level tier. For example, in a case where the pool is partitioned into five tiers, the unknown-performance tier may be allocated to the lowest level fifth tier, or to the fourth tier, which is one above the lowest level.

The data migration part 1F migrates a real storage area (hereinafter, may also be called the real page), which is allocated to the virtual volume 1A, between the respective tiers 1K(1) through 1K(3) in accordance with the utilization status of this data. For example, a real page, which stores high access frequency data, will be migrated to a tier having higher performance than the tier to which the real page currently belongs. A real page, which stores low access frequency data, will be migrated to a tier having lower performance than the tier to which the real page currently belongs.

More specifically, in a case where a real page is migrated from the tier to which it currently belongs to a higher level tier, the data migration part 1F copies the data of the target page from the migration-source pool volume that belongs to the current tier to the migration-destination pool volume that belongs to the higher level tier. In a case where a real page is migrated to a lower level tier than the tier to which it currently belongs, the data migration part 1F copies the data from the migration-source pool volume to the migration-destination pool volume the same as above.

When migrating the data of the real page to the pool volume of a higher level tier, the data migration part 1F compares the performance of the migration-source pool volume to the performance of the migration-destination pool volume. The data migration part 1F migrates the data of the real page in a case where the migration-destination pool volume is higher performance than the migration-source pool volume.

The second storage apparatus 2 will be explained. As described hereinabove, the second storage apparatus 2 is an external storage apparatus that exists outside of the first storage apparatus 1. The second storage apparatus 2 comprises multiple storage devices 2B, and a logical volume 2A created based on the physical storage areas of the storage devices 2B.

As described hereinabove, the logical volume 2A is an external volume as seen from the first storage apparatus 1. The external volume 2A is coupled to the externally coupled volume 1J in the first storage apparatus 1 by way of a communication path provided in the second communication network CN2.

In this embodiment, which is configured like this, the performance of the volume for providing a real storage area to the virtual volume 1A is assessed, and this volume is allocated to an appropriate tier of the respective tiers 1K(1) through 1K(3). Therefore, in this embodiment, the virtual volume 1A can be created at low cost without lowering pool performance.

In this embodiment, in a case where a portion of the performance information is unknown, this unknown information can be inferred. Therefore, for example, a drop in pool performance can be held in check even in a case where an external volume 2A in a second storage apparatus 2 manufactured by a different company is to be used as a pool volume.

In addition, in this embodiment, a read command for testing purposes is sent to the second storage apparatus 2, and the performance of the external volume 2A is inferred by measuring the response time thereto. Therefore, the performance of the external volume 2A can be inferred relatively simply, thereby enhancing usability.

In this embodiment, a volume for which the performance information is not known (could not be completely inferred despite the provision of an inference function) is allocated to the lowest level tier (or another lower level tier beside the lowest level tier). Therefore, the allocation of a low-performance volume to a higher level tier can be prevented, making it possible to prevent a drop in pool performance.

In this embodiment, only in a case where it has been confirmed that the migration-destination pool volume is higher performance than the migration-source pool volume is a real page migrated from its current tier to a higher level tier. Therefore, it is possible to prevent a real page from being migrated to a migration-destination pool volume of lower performance than its current pool volume. This makes it possible to curb the occurrence of a situation in which the response time of a migrated real page becomes slower despite the fact that this real page has been migrated to a higher level tier. This embodiment will be explained in detail below.

Example 1

A first example of the present invention will be explained by referring to FIGS. 2 through 23. First, the corresponding relationship with FIG. 1 will be explained. A first storage apparatus 10 corresponds to the first storage apparatus 1, a second storage apparatus 20 corresponds to the second storage apparatus 2, a host 30 corresponds to the host 3, a communication network CN10 corresponds to the communication network CN1, and a communication network CN20 corresponds to the communication network CN2. The configurations of the management server 4 and the management network CN3 do not appear in FIG. 1 since these configurations are used in another example, which will be explained further below.

Figure 2:
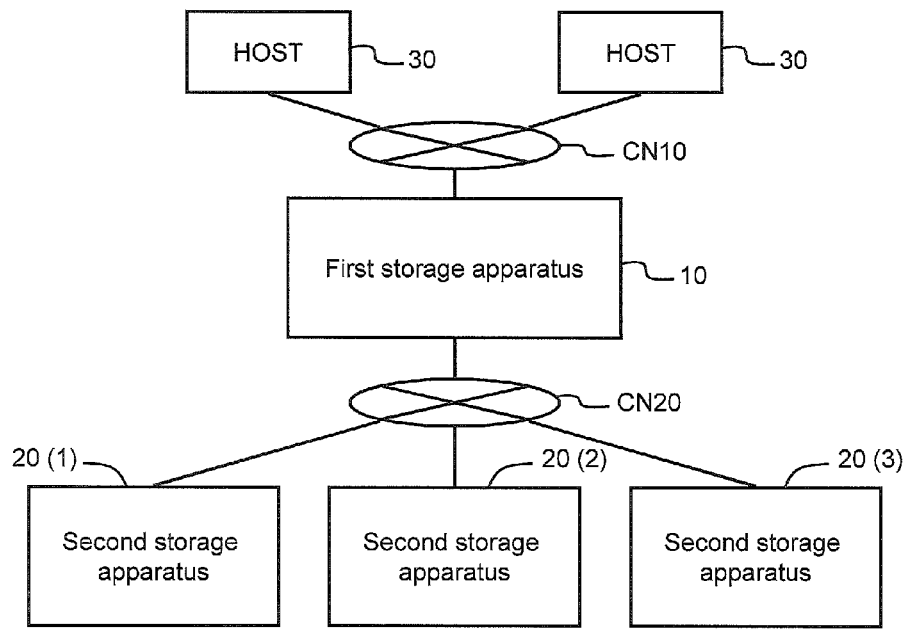
FIG. 2 is a diagram of an entire computer system comprising a storage system related to a first example.

FIG. 2 shows the overall configuration of a computer system comprising a storage system. The computer system, for example, comprises at least one first storage apparatus 10, one or multiple second storage apparatuses 20, and one or multiple hosts 30. Each host 30 is coupled to the first storage apparatus 10 via a first communication network CN10. The first storage apparatus 10 is coupled to the respective second storage apparatuses 20 via a second communication network CN20.

The host computer 30, for example, comprises either a server computer or a mainframe computer. The host computer 30, for example, comprises application programs such as a customer management program, a sales management program, and a video delivery program, and provides services to a client computer not shown in the drawing.

Figure 3:
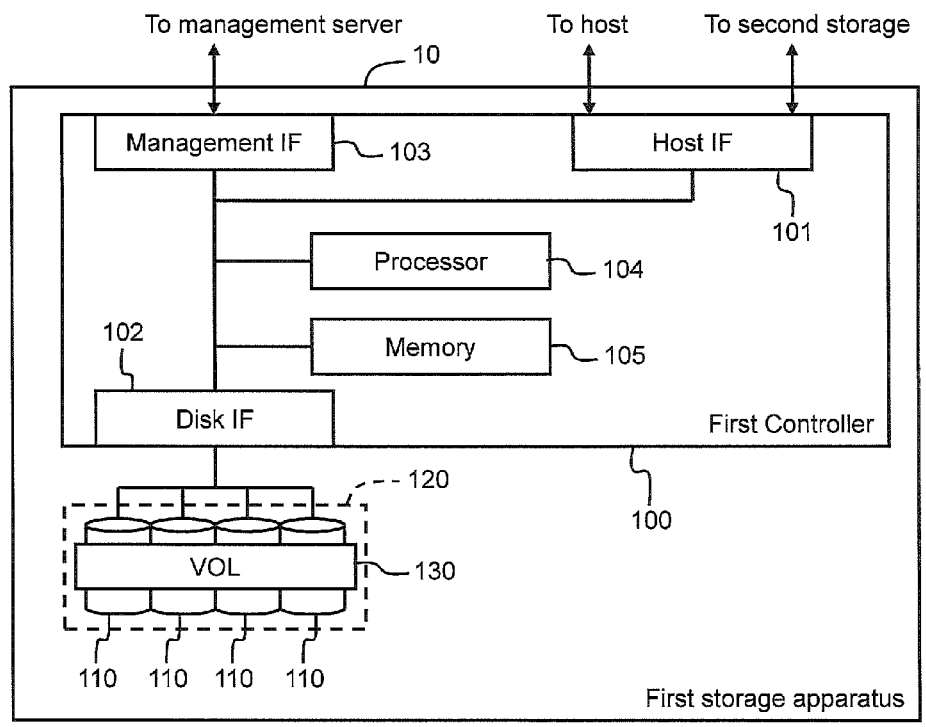
FIG. 3 is a hardware block diagram of a first storage apparatus.

FIG. 3 shows an example of a hardware configuration of the first storage apparatus 10. The first storage apparatus 10, for example, comprises a first controller 100, and multiple storage devices 110.

The first controller 100 controls the operations of the first storage apparatus 10. The first controller 100, for example, comprises a host interface circuit 101, a disk interface circuit 102, a management interface circuit 103, a microprocessor 104, and a memory 105.

The host interface circuit 101 is a communication interface circuit for coupling the host 30 and the second storage apparatus 20. The host interface circuit 101 comprises multiple communication ports. For example, a communication port configured to a target attribute is coupled to a communication port of the host 30 via a communication path provided in the first communication network CN10. A communication port configured to an initiator attribute from among the respective communication ports of the host interface circuit 101 is coupled to the second storage apparatus 20 via a communication path provided in the second communication network CN20.

The disk interface circuit 102 is a communication interface circuit for communicating with the respective storage devices 110. The management interface circuit 103 is a communication interface circuit for coupling to the management server (refer to FIG. 24). Furthermore, the management interface circuit 103 may be a host interface circuit 101. Processing using a so-called In-Band method is also possible.

The processor 104 realizes command processing, performance information acquisition processing, tier control processing, and data migration processing by reading and executing a prescribed computer program stored in the memory 105.

The memory 105, for example, stores control programs and management information. An example of the content stored in the memory 105 will be described further below. A cache memory can also be included in the memory 105. In addition, an auxiliary storage device may also be included in the memory 105.

The storage device 110, as was described hereinabove, for example, comprises a rewritable, nonvolatile storage device such as a hard disk drive or a flash memory device. A RAID group 120 is made up of multiple storage devices 110. A logical volume 130 is formed using physical storage areas that have been grouped together. A logical volume 130, which is created using storage devices 110 directly managed by the first storage apparatus 10 is an internal volume, or an actual volume.

As will be explained further below using FIG. 14, a pool 131 comprising multiple tiers 132, and a virtual volume (a thin provisioning volume) 133 are disposed as logical entities in the first storage apparatus 10. A real page is allocated as a real storage area from the pool volumes 130, 130V belonging to a prescribed tier 132 of the pool 131 to the virtual volume 133 in accordance with a write access from the host 30.

Furthermore, as described hereinabove, the first storage apparatus 10 comprises an external coupling function for incorporating an external volume as a logical volume in the first storage apparatus 10. Therefore, since the first storage apparatus 10 can use the external coupling function to utilize a logical volume 230 in the second storage apparatus 20, the first storage apparatus 10 does not need to comprise a storage device 110. A first storage apparatus 10 that does not comprise a storage device 110, for example, would probably be viewed as a storage controller or a high-performance switch.

Figure 4:
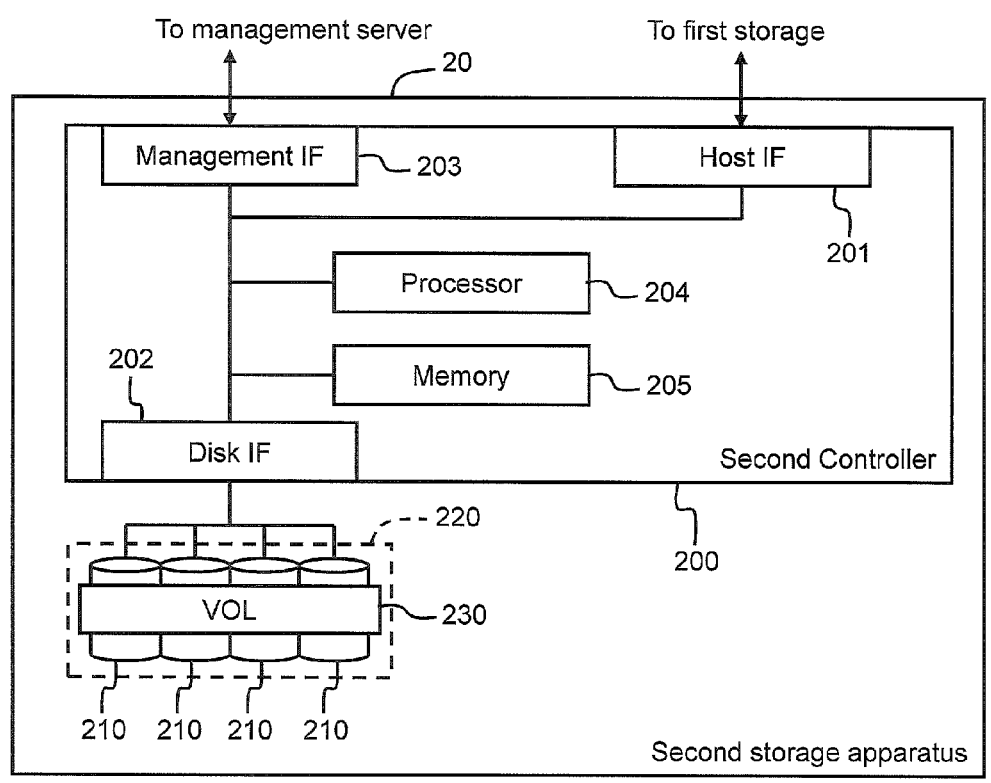
FIG. 4 is a hardware block diagram of a second storage apparatus.

An example of the hardware configuration of the second storage apparatus 20 will be explained by referring to FIG. 4. The second storage apparatus 20 can comprise the same configuration as the first storage apparatus 10. The second storage apparatus 20, for example, comprises a second controller 200, and multiple storage devices 210.

The second controller 200 controls the operations of the second storage apparatus 20, and comprises a host interface circuit 201, a disk interface circuit 202, a management interface circuit 203, a microprocessor 204, and a memory 205. The respective components 201 through 205 are the same as the configuration 101 through 105 in the first storage apparatus 10, and as such, explanations thereof will be omitted.

The storage device 210 comprises a hard disk drive or a flash memory device as the storage device the same as the storage device 110. A RAID group 220 is formed from multiple storage devices 210. A logical volume 230 is created using the storage areas of the RAID group 220.

The logical volume 230, as was described hereinabove, is called an external volume because it exists externally as seen from the first storage apparatus 10. The logical volume 230 is also an actual volume created based on the physical storage area of the storage device 210.

Figure 5:
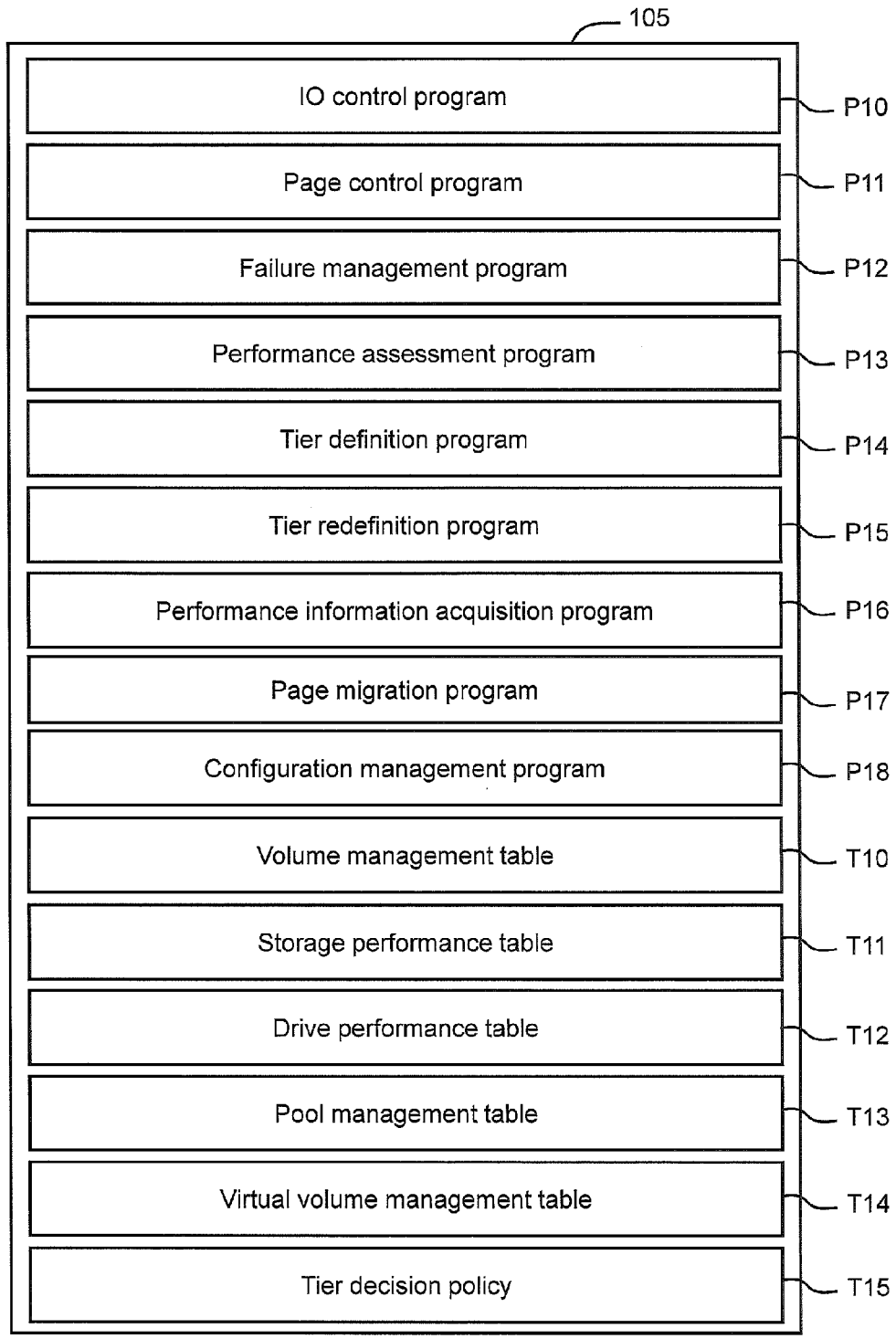
FIG. 5 is an illustration showing the contents of a memory of the first storage apparatus.

FIG. 5 shows the contents stored in the memory 105 of the first storage apparatus 10. For example, multiple programs P10 through P18, and multiple pieces of management information T10 through T15 are stored in the memory 105.

An IO control program P10 is for processing a command issued from the host 30. The IO control program P10 comprises a function for converting a logical address and a physical address. A logical address is an address in a logical volume, and a physical address is an address in a storage device.

The IO control program P10 writes data to the logical volume in accordance with a write command, and notifies the host 30 of the result. The IO control program P10 reads data from the logical volume in accordance with a read command, and sends this data to the host 30. Furthermore, the IO control program in the second storage apparatus 20 processes a command from the first storage apparatus 10.

The IO control program P10 converts a virtual address of the virtual volume 133 to a logical address of the logical volume in response to an access to the virtual volume 133, and, in addition, converts this logical address to a physical address. In accordance with this, the IO control program P10 reads/writes data from/to the virtual volume 133.

In a case where an externally coupled volume 130V (refer to FIG. 14), which is coupled to the external volume 230 of the second storage apparatus 20, is accessed, the IO control program P10 converts the command received from the host 30 to a command for use in the second storage apparatus. The IO control program P10 sends the converted command to the second storage apparatus 20 via a communication path configured in the second communication network CN20. The IO control program P10 receives the result of processing in the second storage apparatus 20 and notifies the host 30. Furthermore, the IO control program P10 may also notify the host 30 to the effect that the request has been completed without waiting for the result of the write request that was issued to the second storage apparatus.

A page control program P11 is for allocating a page of a pool volume to the virtual volume 133.

A failure management program P12 is for monitoring the status of each type of resource, detecting the occurrence of a failure, and, in addition, carrying out failure recovery processing. For example, in a case where a failure has occurred in a storage device of a RAID group, the failure management program P12 restores the data in the failed storage device in a spare storage device, and, in addition, blocks the failed storage device. The failure management program P12 can also notify the user that the failed storage device should be replaced with a new device. Furthermore, the failure management program P12 may also comprise a function for notifying a tier redefinition program, which will be described further below of the occurrence of a failure.

The failure management program P12 updates as needed a status column C105 of a volume management table T10, which will be explained further below, in accordance with the results of resource monitoring. Furthermore, a monitoring-target resource is not limited to a logical volume and a storage device. A communication interface and a controller can also be monitoring targets.

A performance assessment program P13 is for assessing the performance of an assessment-target volume by issuing a prescribed 10 command for testing purposes, which has been prepared beforehand. A number of assessment methods are conceivable. For example, a simple 10 command may be issued, and an assessment made on the basis of the response time thereto. Or, an assessment may be performed based on the number of IOPS (Potential IOPS), which will constitute a boundary value when response times begin to worsen drastically. The inverse number of the response time in the case of the former may be used as a provisional value of the Potential IOPS (Potential IOPS=1/Response Time).

A tier definition program P14 is for deciding the tier to which a logical volume should belong based on information related to the performance of this logical volume. Performance-related information is a prescribed parameter required for deciding a destination tier of various types of parameters related to performance.

As prescribed parameters, for example, the type of the storage devices comprising the logical volume, the RAID level, the RAID configuration, a Potential IOPS, and a response time can be cited. Or, the IO command for testing purposes mentioned above may be issued, and either the response time or the Potential IOPS with respect to this IO command may be used as the prescribed parameter. Or, the response times with respect to normal 10 commands issued to the logical volume may be stored as a history, and a response time remaining in this history may be used as the prescribed parameter.

The prescribed parameter with respect to the externally coupled volume, as will be explained further below, can also comprise the status of the communication path which couples the externally coupled volume 130V and the external volume 230. The communication path status, for example, can include the surplus communication bandwidth, communication speed, communication delay time, and number and performance of relay devices on the communication path. The relay device, as will be explained further below, may be a switching apparatus or another storage apparatus.

A tier redefinition program P15 is for revising a pool volume to be allocated to a tier 132 at a prescribed moment. As a prescribed moment, for example, a case in which a prescribed time period has elapsed since the previous revision time, and a case in which a prescribed event, such as the occurrence of a failure or a change in the configuration of a RAID group, has been detected, can be cited.

The tier redefinition program P15 revises the allocation-destination tier of a volume based on the latest value of the performance-related parameter (prescribed parameter). When a failure occurs, the tier redefinition program P15 temporarily reallocates the volume in which the failure occurred to the lowest level tier, and thereafter, in a case where the volume has recovered from the failure, returns the volume from the lowest level tier to its original tier. In a case where the RAID group configuration has changed, the tier redefinition program P15 can allocate the volume to a tier that matches this post-change performance.

A performance information acquisition program P16 is for acquiring and managing a preset prescribed parameter. The performance information acquisition program P16 acquires the prescribed parameter required for a tier definition, and stores this parameter in a volume management table T10.

A page migration program P17 is for migrating a data-storing real page between the respective tiers in a pool in accordance with the utilization status of this data. For example, data that is used relatively frequently is migrated to a pool volume with higher performance than the current pool volume. The data is copied from the pool volume in the current tier (the migration-source pool volume) to a pool volume in a higher level tier (the migration-destination pool volume). Alternatively, data that is not used very much is migrated to a pool volume that is lower performance than the current pool volume.

A configuration management program P18, for example, may create a logical volume, delete a logical volume, or configure a communication path to a logical volume in accordance with an instruction inputted from a management interface. The configuration management program P18 updates a required table in accordance with this configuration change.

The preceding has been examples of the programs of the first storage apparatus 10. The respective management information (management tables) T10 through T15 will be explained once again further below using the drawings.

Figures 6, 7:
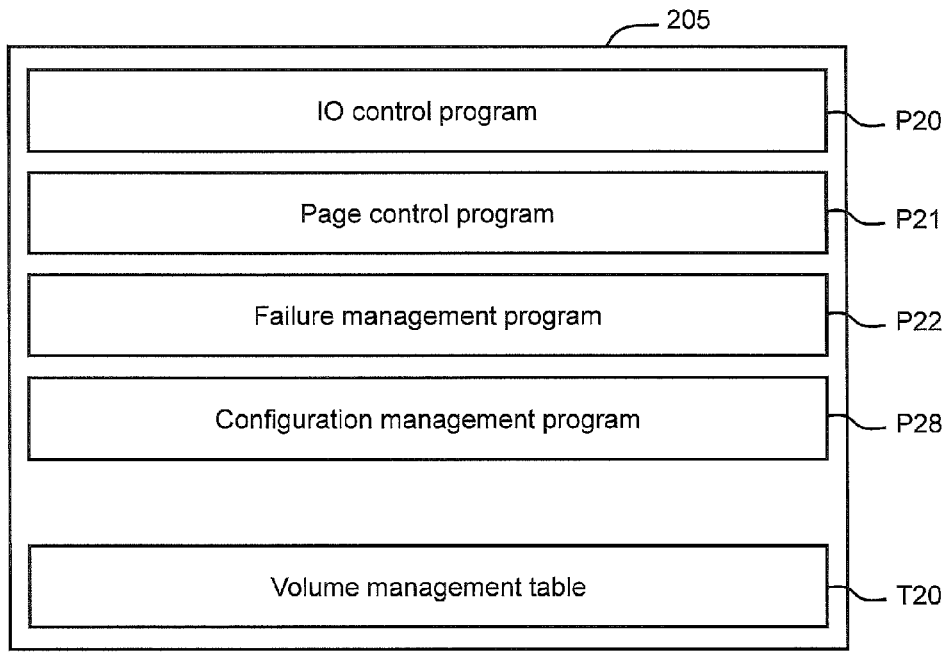
FIG. 6 is an illustration showing the contents of a memory of the second storage apparatus.
FIG. 7 is a block diagram of a table for managing a volume.

FIG. 6 is an example of the storage contents of the memory 205 of the second storage apparatus 20. The memory 205, for example, stores an IO control program P20, a page control program P21, a failure management program P22, a configuration management program P28, and a volume management table T20. The programs P20 through P22 are the same as the program P10 through P12 described using FIG. 5, and as such, explanations will be omitted. The volume management table T20 is configured the same as the volume management table T10 in the first storage apparatus 10, and as such, only the volume management table T10 will be explained using FIG. 7.

FIG. 7 shows an example of the configuration of the volume management table T10. The volume management table T10 is for managing a logical volume that is under the management of the first storage apparatus 10. Volume-related information is updated using the configuration management program P18.

The volume management table T10, for example, correspondingly manages a volume ID column C100, a capacity column C101, a storage ID column C102, a drive type column C103, a RAID level column C104, a status column C105, and a Potential IOPS column C106.

Information for identifying each volume under the management of the first storage apparatus 10 is stored in the volume ID column C100. The total capacity of each volume is stored in the capacity column C101. Information for identifying the storage apparatus in which each volume exists is stored in the storage ID column C102. Because a logical volume 130 that uses a storage device 110 in the first storage apparatus 10 is an internal volume, "Internal" is configured in the storage ID column C102. Alternatively, because an externally coupled volume 130V is coupled to the logical volume (external volume) 230 of the second storage apparatus 20, "Storage2" is configured in the storage ID column C102.

Information denoting the type of storage device that is providing a storage area to a volume, for example, is configured in the drive type column C103 as "SSD", "SAS", and "SATA". A RAID level and a RAID configuration are stored in the RAID level column C104. For example, "5(3D+1P)" denotes a RAID5 configuration formed from three data disks and one parity disk.

The status of a volume is stored in the status column C105. In the case of normal operation, "Normal" is configured, and in a case where a failure has occurred, "Error" is configured. The value of a Potential IOPS is configured in the Potential IOPS column C106. The Potential IOPS is the value of IOPS obtainable during a normal response time. When the Potential IOPS is exceeded, the response time suddenly drops.

Furthermore, the volume status column C105 may be updated by the failure management program P12. The Potential IOPS column C106 may be updated by the performance information acquisition program P16.

Figure 8:
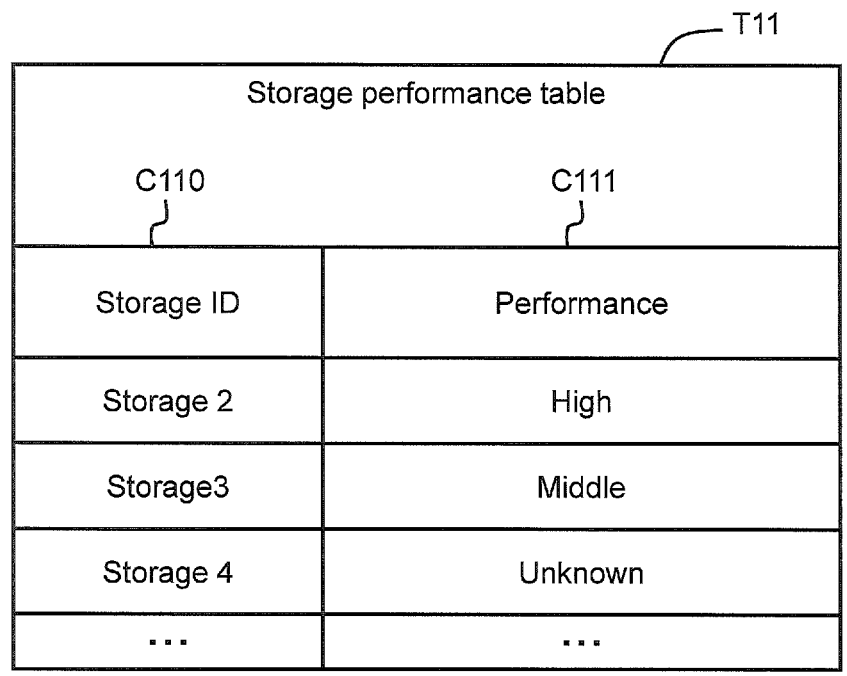
FIG. 8 is a block diagram of a table for managing storage performance.

FIG. 8 shows a storage performance table T11. The storage performance table T11 defines the performance of an external storage apparatus.

The storage performance table T11, for example, comprises a storage ID column C110, and a performance column C111. Information for identifying the second storage apparatus 20, which is the external storage apparatus, is stored in the storage ID column C110.

A value obtained by assessing the performance of the external storage apparatus, for example, is configured in the performance column C111 as "High", "Middle" or "Low". In a case where the performance is not known, "Unknown" is configured in the column C111.

For example, the user may manually define the storage performance table T11 by issuing an instruction from the management interface. The user can assess the performance of the second storage apparatus, and can manually configure this assessment value in the performance column C111.

Or, all or a part of the storage performance table T11 can be automatically created by the performance information acquisition program P16. For example, the performance information acquisition program P16 can collect and store information, such as the model names and manufacturing numbers of storage apparatuses provided by respective vendors, and assign a ranking to the performance of these storage apparatuses in accordance with the model name and so forth acquired from the external storage apparatus. Since performance is likely to be higher the newer the model name, performance can be ranked based on the model name. Furthermore, a catalog database of storage apparatuses may be managed by the management server, and the catalog database in the management server may be updated as needed.

Figure 9:
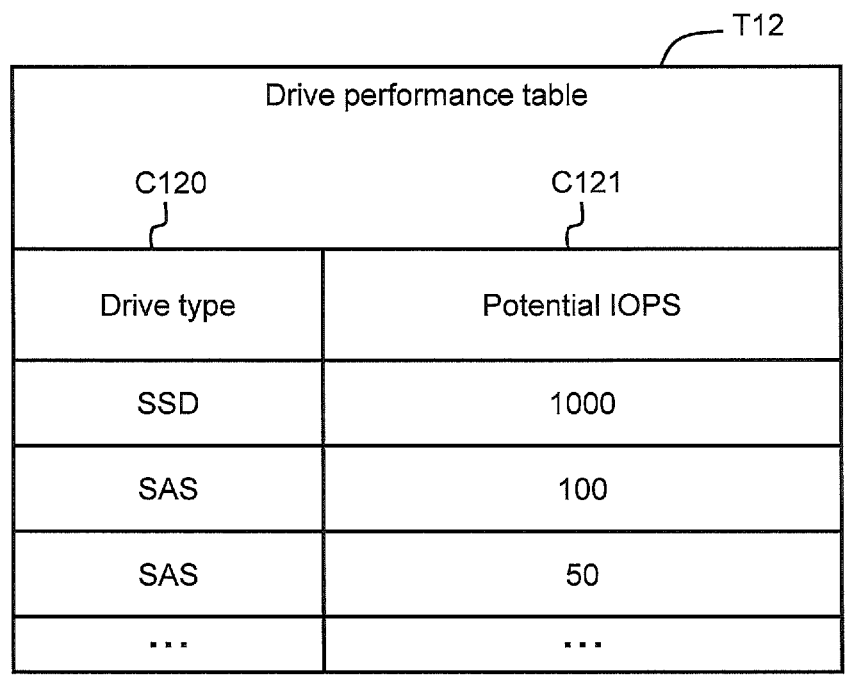
FIG. 9 is a block diagram of a table for managing drive performance.

FIG. 9 shows a drive performance table T12. The drive performance table T12 is for defining volume performance. As shown in FIG. 9, this may be a table that defines the performance of the storage device comprising a volume.

The drive performance table T12, for example, comprises a drive type column C120, and a Potential IOPS column C121. The type of the storage apparatus, such as "SSD", "SAS", and "SATA", is configured in the drive type column C120. The value of the Potential IOPS is configured in the Potential IOPS column C121.

For example, it will be assumed that a RAID 5 (3D+1P) configuration is created using SSD, and that one SSD disk comprises performance of 1000 IOPS. In this case, since there are three data disks, 3000 (=1000×3) is configured in the Potential IOPS column C121 as the Potential IOPS.

Furthermore, the present invention is not limited to the example described above, and a Potential IOPS value, which is defined beforehand for each drive type and RAID level, may be used.

FIG. 10 shows a pool management table T13. The pool management table T13 is for managing the configuration of the pool 131.

The pool management table T13, for example, correspondingly manages a pool ID column C130, a pool volume column C131, a tier column C132, a page ID column C133, a start LBA column C134, an end LBA column C135, and an IOPS column C136.

Information for identifying the pool 131 disposed in the first storage apparatus 10 is configured in the pool ID column C130. Information for identifying a pool volume belonging to the pool 131 is configured in the pool volume column C131.

Information for identifying the tier 132 to which the pool volume is allocated is configured in the tier column C132. Information for identifying a page belonging to a tier is configured in the page ID column C133. The start address of a page is configured in the start LBA column C134 and the end address of the page is configured in the end LBA column C135. The page IOPS, which are carried out during an arbitrary fixed period of time from the host with respect to the relevant page, is recorded in the IOPS column C136.

FIG. 11 shows a virtual volume management table T14. The virtual volume management table T14 is for managing the configuration of a virtual volume. The virtual volume management table T14, for example, comprises a virtual volume ID column C140, a capacity column C141, a start virtual LBA column C142, an end virtual LBA column C143, and a page ID column C144.

Information for identifying the virtual volume 133 is configured in the virtual volume ID column C140. The capacity of the virtual volume 133 is configured in the capacity column C141. This capacity is the capacity shown to the host 30, and is not the total capacity of the area actually storing the data.

The start address of a page (also called the virtual page) in the virtual volume 133 is configured in the start virtual LBA column C142. The end address of this page is configured in the end virtual LBA column C143. Multiple virtual pages are created by partitioning the address space in the virtual volume 133. This LBA is called a virtual LBA here to show that it differs from an ordinary logical volume LBA. Information for identifying a virtual page is configured in the page ID column C144. A virtual page for which "NULL" is configured in the page ID column C144 indicates that a real page has not been allocated yet.

FIG. 12 shows a policy T115A for deciding an allocation-destination tier for a volume. As one method, the tier to which a logical volume should belong can be decided based on the performance of the storage apparatus and the type of this logical volume.

The policy table T15A, for example, comprises a drive type column C150A, an internal volume column C151A, and an external storage apparatus performance column C152A. For example, the type of the storage device comprising the logical volume, such as "SSD", "SAS" and "SATA", is configured in the drive type column C150A.

A ranking is configured in the internal volume column C151A in a case where the logical volume configured from this storage device is an internal volume. For example, in the example shown in the drawing, a first ranking, which is the highest ranking, is configured with respect to an internal volume configured from SSDs. A second ranking is configured for an internal volume configured from SASs. A third ranking is configured for an internal volume configured from SATAs. In a case where the type of the storage device is not known, a ranking of 7, which is the lowest rank order, is configured for this internal volume.

In the external storage apparatus performance column C152A, an external storage apparatus is assigned a ranking in accordance with the performance of the external storage apparatus. The performance rankings of the external storage apparatus, for example, include "High", "Middle", "Low", and "Unknown". For example, the performance of the external storage apparatus can be ranked based on the model name, model number, manufacturing number, and so forth of the external storage apparatus. In a case where the performance is not known, "Unknown" is configured in the performance column C152A.

The rankings of external storage apparatuses will differ in accordance with a difference in external storage apparatus performance even though the external storage apparatuses are configured from the same type storage device. For convenience of explanation, a volume configured from SSDs, will be called an SSD volume, a volume configured from SAS disks, will be called a SAS volume, and a volume configured from SATA disks, will be called a SATA volume.

An SSD volume in a high-performance external storage apparatus will have a ranking of 2, an SSD volume in a medium-performance external storage apparatus will have a ranking of 3, and an SSD volume in a low-performance external storage apparatus will have a ranking of 4. A ranking of 7 is configured in all external storage apparatuses for which performance is not known regardless of the type of the storage device.

In a case where the storage devices are the same type, the ranking is configured so that the internal volume is higher than the external volume. As was explained hereinabove, in a case where the storage devices are of the same type, the ranking of the external volumes is configured in descending order according to the performance of the external storage apparatus.

Furthermore, in the policy table of FIG. 12, the rankings are configured in seven stages from a ranking of 1 to a ranking of 7, but the inside of the pool 131 is partitioned into three tiers 132. That is, the number of performance rankings and the number of tiers do not match. Consequently, in this example, rankings of 1 and 2, for example, are associated with the high level tier, rankings of 3 through 5 are associated with the middle level tier, and rankings of 6 and 7 are associated with the low level tier. In this way, either one or multiple rankings can be associated with a single tier. Or, restrictions may be set so that only three types of rankings can be selected at pool volume selection time, and the tiers may be decided in the order of the selected rankings. For example, in a case where pool volumes having rankings of 3, 4, and 6 have been selected, the pool volume with the ranking of 3 can be allocated to the high level tier, the pool volume with the ranking of 4 can be allocated to the middle level tier, and the pool volume with the ranking of 6 can be allocated to the low level tier. An arbitrary method, which decides the tiers so that a smaller ranking value constitutes a higher level tier, can also be used.

In FIG. 12, the type of the storage device was focused on as the logical volume attribute. But the present invention is not limited to this, and, for example, a policy for deciding a tier to which a logical volume should belong may be created by focusing on other attributes, such as the RAID level of the logical volume and the number of drives comprising a RAID group.

FIG. 13 is a table showing another policy T15B. The tier decision policy T15B, for example, comprises a tier column C150B and a Potential IOPS column C151B. Information for identifying each tier 132 is configured in the tier column C150B. The Potential IOPS value required by a tier is configured in the Potential IOPS column C151B. For example, it is supposed that the high level tier needs a volume with a Potential IOPS of equal to or larger than 1000, and the middle level tier needs a logical volume with a Potential IOPS of equal to or larger than 500. The low level tier can have a logical volume with a Potential IOPS of less than 500.

The number of tiers is not limited to three, and may be two, or four or more. In addition, instead of the Potential IOPS, the IOPS per unit of capacity of the logical volume (=Potential IOPS/Capacity) or the response time may be used. In addition, the policy T15A shown in FIG. 12 and the policy T15B shown in FIG. 13 may be switched as needed.

Figure 14:
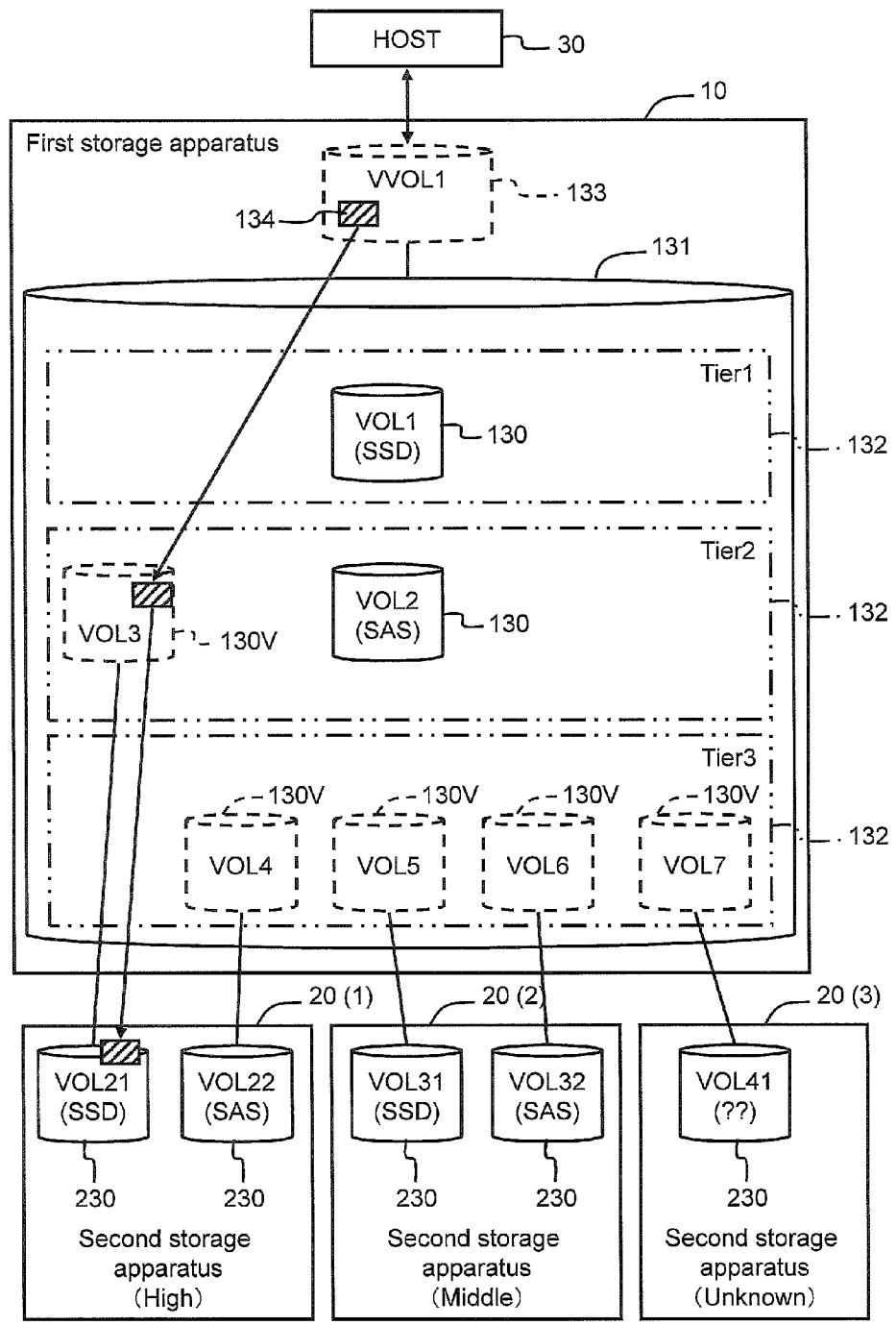
FIG. 14 is an illustration schematically showing the relationship between a virtual volume and a pool, and an external volume.

FIG. 14 schematically shows the relationship between the virtual volume 133 and the tier 132, and the external volume 230. A high-performance second storage apparatus 20(1), a medium-performance second storage apparatus 20(2), and second storage apparatus 20(3) which is unknown for its performance are coupled to the first storage apparatus 10. These second storage apparatuses 20(1) through 20(3) provide logical volumes 230 to the first storage apparatus 10. The first storage apparatus 10, which represents the storage system, comprises the pool 131. The inside of the pool 131 is partitioned into multiple tiers 132. Either one or multiple volumes 130, 130V are respectively allocated to each tier 132.

As was described hereinabove, the volume 130 is an internal volume. The volume 130V is an externally coupled volume, which is coupled to the external volume 230. The externally coupled volume 130V can also be called a virtual volume. To make a distinction with the externally coupled volume 130V, the virtual volume 133 may be called the thin provisioning volume.

When the host 30 performs a write access to the virtual volume 133, a real page selected from a volume in any of the tiers 132 is allocated to the page 134 corresponding to the write-target address. In FIG. 14, the page is marked with diagonal lines. The data written to the virtual volume 133 is actually written to the real page that has been allocated to the virtual volume 133.

In a case where the pool volume, which provides the real page to the virtual volume 133, is the externally coupled volume 130V, the data is written in the external volume 230 that is coupled to this externally coupled volume 130V. In FIG. 14, the write-target page 134 of the virtual volume 133 is associated with the externally coupled volume 130V (VOL3) in the middle level tier 132 (Tier 2). The externally coupled volume 130V (VOL3) is associated with the volume 230 (VOL21) in the high-performance second storage apparatus 20(1). The data, which has the virtual volume 133 as the target, is converted to data (a command) for the externally coupled volume 130V (VOL3). In addition, this data is converted to data for the external volume 230 (VOL21), sent from the first storage apparatus 10 to the second storage apparatus (external storage apparatus) 20(1), and written to the external volume 230 (VOL21).

As shown in FIG. 14, for example, only an internal volume 130 is allocated to the high performance-required high level tier. An internal volume 130 as well as an externally coupled volume 130V (VOL3), which is coupled to the volume 230 in the high-performance second storage apparatus 20(1), are allocated to the middle level tier, which requires medium performance. Multiple externally coupled volumes 130V (VOL4 through VOL7), which are coupled to the logical volumes 230 in the respective second storage apparatuses 20(1), 20(2), and 20(3), are allocated to the low level tier, for which low performance is acceptable.

Figure 15:
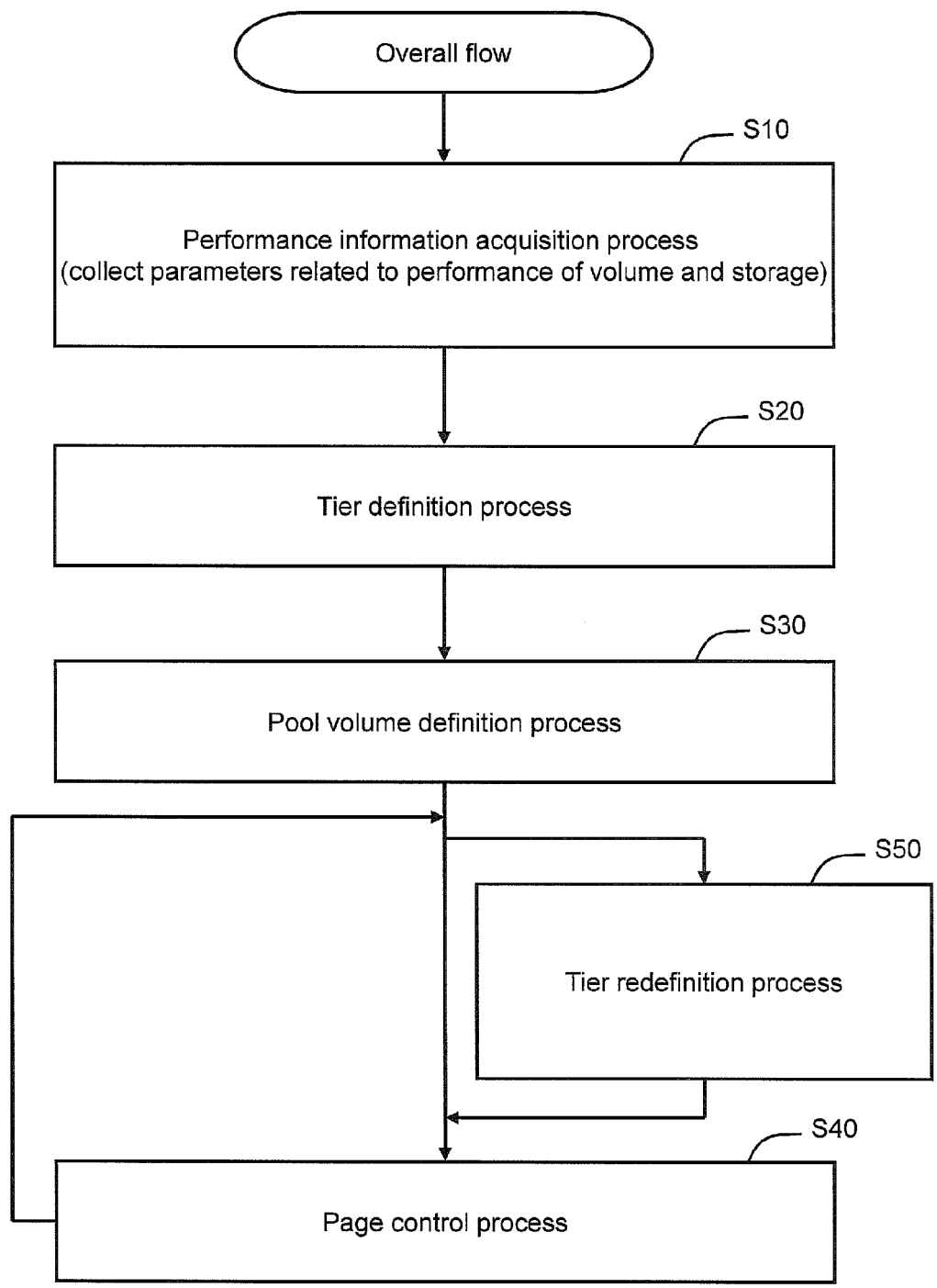
FIG. 15 is a flowchart showing the overall flow of processing.

FIG. 15 shows the overall flow of processing related to controlling the configuration of the tiers. In this example, the first storage apparatus 10 is the operating entity and executes the following processing. Specifically, the first controller 100 of the first storage apparatus 10 executes the respective processes. More specifically, the microprocessor 104 in the first controller 100 executes the respective processes by executing a computer program stored in the memory 105. Therefore, the operating entity is not limited to the storage apparatus, but rather may be any of the controller, the microprocessor, or the computer program.

The first storage apparatus 10 executes a performance information acquisition process (S10). In the performance information acquisition process, the first storage apparatus 10 acquires and manages a prescribed parameter required for controlling the configuration of the pool 131. The performance information acquisition process will be explained in detail further below using FIG. 16.

The first storage apparatus 10 executes a tier definition process (S20). In the tier definition process, the first storage apparatus 10 allocates a volume to an appropriate tier in accordance with the performance of this volume. The tier definition process will be explained in detail further below using FIG. 17.

The first storage apparatus 10 executes a pool volume definition process (S30). In the pool volume definition process, the first storage apparatus 10 registers either an internal volume or an externally coupled volume in the tier decided in the tier definition process.

The first storage apparatus 10 executes a page control process (S40). In the page control process, the first storage apparatus 10 allocates a real page in the pool (any real page in the pool volume) to the virtual volume 133. In the page control process, the first storage apparatus 10 also migrates the real page between tiers 132. The process related to page migration (data migration) within the page control process will be explained further below using FIG. 20.

Figure 16:
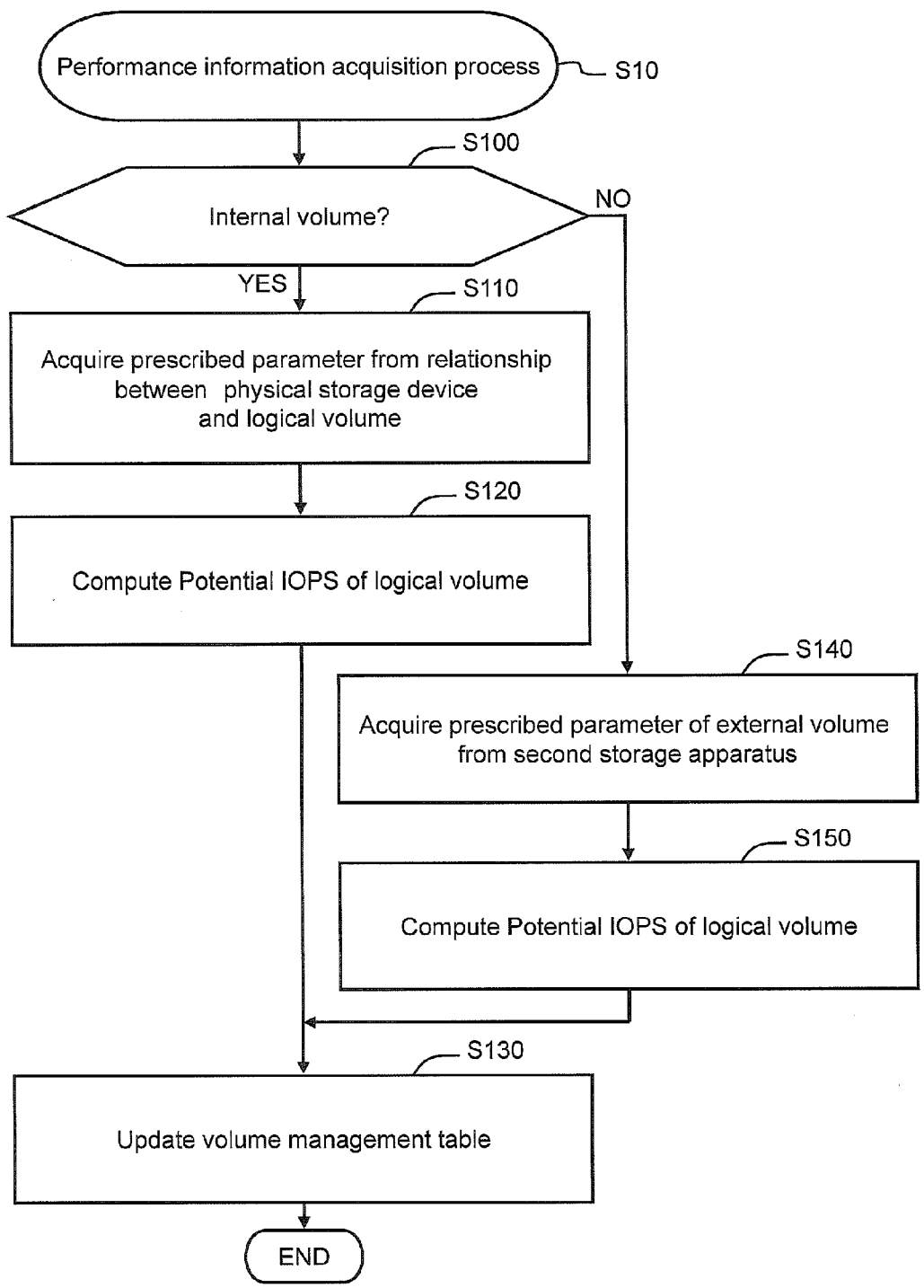
FIG. 16 is a flowchart showing processing for acquiring performance information.

FIG. 16 is a flowchart showing the details of the performance information acquisition process (S10). The processing shown in FIG. 16 is realized by the microprocessor 104 executing the performance information acquisition program P16 in the memory 105. The first storage apparatus 10, as will be described below, acquires information on a prescribed parameter related to volume performance, and stores this information in the volume management table T10. Hereinbelow, the volume that constitutes the target of this processing will be called the target volume.

The first storage apparatus 10 determines whether the target volume is an internal volume (S100). In a case where the target volume is an internal volume (S100: YES), the first storage apparatus 10 acquires from the relationship between the storage device 110 and the internal volume 130 information related to a prescribed parameter, such as the drive type, the RAID level, or the number of drives configuring the RAID (S110). The first storage apparatus 10 may acquire the status of the internal volume 130 at the same time that it acquires the prescribed parameter-related information.

Furthermore, prescribed information, such as the above-mentioned drive type and RAID level, may be registered in the volume management table T10 when creating either an internal volume 130 or a RAID group 120. In this case, the first storage apparatus 10 can read the prescribed parameter-related information from the volume management table T10.

Next, the first storage apparatus 10 computes the Potential IOPS of the internal volume 130 (S120). There are multiple methods for computing the Potential IOPS as described below.

As one method, the first storage apparatus 10 may compute the internal volume Potential IOPS based on the Potential IOPS of the storage device 110 in which the drive performance table T12 is stored in a case where the drive performance table T12 shown in FIG. 9 is capable of being used. For example, in a case where the Potential IOPS per storage device is 1000, and a group 120 of RAID5 is to be created using four of these storage devices (3D+1P), the Potential IOPS of a internal volume 130 created in this RAID group 120 will be 3000 (=1000×3). Furthermore, the Potential IOPS of a volume may be computed by correcting the Potential IOPS of the storage device in which the drive performance table T12 is stored taking control processing overhead into account and using this post-correction value.

The example described hereinabove is a case in which only one logical volume is created in the RAID group. In a case where multiple logical volumes are to be created in the RAID group, the Potential IOPS of each logical volume can be obtained by dividing the Potential IOPS of the RAID group as a whole in accordance with the ratio of the capacity of each logical volume. Or, the Potential IOPS may be decided by taking into account the utilization method of each logical volume. For example, the explanation will give an example of a case in which the RAID group comprises two logical volumes, and the one is used as a pool volume and the other is unused. In this case, since an IO request will only be generated to the pool volume, the pool volume can use all the Potential IOPS of the RAID group. Therefore, in this case, the Potential IOPS of the pool volume may be treated as the Potential IOPS of the RAID group.

As another method, the Potential IOPS of the internal volume 130 may be computed using the performance assessment program P13 as will be explained further below. Furthermore, for example, the accuracy of the Potential IOPS can be enhanced to equal to or greater than the prescribed value by repeating the performance assessment process multiple times. A Potential IOPS having low accuracy can be discarded.

The first storage apparatus 10, upon computing the Potential IOPS of the internal volume 130 (S120), stores this value in the volume management table T10 (S130).

Alternatively, in a case where it has been determined that the target volume is not an internal volume 130 (S100: NO), the target volume is an externally coupled volume 130V. Consequently, the first storage apparatus 10 acquires from the second storage apparatus 20, which is the external storage apparatus, information related to the performance of the second storage apparatus 20 and information related to a prescribed parameter related to the external volume 230 associated with the externally coupled volume 130V (S140).

Furthermore, in a case where the performance of the second storage apparatus 20 is already known (a high-performance storage apparatus, or a medium-performance storage apparatus), the acquisition of information related to the performance of the second storage apparatus 20 can be omitted.

An example of a method in which the first storage apparatus 10 acquires information from the second storage apparatus 20 will be explained. For example, the first storage apparatus 10 is coupled to the second storage apparatus 20 via a communication path configured in the second communication network CN20. Specifically, the first storage apparatus 10 and the second storage apparatus 20 are coupled via a communication path that couples the communication port of the host interface circuit 101 of the first storage apparatus 10 to the communication port of the host interface circuit 201 of the second storage apparatus 20.

The first storage apparatus 10, for example, can issue an Inquiry request to the external volume 230 corresponding to the externally coupled volume 130V, and can acquire information related to the external volume 230 and the performance of the second storage apparatus 20 as the return value thereof. In addition, the configuration may also be such that the second storage apparatus 20 appends such information as drive type and RAID level to the extension area of the Inquiry command and sends this information to the first storage apparatus 10.

In the method described above, in a case where it was not possible to acquire all of the information necessary, that is, a case in which a portion of the information was not acquirable, the first storage apparatus 10 treats the information that could not be acquired as Unknown. The first storage apparatus 10 configures Unknown in the column(s) for which the information could not be acquired in the volume management table T10.

For example, in a case where the RAID level and number of drives could not be obtained, Unknown is configured in the RAID level column C104 of the volume management table T10. In another example, which will be explained further below, the management server acquires information related to storage apparatus performance and information related to a logical volume from the respective storage apparatuses 10 and 20.

The first storage apparatus 10 computes the Potential IOPS of the externally coupled volume 130V based on the information acquired in S140 (S150). The first storage apparatus 10, in a case where it is possible to use the drive performance table T12 applicable to the storage device 210 of the second storage apparatus 20, can compute the Potential IOPS of the externally coupled volume 130V based on this drive performance table T12. That is, the Potential IOPS of the externally coupled volume 130V can be computed based on the type of storage device that comprises the external volume 230 corresponding to the externally coupled volume 130V, and the RAID level and number of drives configuring the RAID thereof.

A case in which the first storage apparatus 10 is not able to use the drive performance table T12 applicable to the storage device 210 in the second storage apparatus 20 is also conceivable. In this case, the first storage apparatus 10 can compute the Potential IOPS of the externally coupled volume 130V using the performance assessment program P13.

However, the performance of the externally coupled volume 130V also depends on the status of the communication path, which couples the first storage apparatus 10 to the second storage apparatus 20. Therefore, in a case where the Potential IOPS computed for the externally coupled volume 130V is unstable (that is, a case in which the computed values vary greatly), the Potential IOPS may be treated as "Unknown". For example, the Potential IOPS of the externally coupled volume 130V is computed multiple times using the performance assessment process, and the distribution thereof is determined. In a case where this distribution value is equal to or larger than a prescribed threshold, the Potential IOPS can be determined to be unstable and treated as "Unknown".

Lastly, the first storage apparatus 10 stores the Potential IOPS of the externally coupled volume 130V in the volume management table T10 and updates the table (S130).

Figure 17:
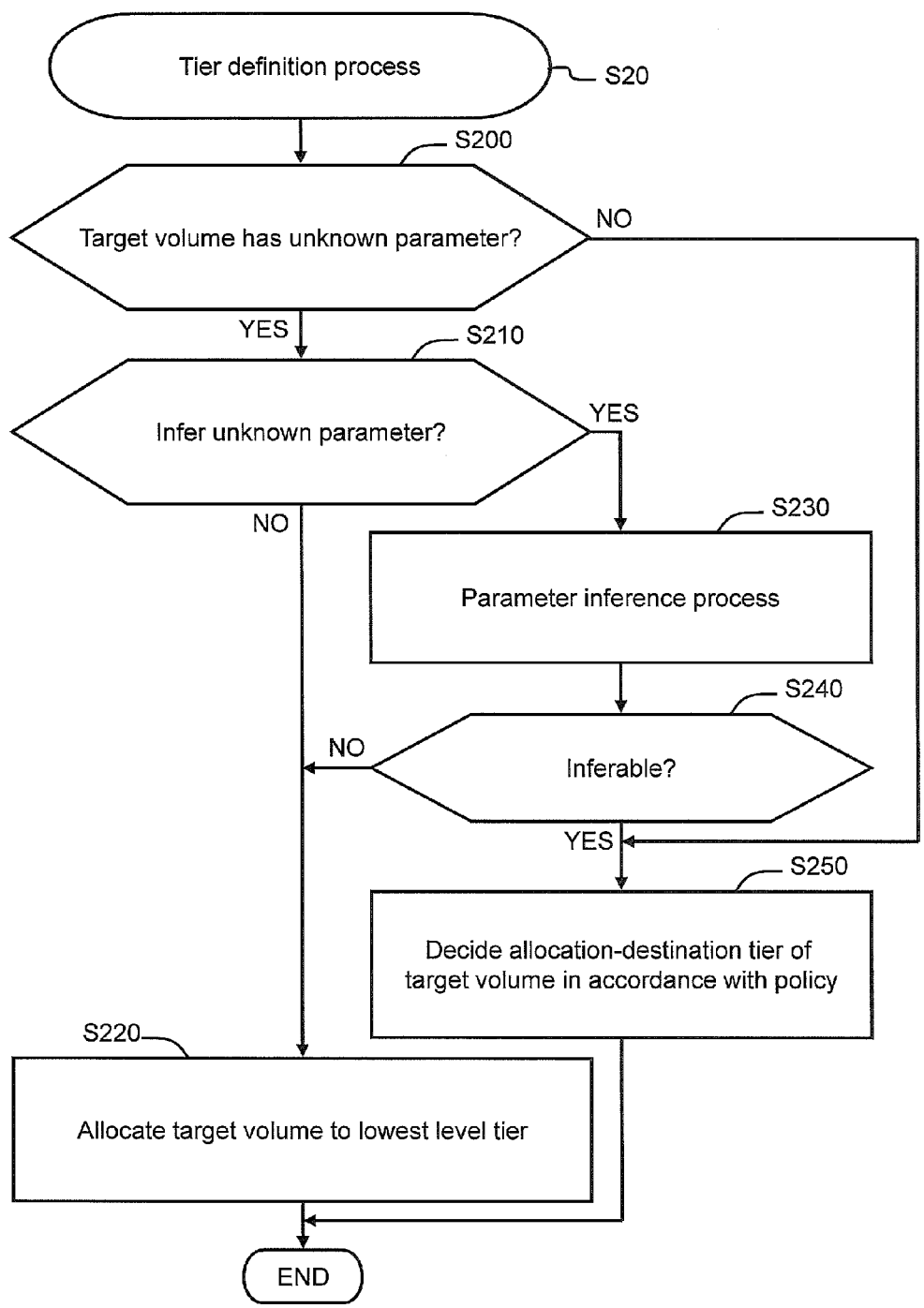
FIG. 17 is a flowchart showing processing for defining a tier.

FIG. 17 is a flowchart showing the details of the tier definition process (S20). This process is realized by the microprocessor 104 executing P14.

The first storage apparatus 10 determines whether or not there is an unknown parameter with respect to the target volume (S200). That is, the first storage apparatus 10 determines whether or not all the information needed to decide the target volume destination tier was obtained. Specifically, the first storage apparatus 10 determines whether or not all the prescribed parameter information required for applying the tier decision policy to the target volume is known.

In a case where all the information needed for applying the tier decision policy to the target volume has not been acquired (S200: YES), that is, a case in which there is an unknown parameter with respect to the target volume, the first storage apparatus 10 cannot decide the allocation-destination tier of the target volume. Alternatively, in a case where all the information has been acquired (S200: NO), the first storage apparatus 10 proceeds to S250, which will be explained further below, and decides the tier in accordance with the policy.

Consequently, the first storage apparatus 10 determines whether or not to infer the unknown parameter (S210). Whether or not to infer the unknown parameter may be determined automatically in accordance with a preset inference determination policy, or may be inferred in accordance with an instruction from the user.

In a case where the unknown parameter is not inferred (S210: NO), the first storage apparatus 10 allocates the target volume to the low level tier (the lowest level tier) (S220).

Furthermore, the configuration may be such that the target volume for which a parameter is unknown is allocated to another tier instead of being allocated to the lowest level tier. For example, in the case of a pool with five tiers, i.e., a first tier, a second tier, a third tier, a fourth tier, and a fifth tier, the configuration may be such that the target volume for which a parameter is unknown is allocated to either the fourth tier or the fifth tier. In addition, the configuration may be such that the target volume for which a parameter is unknown is not used as the pool volume.

In a case where the unknown parameter is to be inferred (S210: YES), the first storage apparatus 10 executes a parameter inference process, which will be explained further below (S230). The parameter inference process will be explained in detail further below using FIG. 18.

The first storage apparatus 10 determines whether or not the unknown parameter of the target volume is capable of being inferred (S240). In a case where the unknown parameter is uninferable (S240: NO), the first storage apparatus 10 allocates the target volume to the lowest level tier (S220).

In a case where the unknown parameter of the target volume is able to be inferred (S240: YES), the first storage apparatus 10 decides the allocation-destination tier of the target volume based on the prescribed parameter obtained from the target volume and the tier decision policy (S250).

At this point, the first storage apparatus 10 can decide the allocation-destination tier of the target volume using either of the multiple tier decision policies T15A and T15B that were prepared beforehand. For example, in a case where the first tier decision policy T15A shown in FIG. 12 is to be used, the first storage apparatus 10 can decide the allocation-destination tier of the target volume when the storage apparatus performance and the logical volume type are known. Alternatively, in a case where the second tier decision policy T15B shown in FIG. 13 is to be used, the first storage apparatus 10 can decide the allocation-destination tier of the target volume when the Potential IOPS of the target volume is able to be computed.

For example, a case will be considered in which the drive type of the second storage apparatus 20 (the type of storage device 210) could not be acquired in the performance information acquisition process (S10) shown in FIG. 16. In this case, it is not possible to compute the Potential IOPS of the externally coupled volume 130V corresponding to the logical volume 230 in this second storage apparatus 20.

Since the drive type is unknown in this case, the first tier decision policy T15A cannot be used. Since the Potential IOPS cannot be computed, it is also not possible to use the second tier decision policy T15B. The first storage apparatus 10 can decide the migration-destination tier of the target volume using the second tier decision policy T15B when the Potential IOPS of the target volume can be computed (detected) using the parameter inference process.

Figure 18:
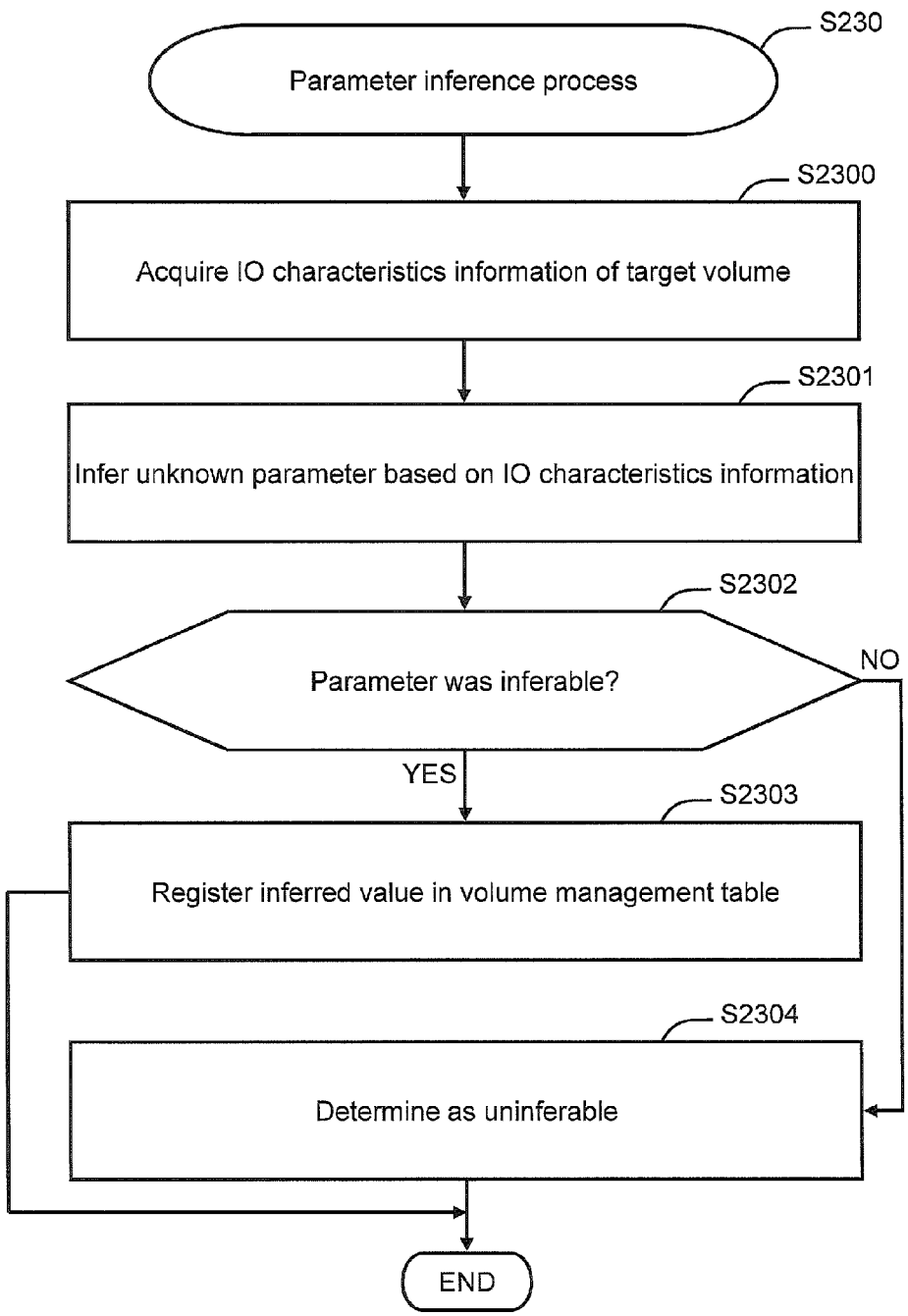
FIG. 18 is a flowchart showing processing for estimating a parameter.
Figure 19:
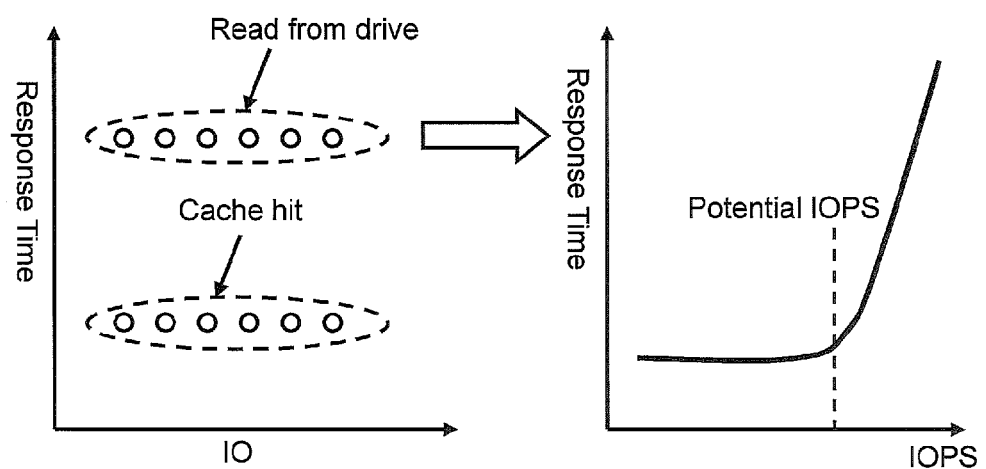
FIG. 19 is an illustration schematically showing a parameter estimation method.

FIG. 18 is a flowchart showing the details of the parameter inference process (S230). The first storage apparatus 10 acquires characteristics information related to the IO (Input/Output) of the target volume (S2300). FIG. 19 will be referred to here.

FIG. 19 is an illustration showing IO characteristics information. A graph of response times with respect to IO requests is shown in the right side of FIG. 19. The storage apparatus response times with respect to a read request can be broadly divided into two types. One is a response time at cache hit, and the other is a response time when data is read from a drive.

Response time at cache hit is a response time in a case where read-target data is stored in the cache memory of the storage apparatus. Since the storage apparatus can simply send the data stored in the cache memory to the read request source, this response time is generally short.

Response time when data is read from a drive, that is, response time at cache miss, is a response time in a case where the read-target data is not stored in the storage apparatus cache memory, requiring that the data be read from a drive (storage device). The response time in this case is longer than the response time at cache hit in accordance with the time it takes to read the data from the storage device and transfer this data to the cache memory.

Thus, the two types of response times differ in accordance with the differences in the technical principles thereof. The storage apparatus performance is reflected in the response time at cache hit. The higher the performance of the controller, the shorter the response time at cache hit. A storage apparatus, which comprises a controller comprising a high-speed, large-capacity cache memory and an internal bus with a fast transfer rate, is high performance. The performance of the storage drive is reflected in the response time at the time of a drive read. The higher the performance of the storage device, the faster the data transfer rate, resulting in a shorter response time. Furthermore, in the case of a volume comprised solely of cache, or a volume that lacks a cache, only one type of response time is observed. In this case, the measurement result may be treated as the response time at cache miss.

Focusing on the response time of the logical volume, as soon as the IOPS has exceeded a prescribed value, the response time of the logical volume suddenly worsens as shown in the right side of FIG. 19. This prescribed value is called the Potential IOPS. When commands too numerous to process are issued to a logical volume, the commands accumulate in a processing wait queue and response time drops significantly.

Return to FIG. 18. The first storage apparatus 10 can obtain IO characteristics as shown in FIG. 19 by managing the past access history of the second storage apparatus 20. Or, the first storage apparatus 10 can obtain IO characteristics as shown in FIG. 19 by issuing an IO command for testing purposes that has been prepared beforehand.

In a case where the access history is managed, IO characteristics can be obtained relatively quickly, but managing the access history is troublesome and also consumes memory. In a case where IO characteristics are obtained by issuing an IO command for testing purposes, it takes some time until the test is complete, but there is no need to manage an access history. In this example, both methods can be used.

The first storage apparatus 10 infers an unknown parameter based on the IO characteristics information (S2301). An example of the inference method will be explained.

For example, as the logical volume response time, the above-mentioned cache hit response time, or a drive-read response time, or a value (for example, an average value) computed from the cache hit response time and the drive-read response time can be used.

The Potential IOPS of the logical volume can be determined from a sudden change in the response time with respect to the IOPS as described using FIG. 19. Furthermore, in a case where the Potential IOPS is not obtained, the period of time until the Potential IOPS is detected or the inverse of the drive-read response time may be used as the Potential IOPS (Potential IOPS=1/drive-read response time).

The storage apparatus performance is inferable on the basis of the cache hit response time as described hereinabove. For example, the cache hit response times for multiple storage apparatuses of different performance, like a high-performance storage apparatus, a medium-performance storage apparatus, and a low-performance storage apparatus, are respectively examined. The cache hit response time obtained from the IO characteristics information and the examined response time are compared, and the performance of the storage apparatus having the closest response time from among the examined response times can be inferred to be the performance of the storage apparatus in which the target volume resides.

The logical volume attributes (drive type and RAID level) can be inferred by focusing on the Potential IOPS and the response time. This is because the Potential IOPS is a value that depends on the drive type and the RAID level (includes the number of drives). Examining the relationship between the RAID level and the response time beforehand with respect to multiple types of storage devices makes it possible to infer the attributes of the target volume.

The status of the target volume can be determined from a change in the response time. When a failure occurs, the response time becomes considerably longer or a response is not returned, making it possible to determine that a failure has occurred.

The first storage apparatus 10 determines whether or not an unknown parameter is inferable (S2302). In a case where the unknown parameter is inferable (S2302: YES), the first storage apparatus 10 registers the inferred value in the volume management table T10 (S2303). In a case where the unknown parameter is uninferable (S2302: NO), that is, a case in which the unknown parameter remains, the first storage apparatus 10 makes a determination of uninferable (S2304). After this processing has ended, the first storage apparatus 10 returns to the tier definition process shown in FIG. 17.

Figure 20:
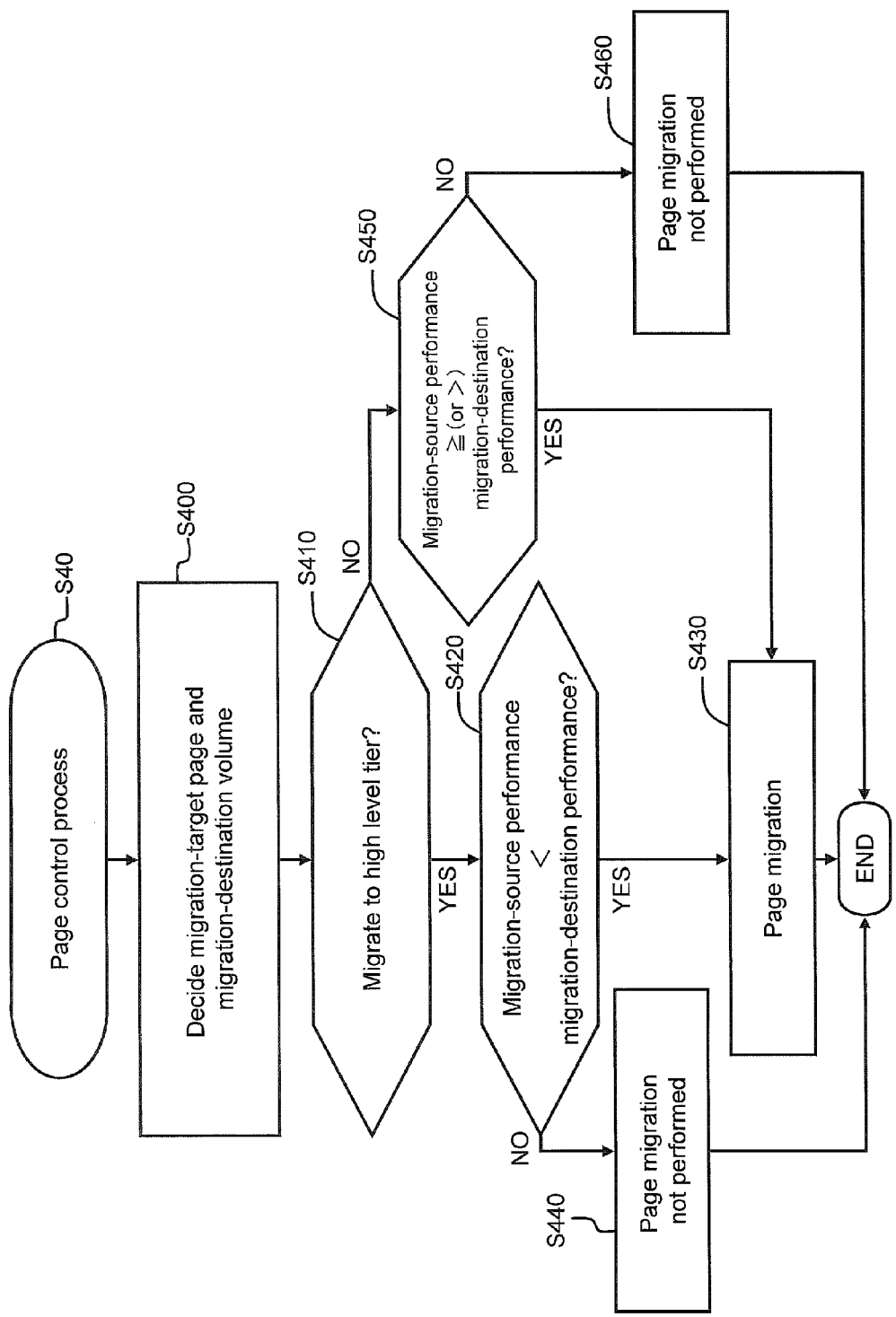
FIG. 20 is a flowchart showing a page control process.

FIG. 20 is a flowchart showing page migration processing within the page control process (S40).

When the host 30 attempts to write data to an unused area in the virtual volume 133, a real page in any of the pool volumes that belong to the respective tiers in the pool 131 is allocated to this area.

The selection of which real page from which tier is in accordance with an allocation policy defined beforehand. For example, the pool volume with the largest remaining capacity may be selected, or a pool volume with a large amount of capacity remaining may be selected from among the pool volumes in a prescribed tier.

In this way, a real page is allocated to a virtual page in the virtual volume 133, and the data received from the host 30 is written to the real page. The first storage apparatus 10 migrates the data stored in the real page between tiers in accordance with the access status of the virtual volume 133.

The processing shown in FIG. 20 is realized by the microprocessor 104 executing the page migration program P17. In the page migration process, basically, the first storage apparatus 10 dynamically migrates pages so as to migrate a page with a large number of IOs to a higher level tier than the tier to which it currently belongs, and to migrate a page with a small number of IOs to a lower level tier than the tier to which it currently belongs.

The first storage apparatus 10 decides the migration-target page and the number (identification information) of the migration-destination volume (S400). The migration-destination volume is not determined at this time; the decided migration-destination volume is simply a candidate.

The first storage apparatus 10 determines whether or not the migration will be to the high level tier based on the migration-target page and the migration-destination volume (S410). In a case where the determination is that the migration will be to the high level tier (S410: YES), the first storage apparatus 10 determines whether the performance of the migration-destination volume is higher than the performance of the migration-source volume (S420).

In a case where the performance of the migration-destination volume is higher than the performance of the migration-source volume (S420: YES), the first storage apparatus 10 executes the migration of the target page (S430). The target page data is copied from the migration-source volume to the migration-destination volume.

Alternatively, in a case where the determination is that the performance of the migration-source volume is higher than the performance of the migration-destination volume (S420: NO), the first storage apparatus 10 ends this processing without migrating the target page (S440).

For example, it is difficult to acquire performance information with respect to the volume 230 in the second storage apparatus 20 because this volume is an external volume. For this reason, the externally coupled volume 130V, which is coupled to the external volume 230, may be determined to be performance unknown and allocated to the lowest level tier.

However, in actuality, the external volume 230, which is coupled to the externally coupled volume 130V, could be high performance. In a case where the performance of the externally coupled volume 130V, which is the migration-source volume, is higher than the performance of the migration-destination volume of a higher level tier (for example, the middle level tier), response performance at data access time will be lower than prior to the migration despite the fact that the data has been migrated to the middle level tier. From the host 30 it will appear like the performance of the pool 131 as a whole has dropped.

Consequently, in this example, the performance history of each volume is managed in accordance with the volume management table T10 or the like, and page migration is only allowed (S430) in a case where the migration-destination volume is higher performance than the migration-source volume (S420: YES).

The volume management table T10 manages the Potential IOPS of a volume, and, in addition to this, may also manage an average value or the like of the response times of IO requests processed by the volume in the past as a performance indicator. Any one or a combination of multiple of a Potential IOPS, an average response time, a drive type, and a RAID level can be used as the performance indicator.

Furthermore, the configuration may be such that, in a case where the Potential IOPS of the migration-destination volume is exceeded when migrating page data to the migration-destination volume, this page migration is suspended. A determination to add this page migration can be made in S420.

Furthermore, it has been stated that a page migration is not carried out in a case where the migration-destination volume is lower performance than the migration-source volume, but instead of this, the configuration may be such that a higher performance volume than the migration-source volume is sought, and the page data is migrated to this higher performance volume.

Alternatively, in a case where the page migration is not to a higher level tier (S410: NO), it is a page migration to a lower level tier than the current tier. Therefore, the first storage apparatus 10 determines whether the performance of the migration-source volume is equal to or higher than the performance of the migration-destination volume (S450). Furthermore, the first storage apparatus 10 may determine whether or not the performance of the migration-source volume exceeds the performance of the migration-destination volume (migration-source volume performance>migration-destination volume performance). This is because a page migration generates processing costs, and in a case where the performance of the migration-source volume and the performance of the migration-destination volume match, it may be better not to carry out the page migration. Therefore, the first storage apparatus 10 may execute the page migration only in a case where the performance of the migration-source volume is higher than the performance of the migration-destination volume.

In a case where the migration-destination volume is lower performance than the migration-source volume (S450: YES), the first storage apparatus 10 copies the target page data from the migration-source volume to the migration-destination volume (S430). Alternatively, in a case where the performance of the migration-destination volume is either equivalent to or higher than the performance of the migration-source volume (S450: NO), the first storage apparatus 10 does not carry out the page migration (S460).

In accordance with this, it is possible to prevent infrequently used data from being migrated to a volume that is higher performance than the volume to which it currently belongs. Furthermore, the configuration may be such that, on a case-by-case basis, S450 and S460 are eliminated, and the processing moves to S430 in a case where a determination of NO is made in S410. That is, the configuration may be such that volume performance is not compared in a case where a page is to be migrated to a lower level tier.

Figure 21:
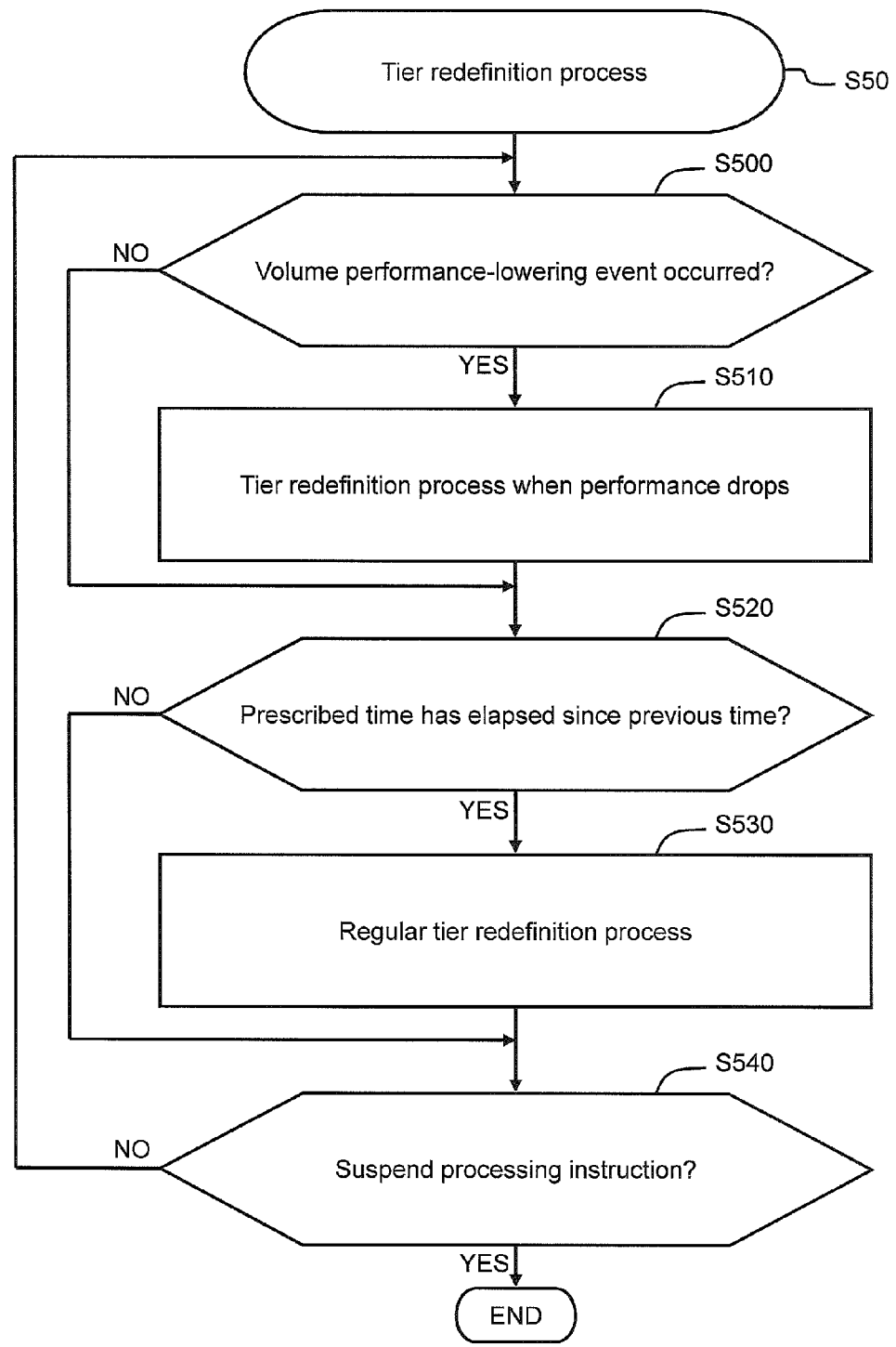
FIG. 21 is a flowchart showing a process for redefining a tier.

FIG. 21 is a flowchart showing the details of the tier redefinition process (S50). The tier redefinition process is realized by the microprocessor 104 executing the tier redefinition program P15. The tier redefinition process changes the allocation-destination tier of a logical volume as needed in accordance with a change in performance in this logical volume.

The first storage apparatus 10 determines whether a volume performance-lowering event has occurred (S500). For example, in a case where a failure has occurred in a storage device, logical volume performance will drop as a result of the start of failure recovery processing. The data in the storage device in which the failure occurred is restored in a spare storage device based on parity and data stored in other storage devices in the RAID group to which the failed storage device belongs. This processing is also called a correction copy process. After the correction copy has ended, the spare storage device is incorporated into the RAID group in place of the failed storage device. Thus, the performance of the logical volume will drop in a case where a failure has occurred in a storage device, a case where a correction copy is being executed, and a case where the RAID group is being reconfigured. Furthermore, in the case of an externally coupled volume 130V, performance may also drop as a result of a failure along a communication path or a change in traffic.

In a case where a prescribed event, which was configured beforehand, has occurred as the volume performance-lowering event (S500: YES), the first storage apparatus 10 executes a tier redefinition process when the performance drops (S510). The tier redefinition process at performance drop will be explained in detail further below using FIG. 22. The occurrence of a failure is detected by the failure management program P12. The first storage apparatus 10 can determine whether or not a failure has occurred by monitoring the status column C105 of the volume management table T10.

In a case where a volume performance-lowering prescribed event has not occurred (S500: NO), the first storage apparatus 10 determines whether a prescribed time has elapsed since the previous tier redefinition process was executed (S520). The prescribed time may be a fixed value, or may be a value that the user is able to change at will.

In a case where the prescribed time has elapsed since the previous execution (S520: YES), the first storage apparatus 10 executes a regular tier redefinition process (S530). The regular tier redefinition process will be explained in detail further below using FIG. 23.

The first storage apparatus 10 determines whether an instruction for aborting the tier redefinition process has been inputted (S540). In a case where an abort instruction has been inputted (S540: YES), the first storage apparatus 10 ends this processing. In a case where an abort instruction has not been inputted (S540: NO), the first storage apparatus 10 returns to S500.

This process was explained as one which revises a volume allocated to a tier either when performance drops or when a prescribed time period has elapsed. Instead of this, for example, the tier redefinition process may be executed in a case where either the required tier performance has changed, or the pool configuration has changed.

Figure 22:
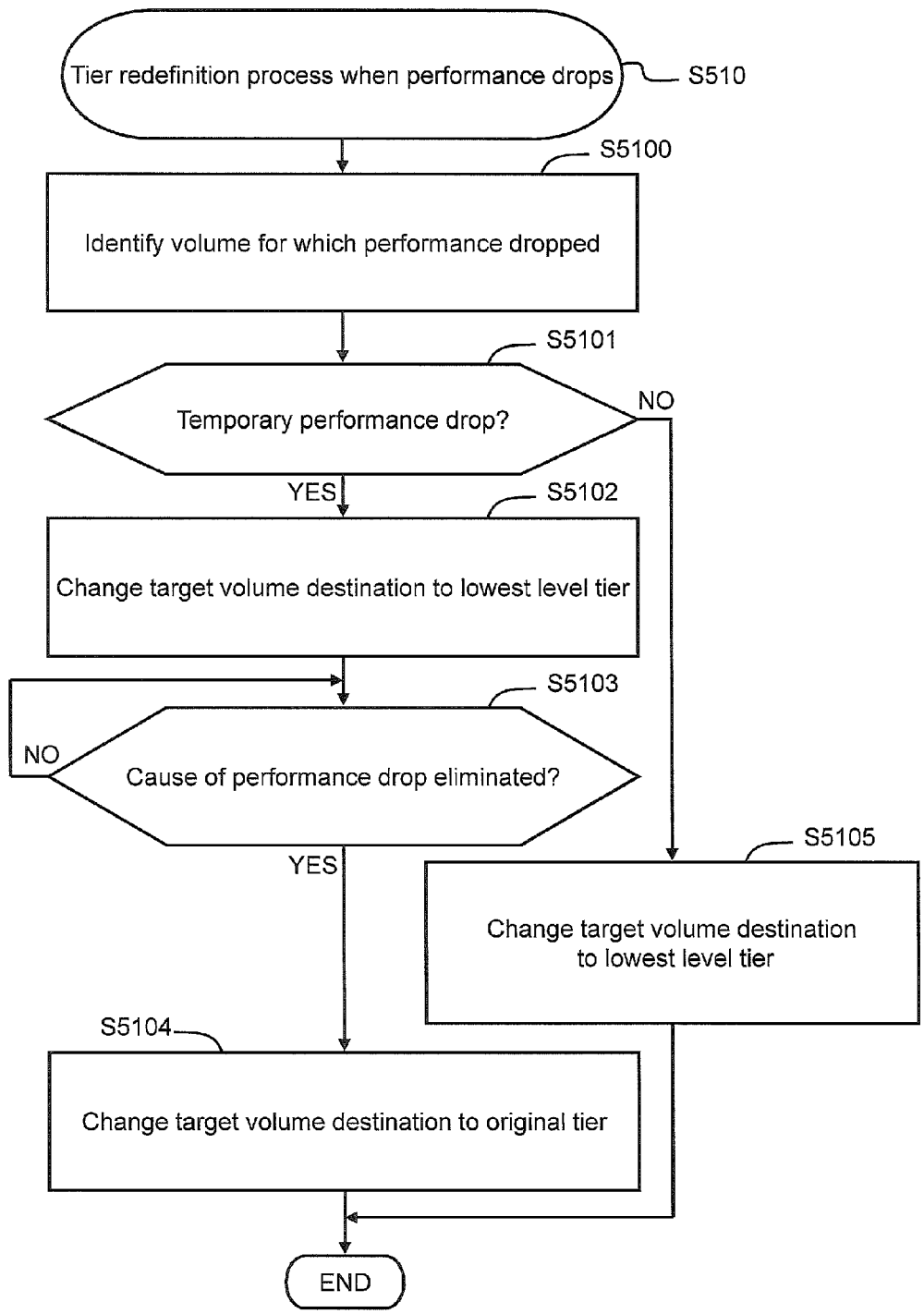
FIG. 22 is a flowchart showing a tier redefinition process in a case where volume performance has dropped.

FIG. 22 is a flowchart showing the details of the tier redefinition process when performance drops (S510). The first storage apparatus 10 identifies a volume in which performance will likely drop due to a failure (S5100). For example, the first storage apparatus 10 can identify a volume for which performance will probably drop by checking the status column C105 of the volume management table T10 and referencing a storage device failure.

The first storage apparatus 10 determines whether or not there has been a temporary drop in performance (S5101). For example, in the case of a drive failure, the cause is clear and logical volume performance will recover once a drive blocking process, a failure recovery process, and a RAID group reconfiguration process have been completed. Therefore, in the case of a drive failure, a determination is made that there has been a temporary drop in performance.

Alternatively, there may also be cases in which it is clear that a failure has occurred, but the cause cannot be identified. For example, in a case where the cause is a failure along the communication path, which couples the externally coupled volume 130V and the external volume 230, the first storage apparatus 10 will probably not be able to detect this failure. In a case like this, a determination will be made that there has not been a temporary drop in performance.

In a case where the determination is that there has been a temporary performance drop (S5101: YES), the first storage apparatus 10 changes the target volume in which performance has dropped temporarily from its current tier to the lowest level tier (S5102). The first storage apparatus 10 temporarily stores the current tier number of prior to changing the allocation destination (tier identification information) in the memory 105. Furthermore, in this example, the allocation destination of the volume for which performance dropped is changed to the lowest level tier, but instead of this the configuration may be such that the volume allocation destination is changed to a tier is suited to the lowered performance.

The first storage apparatus 10 monitors the resource that caused the target volume performance drop (for example, the storage devices that comprise the RAID group to which the target volume belongs), and determines whether or not this resource has recovered from the failure (S5103).

In a case where the cause of the target volume performance drop has been eliminated (S5103: YES), the first storage apparatus 10 changes the allocation destination of the target volume from the lowest level tier to the original tier (S5014). In the failure management program 12, the configuration may be such that the resource failure recovery is queried, or may be such that an event occurs at failure recovery. Furthermore, the configuration may be such that rather than restoring the target volume allocation destination to the original tier, the current performance of the target volume is checked, and the target volume is allocated to a tier that corresponds to this performance.

In a case where the target volume performance drop is not temporary (S5101: NO), the first storage apparatus 10 changes the allocation destination of the target volume to the lowest level tier without storing the original tier number (S5105).

For example, when explained giving a storage device failure (drive failure) as an example, the first storage apparatus 10 determines that the performance of the logical volume that belongs to the RAID group comprising the drive in which the failure occurred will drop temporarily. In a case where multiple logical volumes are disposed in the failure-related RAID group, the first storage apparatus 10 determines that performance will drop in all of these logical volumes.

The first storage apparatus 10 stores the tier to which the logical volume in the failure-related RAID group belongs, and changes the allocation destination of this logical volume to the lowest level tier. The first storage apparatus 10 monitors the status of either the target volume or the RAID group until the drive has recovered from the failure and the reconfiguration of the RAID group has been completed. When the cause of the performance drop has been eliminated, the first storage apparatus 10 allocates the target volume to the original tier.

Figure 23:
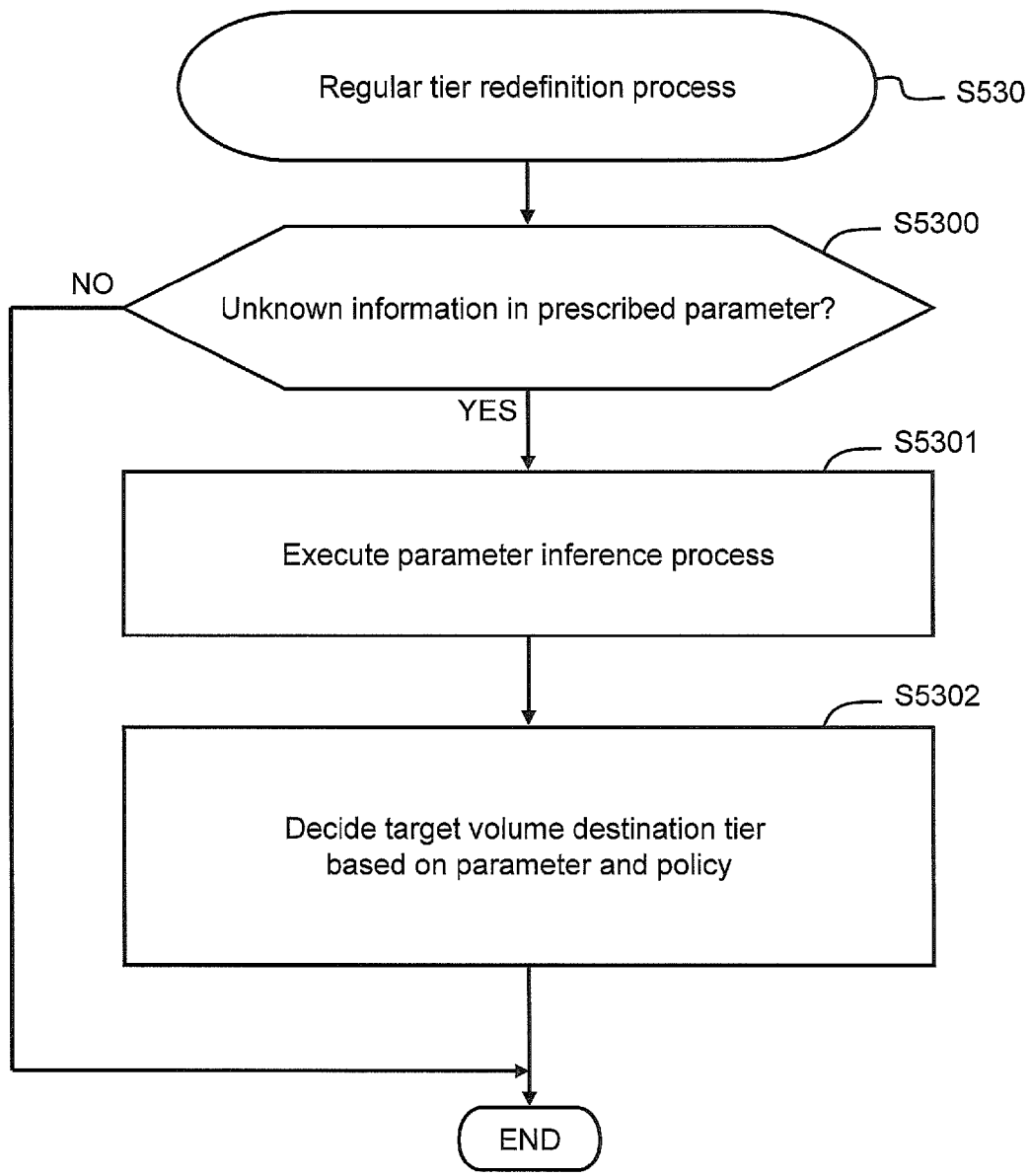
FIG. 23 is a flowchart of a tier redefinition process that is executed regularly.

FIG. 23 shows the details of the regular tier redefinition process (S530). The first storage apparatus 10 refers to the volume management table T10 and determines whether or not there is a logical volume for which a portion of the prescribed parameters is unknown (S5300).

The first storage apparatus 10, in a case where there is an unknown parameter with respect to a target volume (S5300: YES), executes the parameter inference process described using FIG. 18 with respect to this target volume (S5301).

The first storage apparatus 10 decides the tier to which the target volume should be allocated based on a parameter, which has been inferred anew, and the tier decision policy (S5302).

Furthermore, in a case where there are no unknown parameters with respect to a target volume (S5300: NO), this processing ends. Instead of this, the configuration may be such that a new parameter is acquired and the allocation destination of the target volume is reconfigured regardless of the presence or absence of an unknown parameter. For example, in a case where a tier decision policy that has the response time as the criteria is used, the allocation destination of the target volume can also be changed based on an average value of the response times during a recent prescribed period of time.

In this example, which is configured like this, the performance of a pool volume for providing a real page to the virtual volume 133 is assessed, and this pool volume is allocated to an appropriate tier 132 of the respective tiers 132. Therefore, in this example, a virtual volume 133 can be created at low cost without lowering pool performance (that is, without causing a drop in virtual volume performance resulting from using the externally coupled volume as the pool volume).

In this example, in a case where a portion of the prescribed parameters that serve as performance information is unknown, this unknown parameter can be inferred. Therefore, for example, the externally coupled volume 130V can be allocated to an appropriate tier even in a case where the external volume 230 in a second storage apparatus 20 manufactured by a different company is coupled to this externally coupled volume 130V.

In this example, volume performance and storage apparatus performance can be inferred by issuing an IO request for testing purposes. Therefore, even an external storage apparatus for which details are unknown can be used in accordance with the performance thereof, thereby enhancing usability.

In this example, a volume of unknown performance is allocated to a lower level tier. Therefore, it is possible to inhibit the allocation of a volume of unknown performance to a higher level tier and a drop in pool performance.

In this example, the performance of the migration-source volume and the performance of the migration-destination volume are compared, and the propriety of a page migration is decided. Therefore, it is possible to inhibit the migration of target page data to a pool volume with lower performance than the pool volume to which it currently belongs.

Example 2

A second example will be explained by referring to FIGS. 24 through 39. Each of the following examples, to include this example, is equivalent to a variation of the first example. Therefore, the explanations will focus on the differences with the first example. In this example, a management server 40 acquires performance information (prescribed parameters) and manages the configuration of the tiers.

The management server 40, in order to manage the computer system, can detect the communication status between the first storage apparatus 10 and the second storage apparatus 20 relatively easily. The management server 40 controls the tier configuration by taking this communication status into account as well. This communication status can also be seen as part of the performance of the second storage apparatus 20. The following explanation will give as an example a case in which a pool volume is newly registered in a certain pool.

Figure 24:
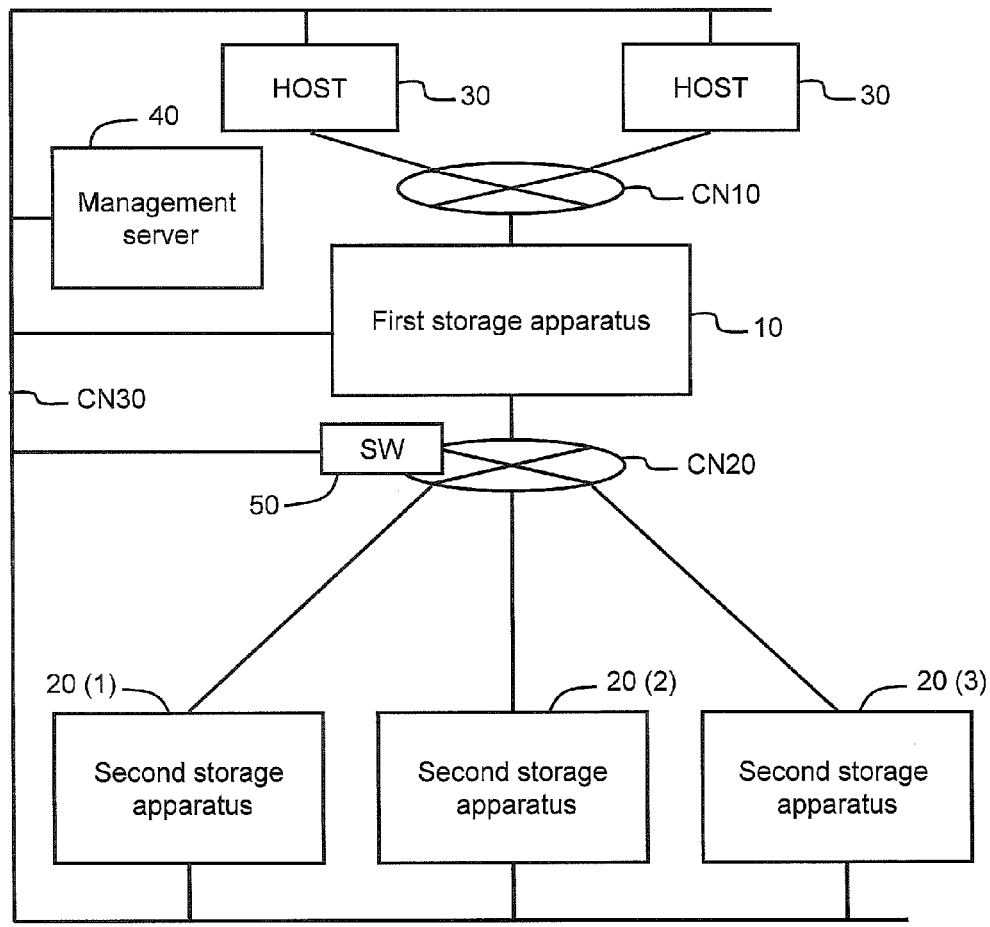
FIG. 24 is diagram of an entire computer system comprising a storage system related to a second example.

FIG. 24 shows the overall configuration of this example. The management server 40 is coupled to the respective storage apparatuses 10 and 20, each host 30, and a switch 50 via a communication network CN30 for management use. The management communication network CN30, for example, is a LAN (Local Area Network).

The management server 40 and the respective storage apparatuses 10 and 20 are coupled via management interface circuits 103, 203, and 403, and the communication network CN30. Furthermore, in a case where a mechanism such as a command device exists for managing a storage apparatus in accordance with an in-band method, the management server 40 may use this mechanism.

Figure 25:
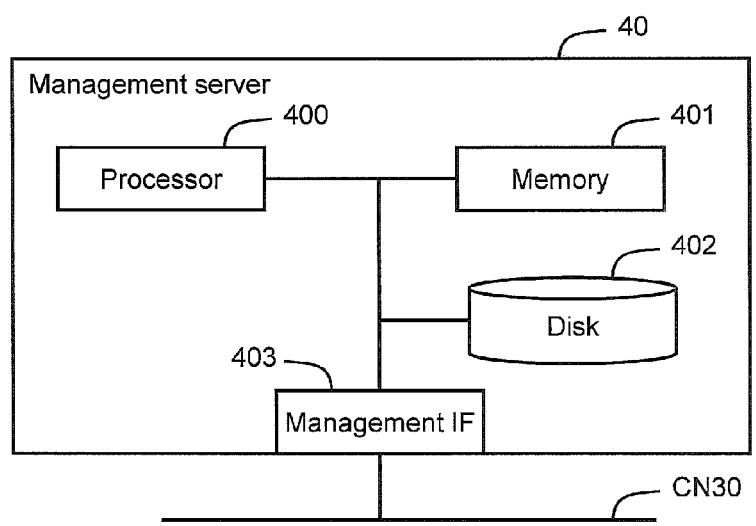
FIG. 25 is a hardware block diagram of a management server.

FIG. 25 shows the hardware configuration of the management server 40. The management server 40, for example, comprises a microprocessor 400, a memory 401, a disk 402, and a management interface circuit 403.

Figure 26:
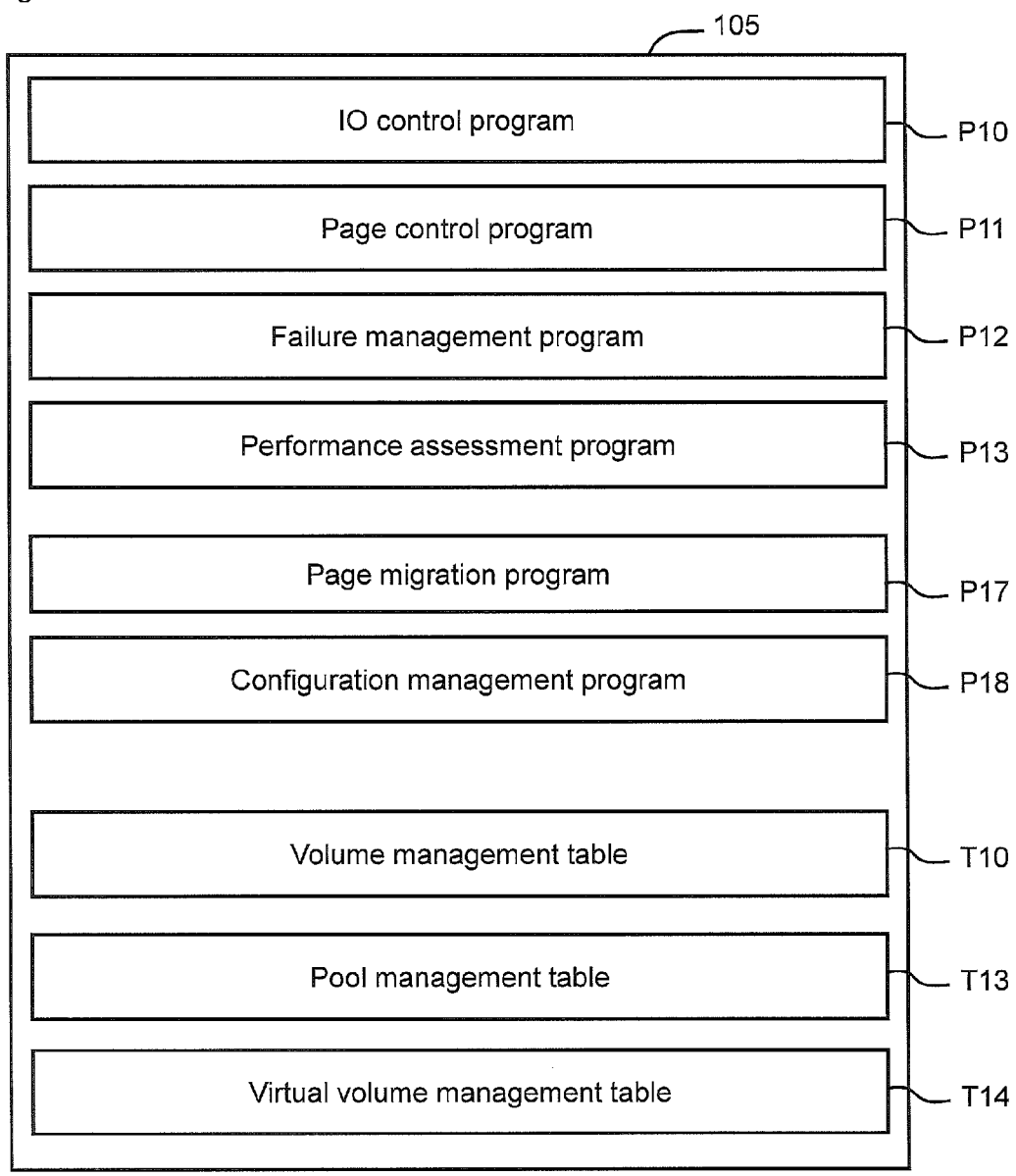
FIG. 26 is an illustration showing the contents of the memory of the first storage apparatus.

FIG. 26 shows the contents stored in the memory 105 of the first storage apparatus 10 in this example. Compared to FIG. 5, the first storage apparatus 10 of this example does not comprise the tier definition program P14, the tier redefinition program P15, the performance information acquisition program P16, the storage performance table T11, the drive performance table T12, and the tier decision policy T15. These, as will be described further below, are disposed in the management server 40. Furthermore, a configuration management program P18 of this example comprises a function for responding with configuration information in response to a query from the management server 40.

Figure 27:
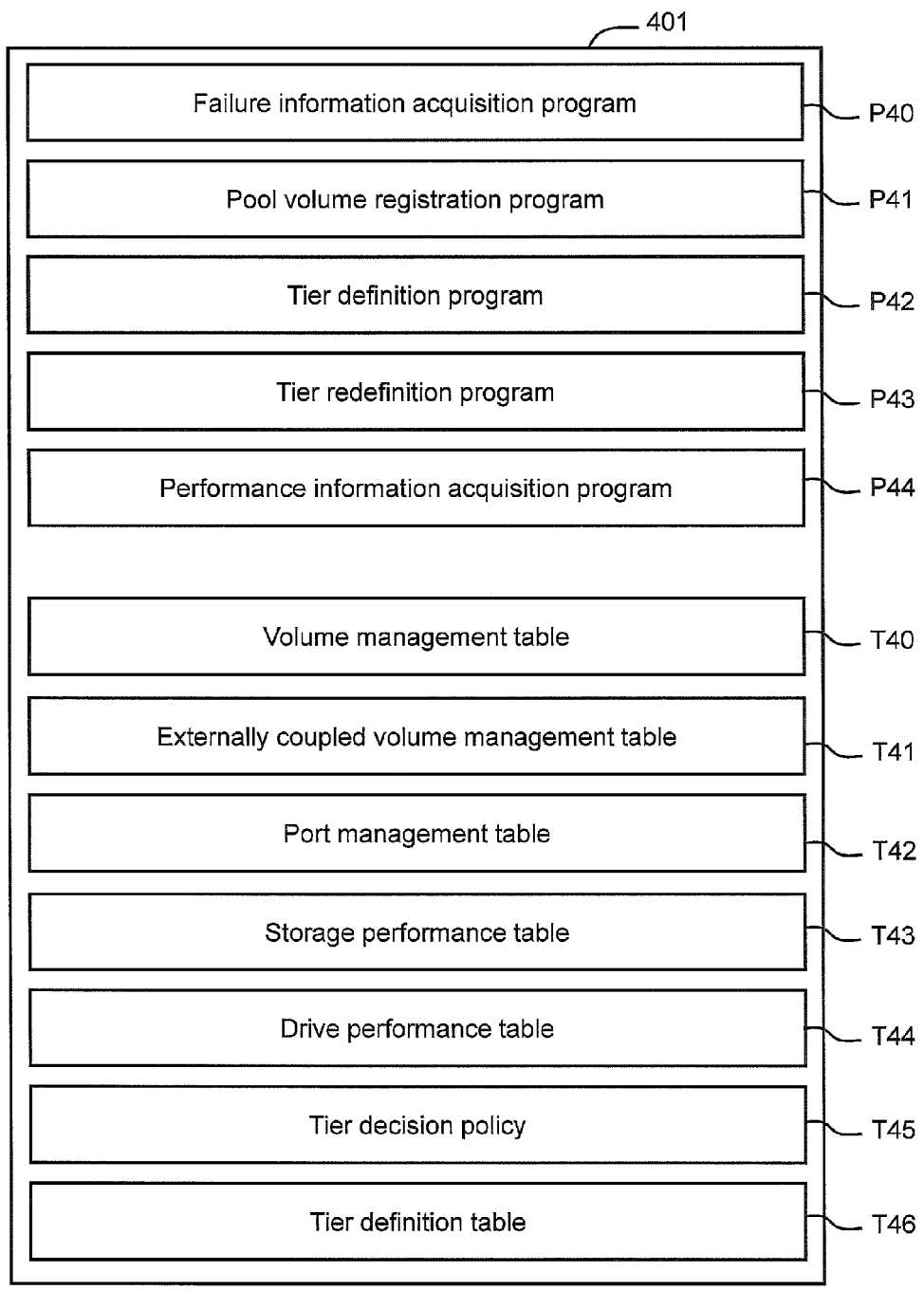
FIG. 27 is an illustration showing the contents of a memory of the management server.

FIG. 27 shows the contents stored in the memory 401 of the management server 40. Multiple computer programs P40 through P44, and multiple tables T40 through T46 are stored in the memory 401 of the management server 40.

A failure information acquisition program P40 is for monitoring the respective storage apparatuses 10 and 20 and the switch 50 (refer to FIG. 28), and detecting a failure. A detected failure is used for redefining a tier in accordance with a tier redefinition program P43, which will be described further below.

A pool volume registration program P41 is for registering a pool volume in the pool 131 on the basis of an instruction from the administrator or other user. How a pool is created will be described further below using another example.

A tier definition program P42 is for deciding an allocation-destination tier in accordance with the performance of the logical volume.

A tier redefinition program P43 is for assessing whether or not the allocation destination with respect to the volume registered as the pool volume is appropriate, and revising the allocation-destination tier.

A performance information acquisition program P44 is for acquiring prescribed performance information (prescribed parameters) from the respective storage apparatuses 10 and 20, and the switch 50.

Of the tables T40 through T46, the tables that differ from the first example will be explained using the drawings.

Figure 28:
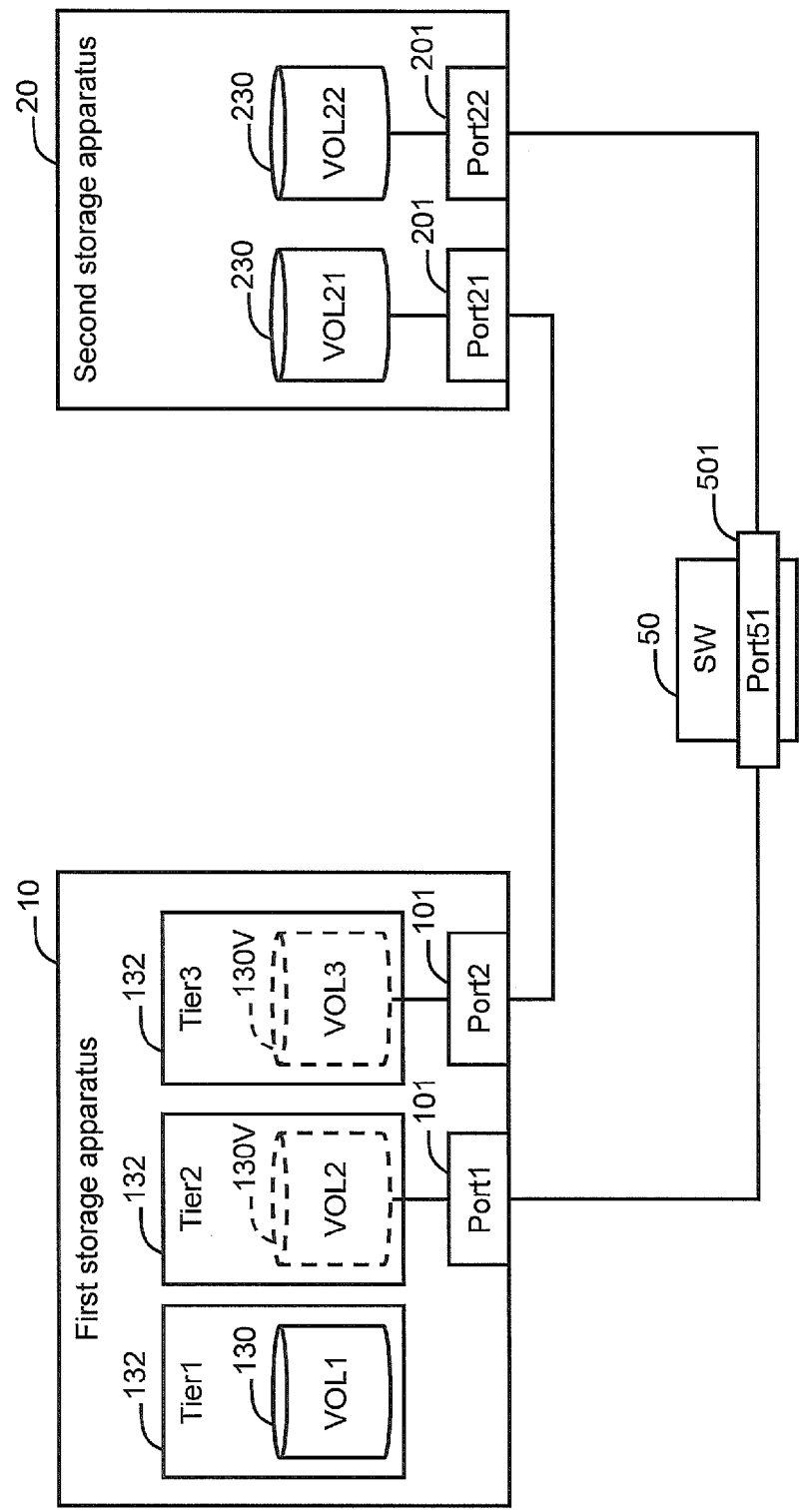
FIG. 28 is an illustration showing how the first storage apparatus and the second storage apparatus are coupled by way of a switching apparatus.

FIG. 28 is a schematic diagram showing the overall concept of this example. In this example, the first storage apparatus 10 and the second storage apparatus 20 are coupled via the switch 50.

For example, an externally coupled volume 130V (VOL2) of the first storage apparatus 10 is directly coupled to an external volume 230 (VOL21) of the second storage apparatus 20. Alternatively, another externally coupled volume 130V (VOL3) of the first storage apparatus 10 is coupled to another external volume 230 (VOL22) of the second storage apparatus 20 via a communication port 501 of the switch 50.

Figure 29:
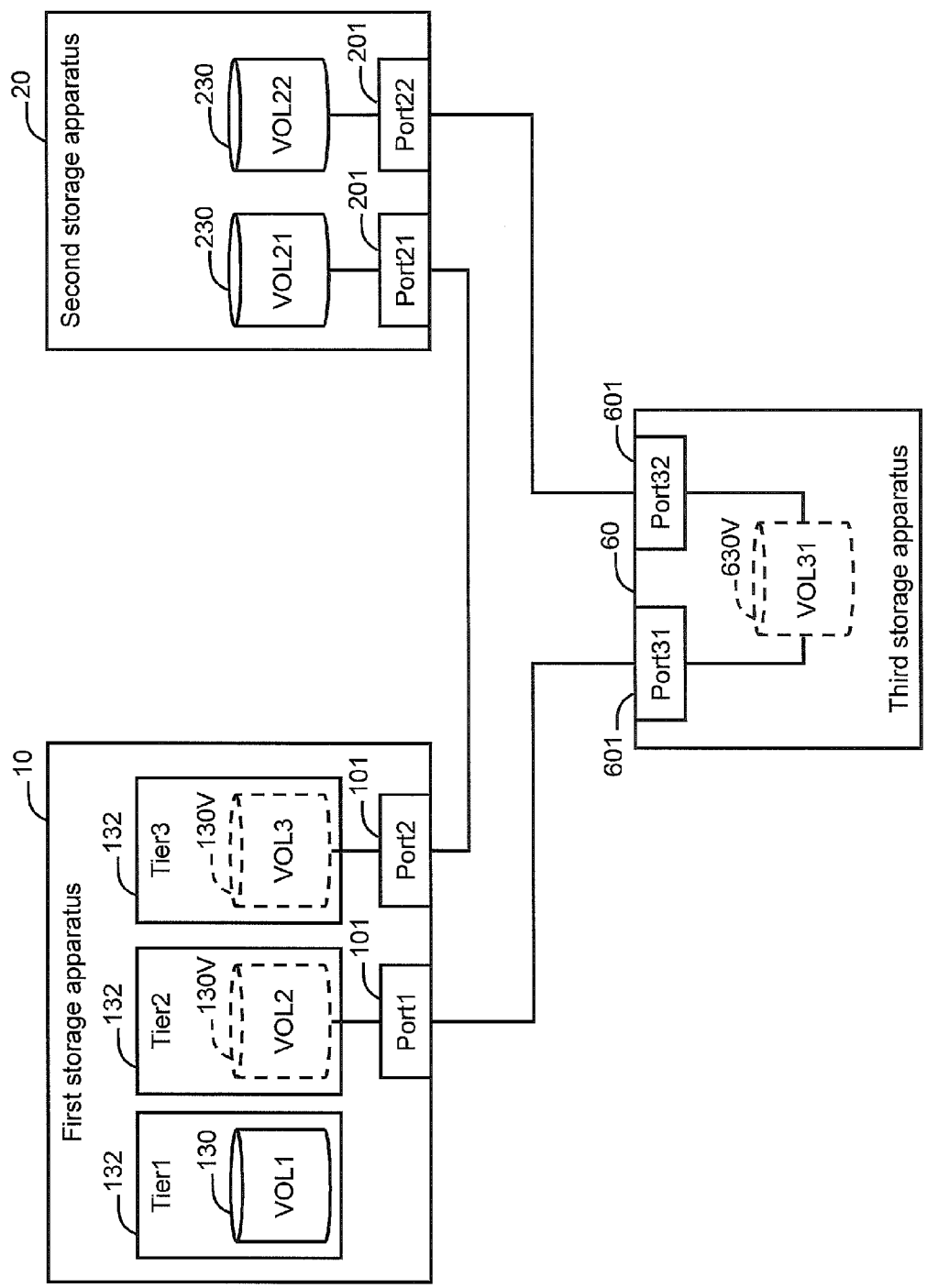
FIG. 29 is an illustration showing how the first storage apparatus and the second storage apparatus are coupled by way of another switching apparatus.

FIG. 29 shows a variation of the overall concept of this example. A third storage apparatus 60 can be used instead of the switch 50 shown in FIG. 28.

The third storage apparatus 60 is a relay storage apparatus for carrying out relaying between the first storage apparatus 10 and the second storage apparatus 20 via a virtual volume. The third storage apparatus 60 is configured as a controller comprising a virtualization function, and does not need to comprise a storage device. The third storage apparatus 60, for example, comprises a communication port 601 and a virtual volume 630V for relaying purposes. Although omitted from the drawing, the third storage apparatus 60 also comprises a controller.

The relay volume 630V is a virtual volume for carrying out relaying between the externally coupled volume 130V and the external volume 230, and associates the address space of the externally coupled volume 130V with the address space of the external volume 230.

FIG. 30 shows an example of the configuration of the volume management table T40 of this example. The volume management table T40 comprises columns C400 through C406, which are the same as the columns C100 through C106 of the volume management table T10 described in FIG. 7.

The volume management table T40 also comprises a utilization status column C407. The utilization status column C407 stores the utilization status of the logical volume. For example, in a case where a logical volume is allocated to the host 30 or coupled externally, "in use" is configured in the utilization status column C407. In a case where the logical volume is not being used, "unused" is configured in the utilization status column C407. An external volume 230 in the unused state can be registered in the pool 131 via the externally coupled volume 130V.

FIG. 31 shows the configuration of a table T41 for managing the externally coupled volume. The externally coupled volume management table T41, for example, comprises a volume ID column C410, a storage ID column C411, an external storage ID column C412, a substantial volume ID column C413, a Potential IOPS column C414, a communication path column C415, a usable bandwidth column C416, and a number of hops column C417.

The volume ID column C410 stores information for identifying an externally coupled volume 130V. The storage ID column C411 stores information for identifying a storage apparatus (the first storage apparatus 10 here) comprising the externally coupled volume 130V. The external storage ID column C412 stores information for identifying a storage apparatus (the second storage apparatus 20 here) comprising the external volume that is coupled to the externally coupled volume 130V.

The substantial volume ID column C413 stores information for identifying the external volume 230 that provides a real storage area to the externally coupled volume 130V. That is, the column C413 is for identifying the external volume 230 coupled to the externally coupled volume 130V.

The Potential IOPS column C414 stores the Potential IOPS of the external volume 230. The communication path column C415 stores information for identifying the communication path that couples the externally coupled volume 130V to the external volume 230. For example, information that identifies the communication ports on the communication path is stored in the communication path column C415 according to the communication sequence.

An upper limit value of the bandwidth capable of being used by the communication path between the externally coupled volume 130V and the external volume 230 (may be called the communication path for external coupling) is stored in the usable bandwidth column C416. The number of switches or relay storage apparatuses 60 (virtualization controllers) that exist on the communication path for external coupling is stored in the number of hops column C417.

FIG. 32 shows the configuration of the port management table T42. The port management table T42 is for managing the performance of a communication port, and, for example, comprises a port ID column C420, a device ID column C421, a processing performance IOPS column C422, a maximum IOPS column C423, and a performance capacity IOPS column C424.

Information for identifying a communication port is stored in the port ID column C420. Information for identifying the device in which a communication port is disposed is stored in the device ID column C421.

An upper limit value of the IOPS capable of being processed by the communication port is stored in the processing performance IOPS column C422. A maximum value of the IOPS processed by the communication port within a certain fixed time period is stored in the maximum IOPS column C423. The IOPS additionally capable of being processed during the certain fixed time period is stored in the performance capacity IOPS column C424.

For example, the upper limit value of the processable IOPS for the communication port (port 1) is 3000, and a maximum of 1300 IOPS are processed during a certain fixed time period. Therefore, the performance capacity IOPS works out to 1700 (=3000-1300). This communication port (port 1) can process the remaining 1700 IOPS.

The port management table T42, for example, is updated by the performance information acquisition program P44 regularly collecting information from the storage apparatuses 10 and 20.

Figure 33:
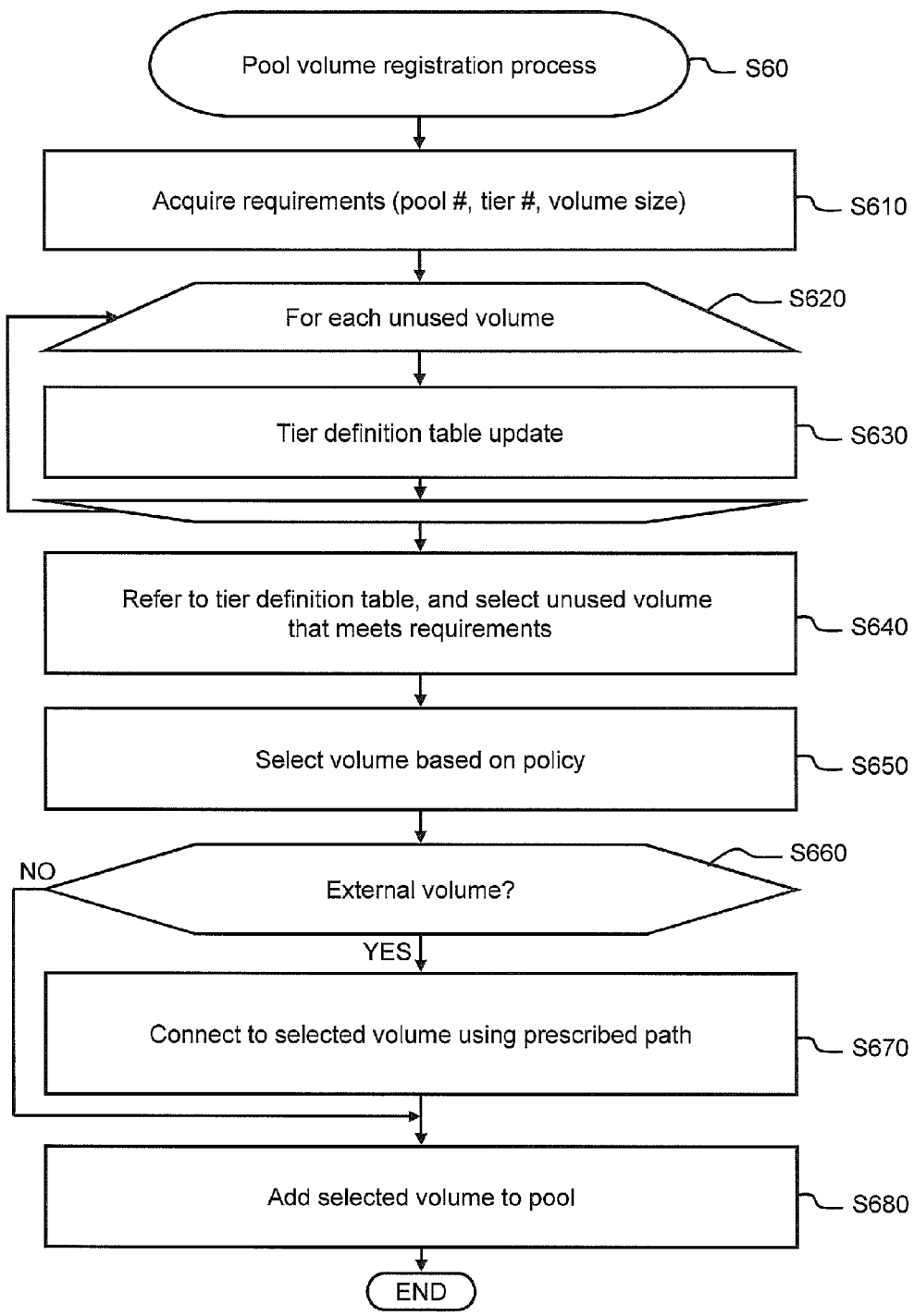
FIG. 33 is a flowchart showing a process for registering a pool volume in a pool.

FIG. 33 is a flowchart showing the process for registering a pool volume. The pool volume registration process (S60) is realized by the microprocessor 400 of the management server 40 executing the pool volume registration program P41 stored in the memory 401. In the pool volume registration process, when the management server 40 is requested to add a volume to the pool, the management server 40 selects an appropriate volume that corresponds to the conditions and registers this volume in the pool.

Furthermore, a case in which multiple unused volumes have already been created, and an unused volume with a capacity that meets the registration condition is selected from thereamong and registered in the pool 131 will be explained. Instead of this, the configuration may also be such that an unused volume that matches the conditions is newly created and registered in the pool 131 in a case where a condition-matching unused volume does not exist.

The management server 40, for example, receives the conditions for adding a volume via an add volume screen G10 (refer to FIG. 34), which will be explained further below (S610). The add volume conditions, for example, comprise the number of the pool to which the volume is to be added, the number of the tier in which the additional volume is to be allocated, and the volume size to be added.

The management server 40 acquires a list of unused volumes from the volume management table T40, and executes a tier definition table update process (S630), which will be described further below, for each unused volume (S620). The performance in a case where an unused volume has been registered in the pool is computed in accordance with the tier definition table update process.

Furthermore, a volume, which is not desired to be used as a pool volume from among the unused volumes, can also be removed from the pool volume candidates by configuring a flag denoting banned.

The management server 40 refers to the tier definition table T46 (refer to FIG. 37), selects unused volumes that match the registration conditions as pool volume candidates, and configures these candidates in order of priority based on a volume selection policy (S640). It is preferable that the unused volume to be added to the pool either comprise the same capacity as the capacity specified in the registration conditions, or comprise a capacity whose difference with the specified capacity is equal to or larger than a prescribed value.

The management server 40 selects the most appropriate volume from among the pool volume candidates in accordance with the volume selection policy (S650). The volume selection policy can be registered beforehand in the management server 40, or can be specified by the user as needed.

Volume selection policies, for example, can include (1) preferentially select an internal volume; (2) select a volume with the most IOPS in a case where multiple volumes can belong to the same tier; and (3) select the volume with the largest capacity (or the smallest capacity) in a case where multiple volumes have the same attribute (for example, the same drive type).

In a case where none of the pool volume candidates satisfies the volume selection policy, the management server 40 returns an alert and ends this processing. Or, in a case where absolutely no pool volume candidates exist, the management server 40 may change either all or a portion of the registration conditions, and reassess each of the unused volumes. In addition, in a case where the registration conditions are changed, the management server 40 may present the changed condition (s) to the user to obtain the users consent.

The management server 40 determines whether or not the volume selected in accordance with the volume selection policy is an external volume (S660). In a case where an external volume was selected (S660: YES), the management server 40 couples the external volume 230 in the second storage apparatus 20 to the externally coupled volume 130V in the first storage apparatus 10 via a communication path computed using the tier definition program P42. In a case where the selected volume is either an internal volume or an externally coupled volume 130V already coupled to an external volume (S660: NO), the management server 40 skips 5670 and moves to S680.

The management server 40 instructs the first storage apparatus 10 to add the selected volume to a specified pool 131 as a pool volume (S680). The first storage apparatus 10 adds the selected volume to a specified tier in the specified pool in accordance with the instruction from the management server 40.

Figure 34:
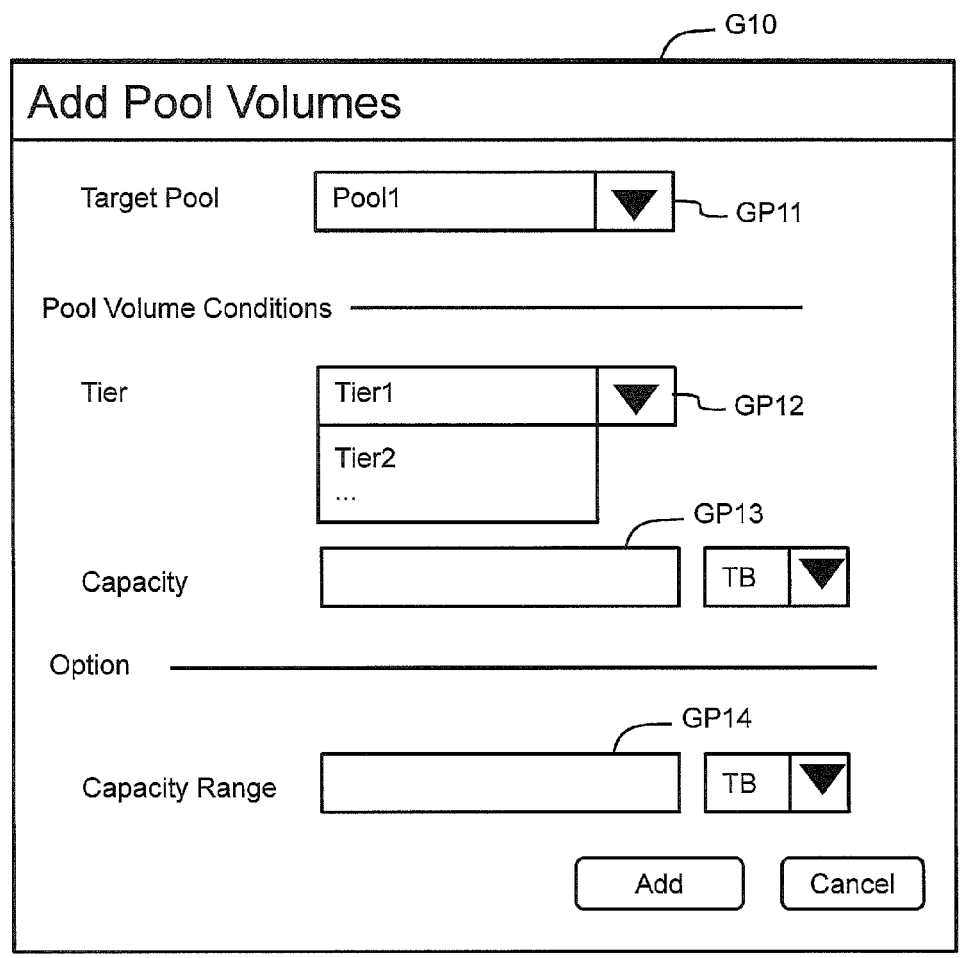
FIG. 34 is a screen for adding a pool volume to a pool.

FIG. 34 shows an example of a screen G10 for adding a pool volume. The management server 40 can provide the add pool volume screen G10 to the user via a graphical user interface (GUI).

The screen G10, for example, can comprise an area GP11 for specifying a pool which will add a volume, an area GP12 for specifying a tier to which the volume will be added, an area GP13 for specifying the capacity of the pool volume to be added, and an area GP14 for specifying the margin for error of the pool volume capacity. In a case where the margin for error is 1 GB and the specified capacity is 10 GB, a pool volume candidate will be selected within a range of 9 through 11 GB.

The tier, which denotes the volume migration destination, may be specified using a tier ID, or may be specified using the value of the tier-required IOPS. Furthermore, in a case where a pool volume candidate cannot be found, either an error message or a message requesting a change of registration conditions may be displayed on the screen G10. In addition, a screen, which automatically changes the registration conditions and proposes a post-condition change pool volume to the user, may be outputted.

Figure 35:
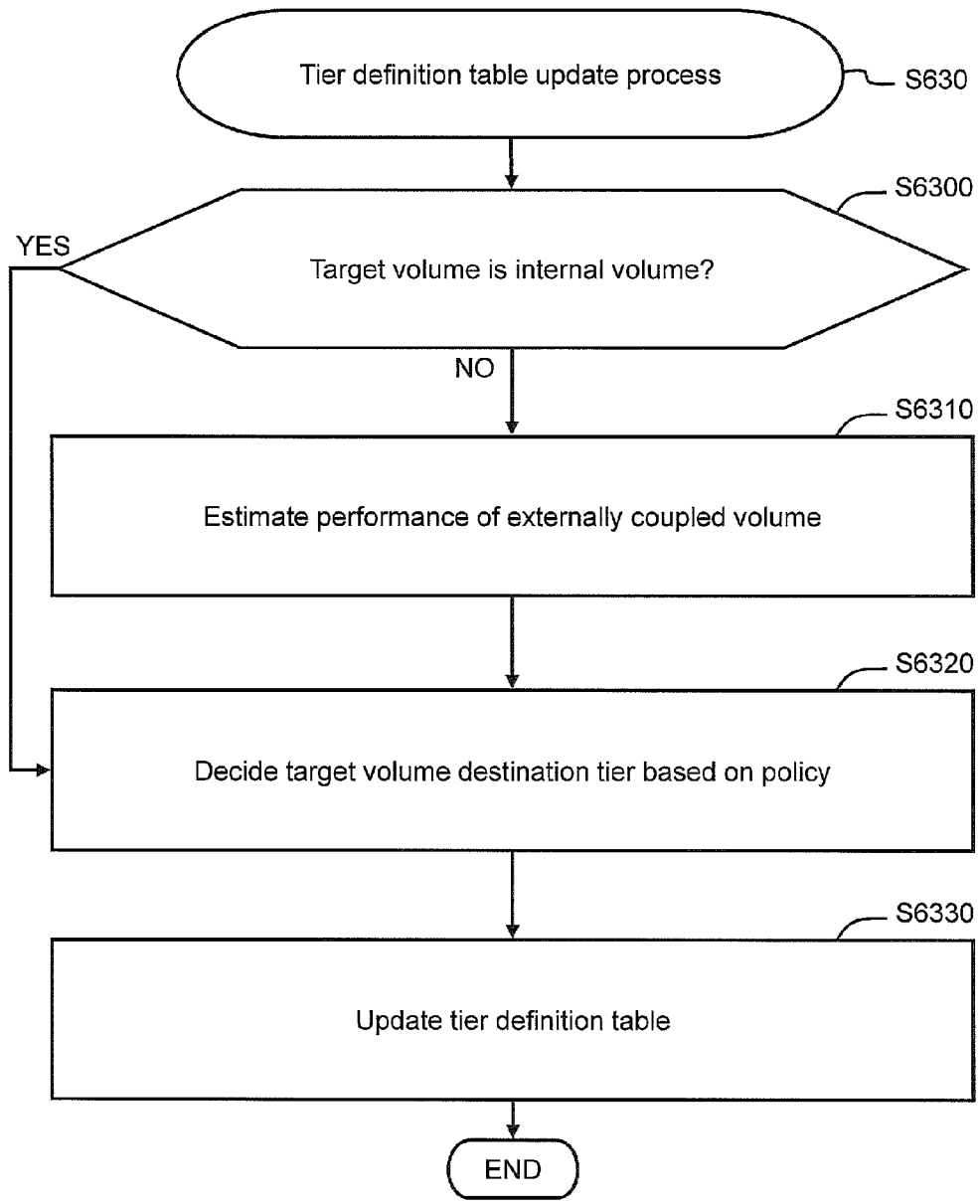
FIG. 35 is a flowchart of a process for defining a tier.

FIG. 35 is a flowchart showing the details of the tier definition table updating process (S630). The processing of FIG. 33 was described as one for specifying the tier to which the pool volume should be added, but in this process, the tier to which the selected volume is to be allocated is decided on the basis of this volume's performance.

The management server 40 determines whether or not the selected volume (the volume that constitutes the target in this process) is an internal volume (S6300). In a case where the selected volume is an internal volume (S6300: YES), the management server 40 proceeds to a tier decision process (S6320). In a case where the selected volume is not the internal volume 130 (S6300: NO), the management server 40 estimates the performance of the externally coupled volume 130V (S6310). The management server 40 decides the tier that will allocate this externally coupled volume 130V based on the performance of the externally coupled volume 130V and a tier decision policy (S6320).

The tier decision method is the same as that of the first example. In a case where there is an unknown parameter, an inference may be made using the parameter inference process. In this example, since the status of the communication path coupling the externally coupled volume 130V to the external volume 230 is also an assessment target, it is preferable that the tiers be sorted on the basis of IOPS rather than volume attributes.

The tier decision policy applied to an internal volume and the tier decision policy applied to an external volume may be different. For example, the volume attributes-based tier decision policy T15A shown in FIG. 12 can be used with respect to an internal volume. The IOPS-based tier decision policy T15B shown in FIG. 13 can be used with respect to an external volume.

The number of hops of the external coupling communication path can be added to the tier decision policy T15B. For example, a tier can be defined by taking into account both the number of hops and the IOPS, such that in a case where the IOPS is equal to or larger than 1000 and the number of hops is 0, the volume is allocated to tier 1, and in a case where the IOPS is equal to or larger than 1000 and the number of hops is equal to or larger than 1, the volume is allocated to tier 2, and so forth. In addition, a tier decision policy can be created by combining the number of hops and the volume attributes (the drive type and the like). In addition, the configuration may also be such that the tier is defined based solely on the number of hops. For example, the tier can be defined such that a number of hops of 0 defines tier 1, a number of hops of 1 defines tier 2, and a number of hops of 2 or more defines tier 3.

Furthermore, the volume management table T40, which is used for deciding the volume allocation-destination tier, is updated beforehand by the performance information acquisition program P44. Instead of this, the configuration may be such that the volume management table T40 is updated to the latest status at the time the tier definition table updating process (S630) is executed. That is, the configuration may be such that the volume management table T40 is updated using the tier definition table updating process.

The management server 40 registers the allocation-destination tier and attribute values of the volume that was selected as the pool volume in the tier definition table T46 (S6330).

Figure 36:
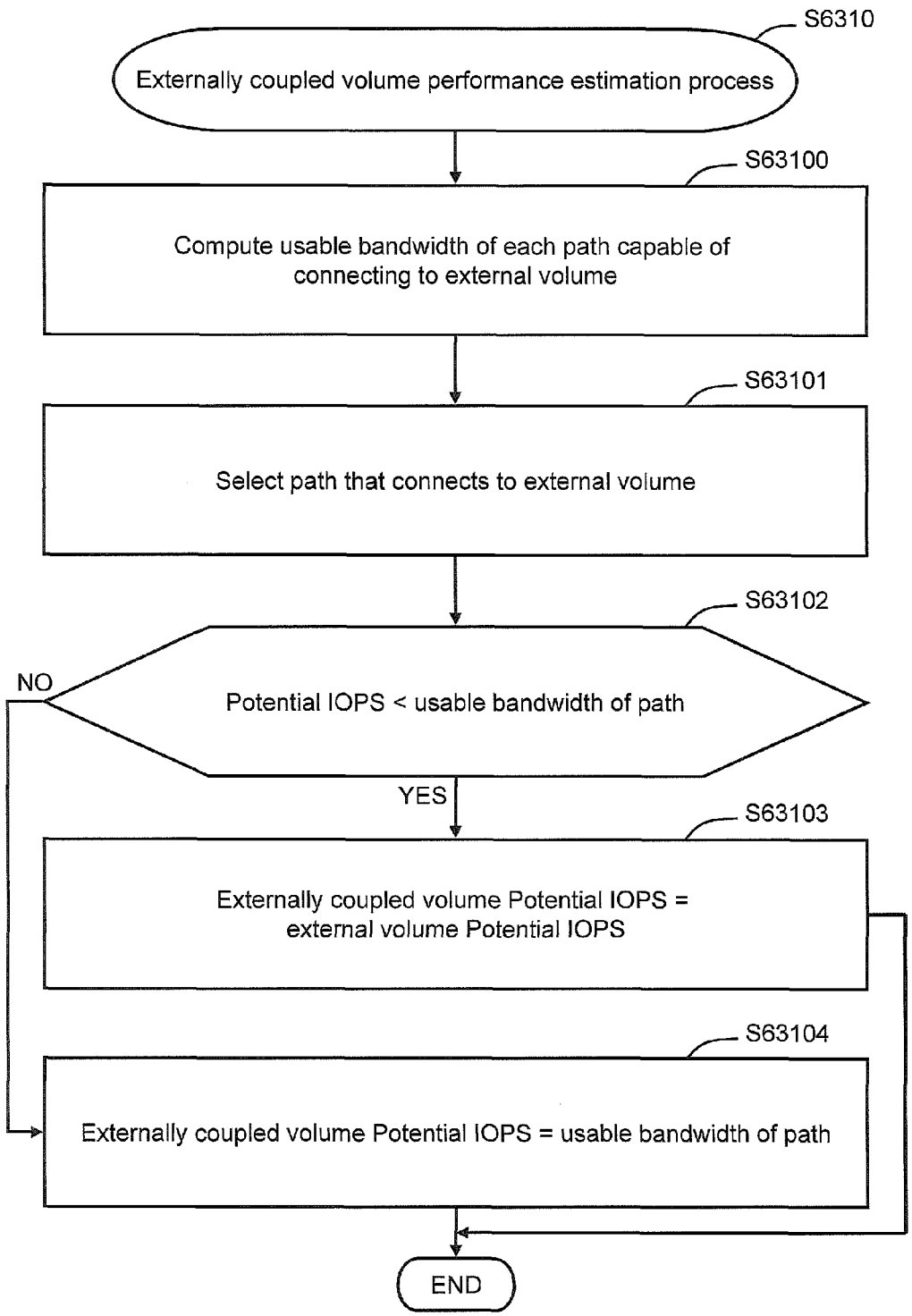
FIG. 36 is a flowchart showing a process for estimating the performance of an externally coupled volume.

FIG. 36 is a flowchart showing the details of the process for estimating the performance of the externally coupled volume (S6310). In this process, prediction is made for the performance in a case where an unused volume (an external volume) in the second storage apparatus 20 is used.

The management server 40 respectively computes the usable bandwidths of each communication path capable of coupling the target external volume to an externally coupled volume (S63100).

The usable bandwidth is computed as the value of whichever is the smaller of the performance capacity IOPS of the communication port (source port) 101 of the first storage apparatus 10 and the performance capacity IOPS of the communication port (destination port) 201 of the second storage apparatus 20. The performance capacity IOPS (C424) is the value obtained by subtracting the IOPS (C423) currently being used from the maximum IOPS (C422) that the communication port is capable of processing.

In a case where multiple external volumes are to be coupled, the IOPS being used by the other external volume can also be taken into account. For example, in a case where the one external volume and the other external volume use the same communication path, the value obtained by subtracting the amount of communications (IOPS) being used by the one external volume from the performance capacity IOPS of this communication path is used as the usable bandwidth.

In a case where a switch or other such relay apparatus exists partway along the external coupling communication path, the performance of the relay apparatus may also be taken into account. For example, in a case where a communication port with a performance capacity IOPS of 2000 is directly coupled to a communication port with a performance capacity IOPS of 900, the usable bandwidth of the communication path becomes 900. In a case where a switch is interposed between this communication port and the performance capacity IOPS of this switch is 400, the usable bandwidth will become 400. The switch becomes a bottleneck, and as such, lowers the value of the usable bandwidth.

The management server 40 selects the communication path to be used as the external coupling communication path based on the computed usable bandwidth (S63101). For example, the management server 40 selects the communication path with the largest usable bandwidth.

Of the communication paths that comprise usable bandwidths of equal to or larger than the Potential IOPS of the external volume, the communication path comprising the usable bandwidth that differs the least from the Potential IOPS may be selected. In a case where a communication path that comprises a usable bandwidth of equal to or larger than the Potential IOPS of the external volume does not exist, the communication path with the largest usable bandwidth may be selected. The Potential IOPS can be considered to be an indicator denoting the performance limit of a volume.

Selecting the communication path to be used as the external coupling communication path based on selection conditions such as those described above makes it possible to make the most of the performance of the external volume, and, in addition, makes it possible to inhibit a communication path with a larger usable bandwidth than necessary being selected as the external coupling communication path. That is, it is possible to use communication paths in sequence beginning with one with the required usable bandwidth. In accordance with this, a communication path to be used as the external coupling communication path can be appropriately selected, enabling effective use of communication resources. In other words, the likelihood of the communication path becoming a bottleneck is reduced, making it possible to couple an externally coupled volume to an external volume.

The management server 40 determines whether or not the usable bandwidth of the selected communication path is larger than the Potential IOPS of the external volume (S63102). In a case where the usable bandwidth of the selected communication path is larger than the Potential IOPS of the external volume (S63102: YES), the management server 40 uses the value of the communication path usable bandwidth as the Potential IOPS of the externally coupled volume (S63103).

In a case where the Potential IOPS of the external volume is larger than the usable bandwidth of the selected communication path (S63102: NO), the communication path will become a bottleneck, and as such the value of the usable bandwidth is used as the Potential IOPS of the externally coupled volume (S63104).

Furthermore, the management server 40 may compute and store the number of switches or virtualization controllers that exist on each communication path that is an external coupling communication path candidate. The management server 40 can manage the number of hops such that in a case where no switches or the like exist, the number of hops is "0", in a case where one switch is interposed, the number of hops is "1", and in a case where two switches are interposed, the number of hops is "2".

FIG. 37 shows an example of the configuration of the tier definition table T46. The tier definition table T46 defines the configuration of each tier 132. The tier definition table T46, for example, comprises a storage ID column C460, a capacity column C461, a tier column C462, a flag column C463, a drive type column C464, a RAID level column C465, a status column C466, a Potential IOPS column C467, and a number of hops column C468.

The storage ID column C460 stores information for identifying a storage apparatus. The capacity column C461 stores the capacity of a tier. The tier column C462 stores information for identifying a tier. The flag column C463 stores information for making a distinction between a tier-allocated volume that is an internal volume, and a tier-allocated volume that is an external volume. The drive type column C464 stores the drive type of the tier-allocated volume. The RAID level column C465 stores the RAID level and so forth of the tier-allocated volume. The status column C466 stores the status of the tier-allocated volume (for example, unused, in use, failure, RAID reconfiguration in progress). The Potential IOPS column C467 stores the Potential IOPS of the tier-allocated volume. The number of hops column C468 stores the number of hops related to the communication path coupled to the tier-allocated volume. In the case of an internal volume, the number of hops is 0. The number of hops is also 0 in a case where an externally coupled volume and an external volume are directly coupled.

FIG. 38 shows a screen G20 for specifying a tier and adding a pool volume. The screen G20 comprises an area GP21 for denoting the attributes of the volume selected as the pool volume candidate, and an area GP22 for specifying an allocation-destination tier.

For example, a volume capacity, a distinction between an internal volume and an external volume, a drive type, a RAID level, a status, a Potential IOPS, and a number of hops are displayed in the attributes display area GP21. In addition, a performance ranking of the second storage apparatus 20 (High, Middle, and so forth), and information about a switch or other such relay apparatus may also be displayed in the area GP21.

When the user specifies the allocation-destination tier in the area GP21 and operates the OK button, the pool volume registration program P41 of the management server 40 instructs the first storage apparatus 10 to register the pool volume in the specified tier.

FIG. 39 is an example of a screen in a case where the management server 40 automatically decides the allocation destination of a pool volume and proposes this allocation destination to the user. The proposal screen G30, for example, comprises an area GP31 for displaying information related to the pool volume, and an area GP32 for specifying a tier.

In addition to the respective items shown in area GP21 of FIG. 38, the area GP31 also comprises a checkbox, a volume ID, and a proposed tier. Since allocation destinations of multiple pool volume candidates are proposed to the user in the screen G30, a volume ID is displayed so as to be able to distinguish between the respective candidate volumes. The number of the tier computed by the management server 40 is displayed in the proposed tier. In a case where the proposed tier is to be changed, the user specifies the row to be changed using the checkbox, and selects the desired tier in area GP32.

Configuring this example like this achieves the same effects as the first example. In addition, in this example, the management server 40, which manages the respective storage apparatuses 10 and 20, acquires performance information and allocates a logical volume to an appropriate tier.

The management server 40 is able to discern the status of the external coupling communication path between the first storage apparatus 10 and the second storage apparatus 20 relatively easily, and can appropriately assess the performance of the externally coupled volume 130V. Therefore, the externally coupled volume 130V can be allocated to an appropriate tier.

Example 3

A third example will be explained by referring to FIGS. 40 through 42. In this example, the usage of the pool 131 is monitored, and in a case where the usage drops to equal to or lower than a prescribed threshold, an appropriate pool volume, which satisfies the performance conditions, is registered in the pool 131.

Multiple methods for deciding the capacity of the pool volume are possible. For example, the capacity that the pool will need at the end of a prescribed period of time more than at present is predicted based on changes in pool usage, and a pool volume that matches this predicted capacity is selected. In addition, in a case where multiple tiers are formed in the pool, the capacity required for each tier (either the capacity required at the present point in time or the capacity required at a prescribed point in time in the future) can be predicted, and a pool volume can be selected for each tier.

Figure 40:
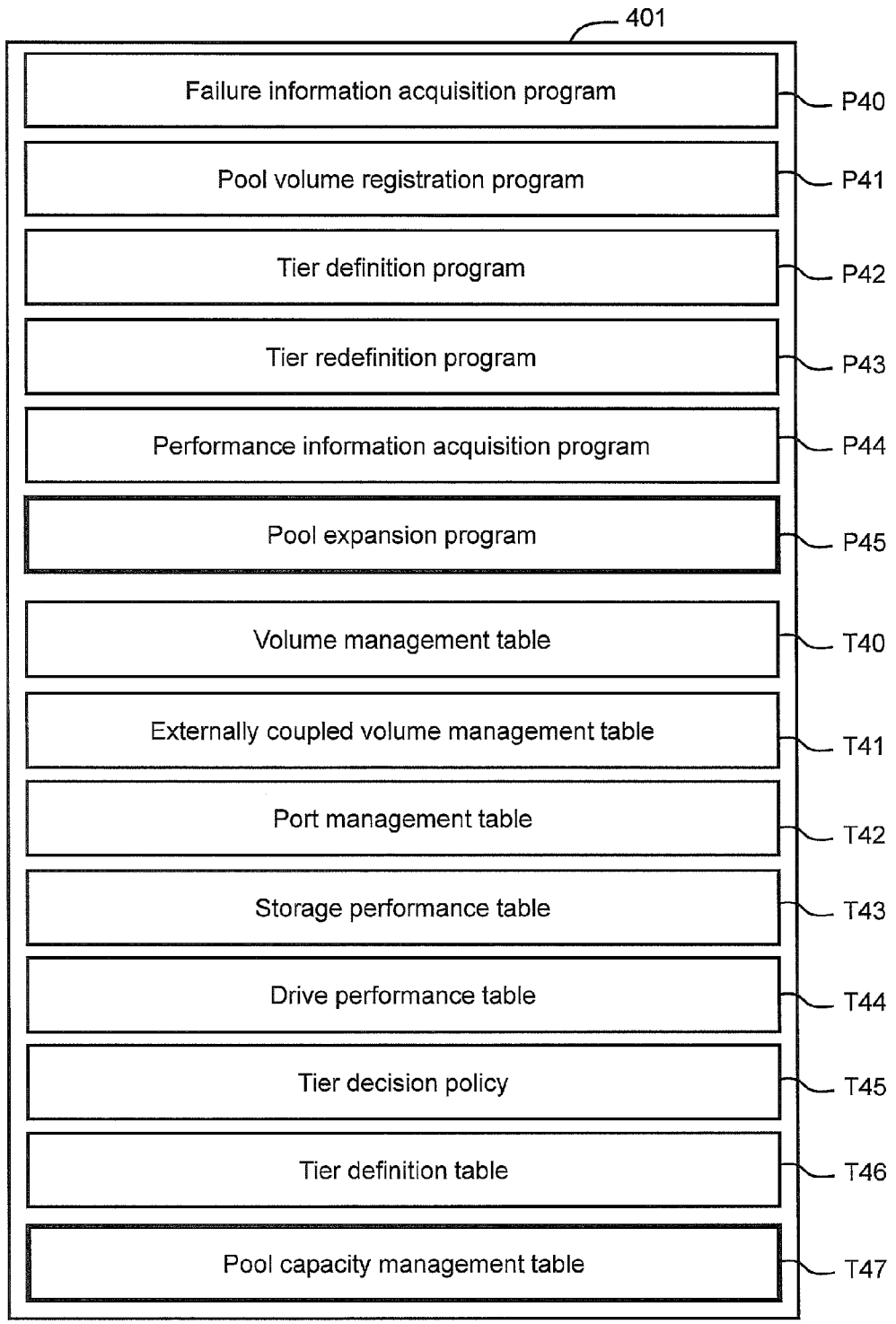
FIG. 40 is an illustration related to a third example showing the contents of a management server memory.

FIG. 40 shows the storage contents of the memory 401 of the management server 40 related to this example. The management server 40 of this example differs from the management server of the second example (refer to FIG. 27) in that this management server 40 comprises a pool expansion program P45 and a pool capacity management table T47.

FIG. 41 shows an example of the configuration of a table T47 for managing the pool capacity. The pool capacity management table T47, for example, comprises a pool ID column C470, a storage ID column C471, a total capacity column C472, a used capacity column C473, and a threshold column C474.

The pool ID column C470 stores information for identifying the pool 131. The storage ID column C471 stores information for identifying the storage apparatus in which the pool is disposed. The total capacity column C472 stores the total pool capacity for each tier. The sum of the maximum capacity of each pool constitutes the total pool capacity.

The used capacity column C473 stores the used pool capacity for each tier. The sum of the used capacity of each tier constitutes the used capacity of the entire pool. The threshold column C474 stores a threshold denoting a trigger for expanding the pool size (adding a pool volume).

Figure 42:
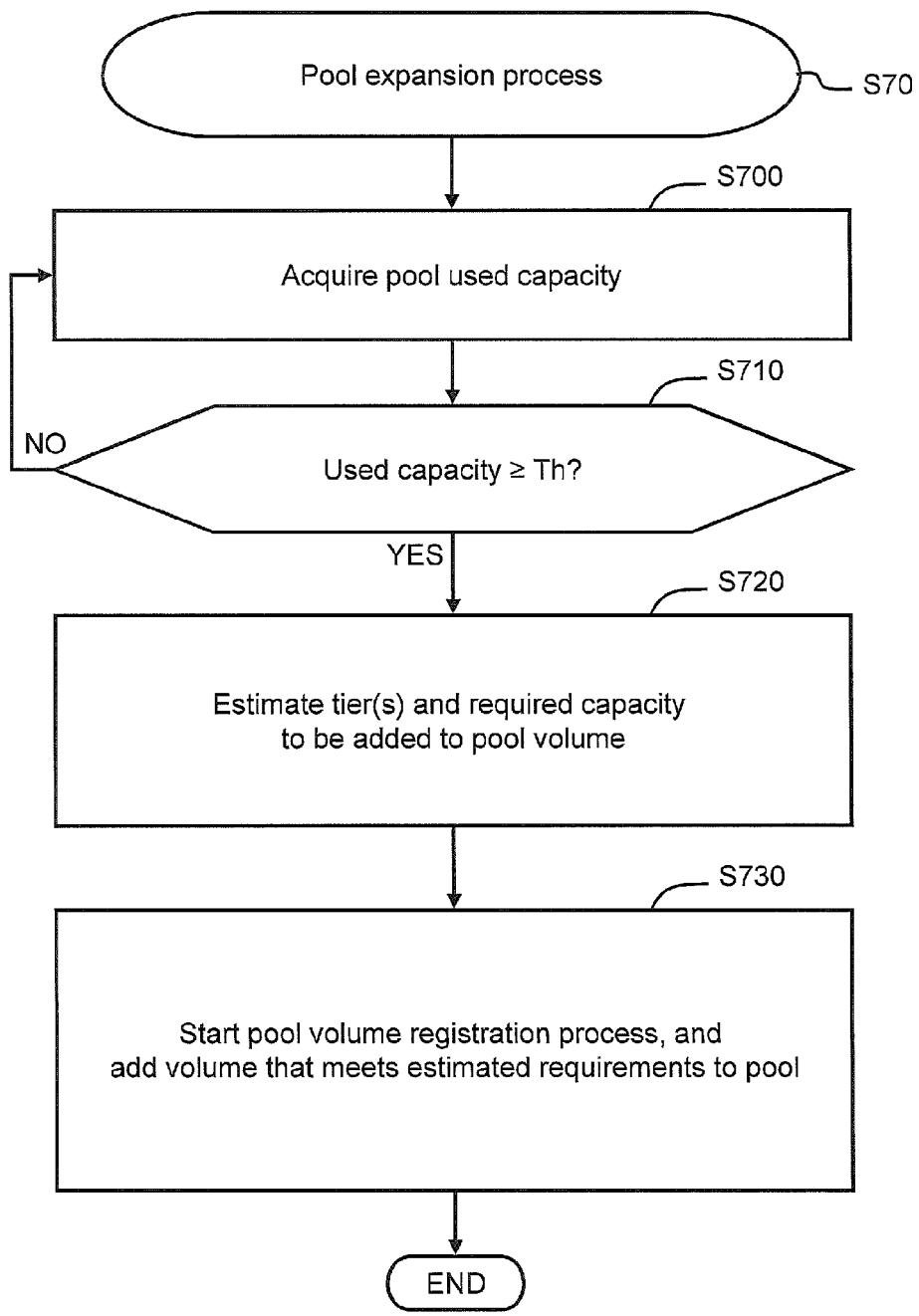
FIG. 42 is a flowchart of a process for automatically expanding a pool capacity.

FIG. 42 is a flowchart showing a pool expansion process. The pool expansion process (S70) is realized by the microprocessor 400 of the management server 40 executing the pool expansion program P45.

The management server 40 acquires the used capacity of the pool from the pool capacity management table T47 (S700), and determines whether or not this used capacity has reached the threshold (Th) (S710). When the used pool capacity has reached the threshold (S710: YES), the management server 40 estimates the tier to which a pool volume should be added, and the capacity that should be added (S720). The management server 40 may increase the accuracy of the estimate of the capacity that should be added by referring to a history that records either the rate of increase of the used pool capacity or changes in the used capacity.

The approximate amount of capacity that should be added to a tier is estimated, and the performance required by this add-destination tier and the capacity to be added comprise the add volume conditions. The management server 40 starts up the pool registration process (S60 of FIG. 33), selects a pool volume that matches the add volume conditions, and registers this pool volume in the pool (S730).

Furthermore, the configuration may also be such that instead of predicting the tier to which the pool volume should be added, the required Potential IOPS is computed, and a volume that satisfies both this Potential IOPS and the capacity that should be added is selected as the pool volume.

Configuring this example like this achieves the same effects as each of the examples described above. In addition, in this example, it is possible to automatically expand the pool 131, thereby enhancing usability.

Example 4

A fourth example will be explained by referring to FIGS. 43 through 45. In the fourth example, a pool 131, which meets a condition specified by the user, is created.

Figure 43:
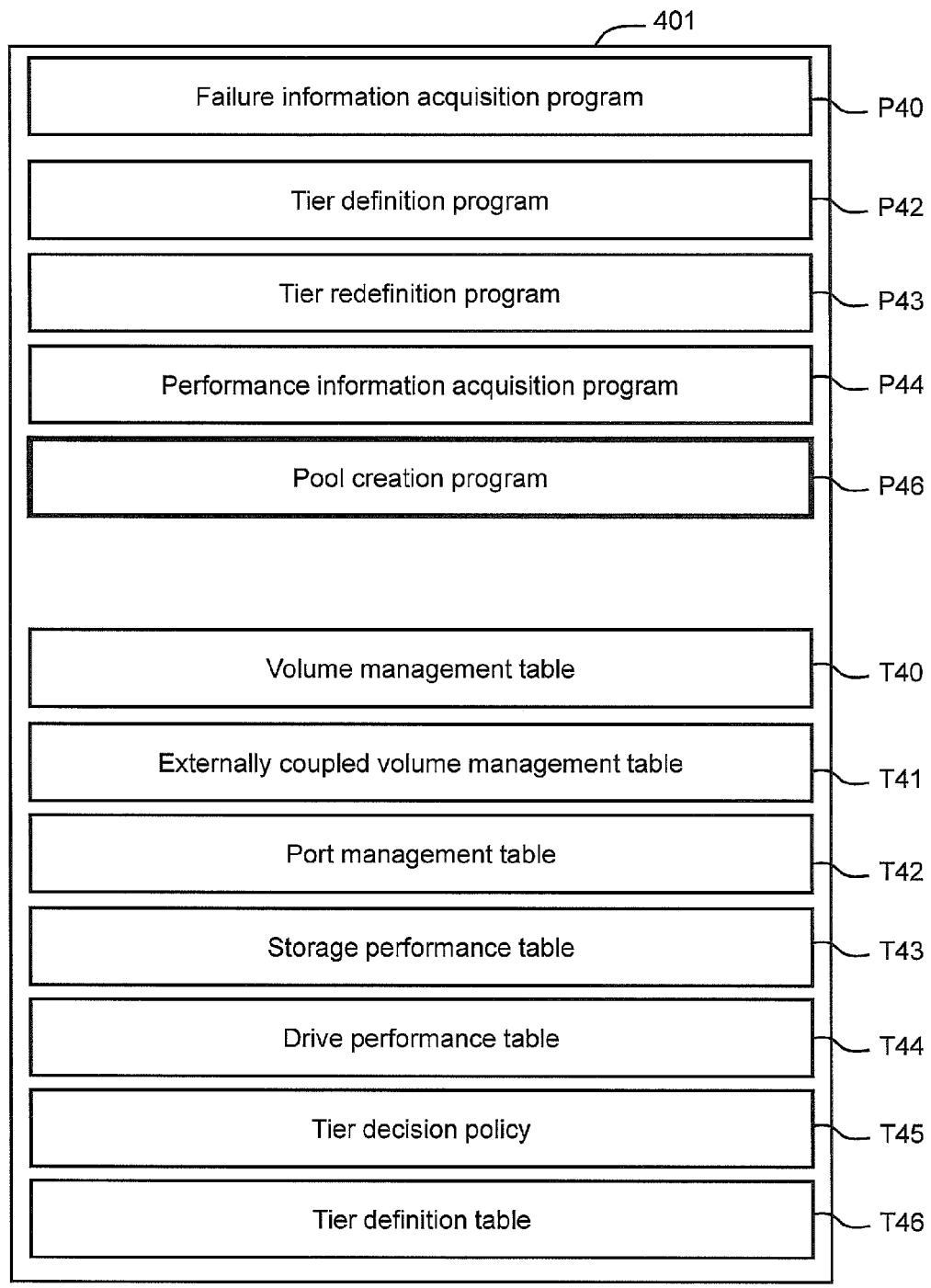
FIG. 43 is an illustration related to a fourth example showing the contents of a management server memory.

FIG. 43 shows the storage contents of the memory 401 of the management server 40 related to this example. The memory 401 shown in FIG. 43 differs from the memory 401 of the second example shown in FIG. 27 in that this memory 401 does not comprise the pool volume registration program P41, and in that a pool creation program P46 has been added.

Figure 44:
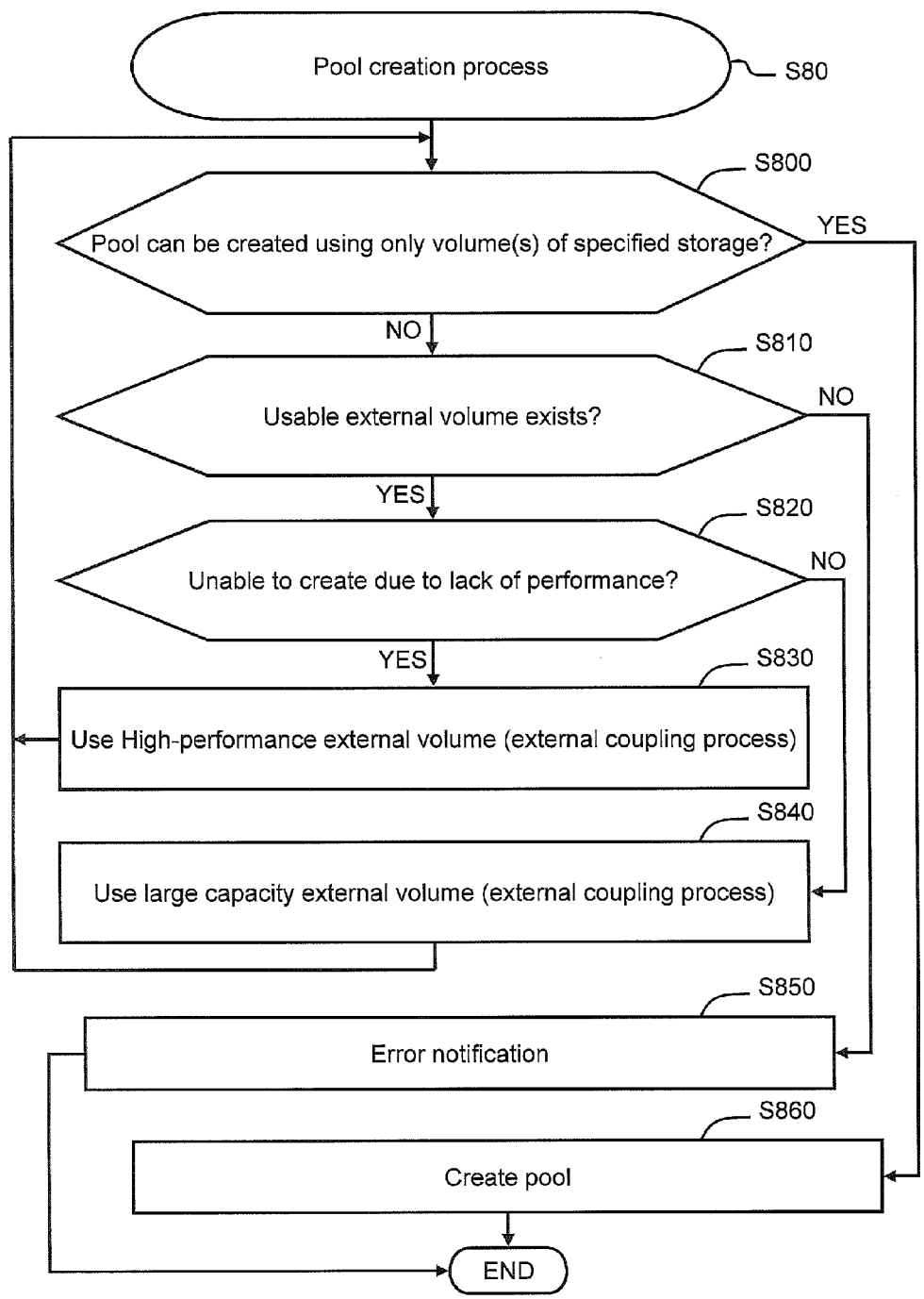
FIG. 44 is a flowchart showing a process for creating a pool.

FIG. 44 is a flowchart showing a pool creation process. The pool creation process (S80) is realized by the microprocessor 400 of the management server 40 executing the pool creation program P46. The pool creation process creates a pool based on the conditions specified using a create pool screen G40, which will be described further below using FIG. 45.

In this example, an explanation will be given using as an example a case in which the storage apparatus that should create the pool is specified by the user. In a case where the storage apparatus that is to create the pool is not specified, a check may be carried out as to whether it is possible to create a pool candidate, which satisfies the specified conditions in the respective storage apparatuses, and any one pool may be selected from among these pool candidates. That is, in a case where multiple storage apparatuses in a storage system are equal to each other and there is no master-subordinate relationship, it is possible to create a pool that satisfies the specified conditions in either of the storage apparatuses, and to register the volume of the other storage apparatus in this pool.

The criteria in a case where one pool is selected from the pool candidates in the respective storage apparatuses, for example, can include selecting a pool that most closely approximates the specified conditions (the pool comprising a capacity and performance that most closely approximates the specified capacity and performance), and selecting a pool in which internal volumes account for a large percentage the pool volume.

The management server 40 determines whether or not a pool that satisfies the specified conditions can be created using only the internal volume and the externally coupled volume of the storage apparatus specified by the user (S800).

In a case where it is possible to create the specified pool using only the resources of the specified storage apparatus (S800: YES), the management server 40 creates the specified pool, and ends this processing (S860). Furthermore, since the volume capacity and the like are discrete values, the specified conditions do not have to be met exactly.

In a case where it is not possible to create the specified pool using only the resources of the specified storage apparatus (S800: NO), the management server 40 determines whether an external volume capable of being coupled to the specified storage apparatus exists (S810). In a case where a usable external volume does not exist (S810: NO), that is, a case in which it is not possible to add more volumes to the specified storage apparatus, a pool cannot be created using the specified conditions. Therefore, the management server 40 issues an error message to the user and ends this processing (S850).

In a case where a usable external volume exists (S810: YES), the management server 40 determines whether or not the reason for the determination in S800 that a pool matching the specified condition could not be created was due to poor performance (S820).

In a case where the pool was unable to be created due to poor performance (S820: YES), the management server 40 couples a high-performance external volume from among the usable external volumes to the externally coupled volume of the specified storage apparatus (S830).

Using the process for estimating the performance of the externally coupled volume executed by the tier definition program P42, which was described using the second example, makes it possible to select an external volume comprising performance that matches the specified condition from among the unused external volumes.

The management server 40, after having coupled the high-performance external volume to the externally coupled volume, returns to S800 and determines whether it is possible to create a pool that satisfies the conditions specified by the user.

Alternatively, in a case where the reason a pool satisfying the specified conditions could not be created was not poor performance, but rather a shortage of capacity (S820: NO), the management server 40 selects an external volume with a large capacity from among the usable external volumes, and couples this large-capacity external volume to the externally coupled volume in the specified storage apparatus (S840). After creating a new large-capacity externally coupled volume in the specified storage apparatus, the management server 40 returns to S800.

FIG. 45 shows an example of a screen G40 for creating a pool. The create pool screen G40, for example, comprises an area GP41 for displaying a pool name, an area GP42 for specifying a pool type, an area GP43 for specifying a storage apparatus that will create the pool, an area GP44 for specifying the pool performance, and an area GP45 for specifying the pool capacity.

The user can configure a pool name at will. The types of pools include multitier, which validates an inter-tier page migration, and single tier, which does not perform a page migration. The pool creation-destination storage apparatus is specified by inputting the storage apparatus number. When "ANY" is inputted, a pool can be created in any storage apparatus in the system.

The pool performance, for example, is specified using the value of the IOPS. The configuration may be such that the IOPS may be specified as a specified numeric value, or may be specified as a value (for example, High, Middle, and so forth) denoting a preset performance ranking. Or, the pool performance can also be specified using the attributes of the pool volume (drive type, RAID level, and so forth).

After creating the pool, a screen for displaying the performance and capacity of the created pool and the configuration of the pool volume may be created, and presented to the user.

Configuring this example like this achieves the same effects as the first example and the second example. In addition, in this example, a pool that matches user-desired conditions can be created automatically, thereby enhancing usability.

Example 5

A fifth example will be explained by referring to FIGS. 46 through 50. In this example, pools being operated in respectively different storage apparatuses are managed by merging these pools in either one of the storage apparatuses. This makes it possible to manage the pools in an integrated fashion, and to efficiently use the storage resources in the storage system.

Figure 46:
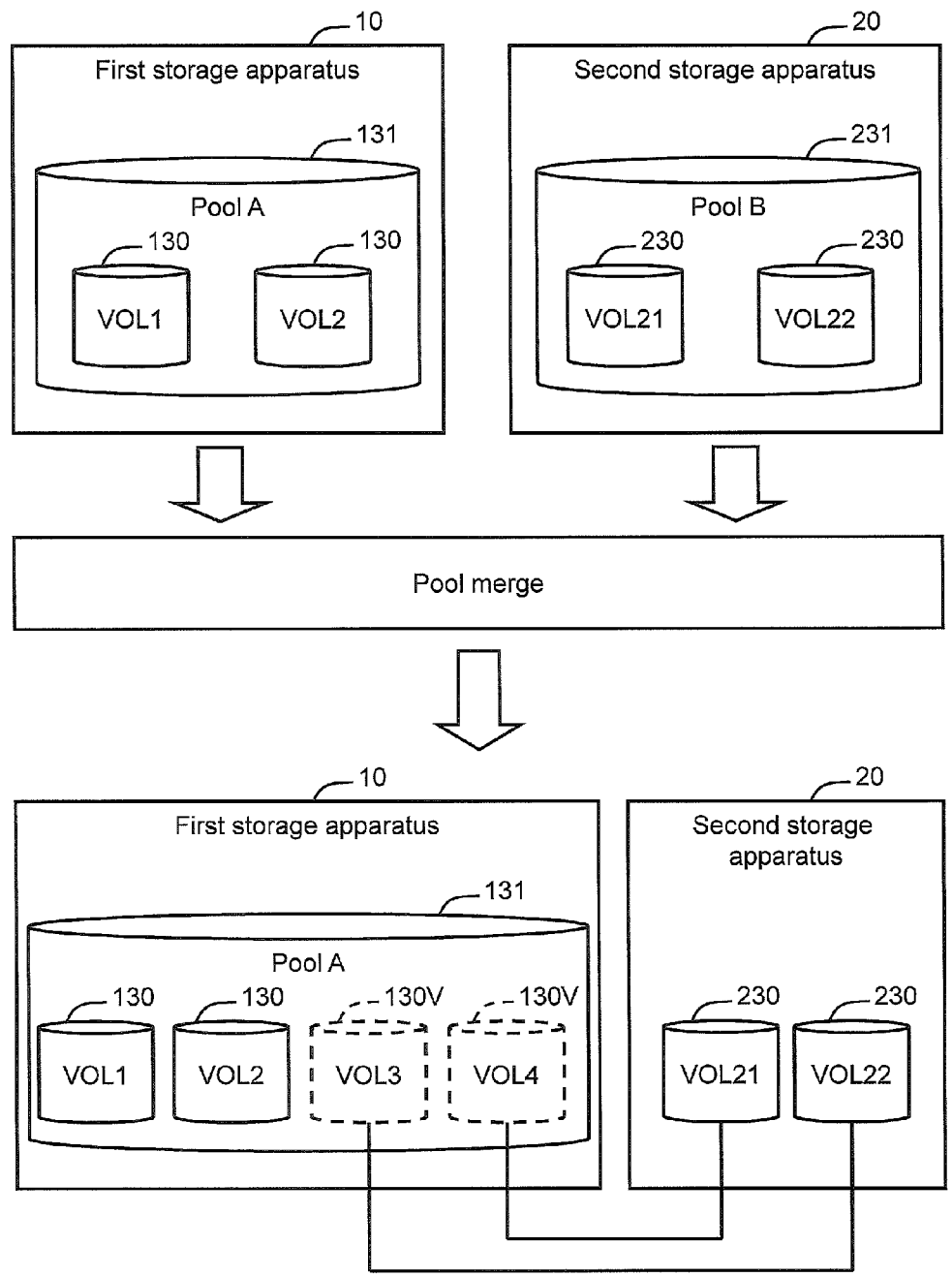
FIG. 46 is an illustration related to a fifth example showing how to merge multiple pools distributed among multiple storage apparatuses in any one pool.

FIG. 46 schematically shows the overall concept of this example. The first storage apparatus 10 comprises a first pool 131. The second storage apparatus 20 comprises a second pool 231. The first pool 131 and the second pool 231 are merged to form a new first pool 131 using a pool merge process (S90), which will be described further below. The pool volume of the merged second pool 231 is used as the pool volume of the first pool 131 using an external coupling function.

Figure 47:
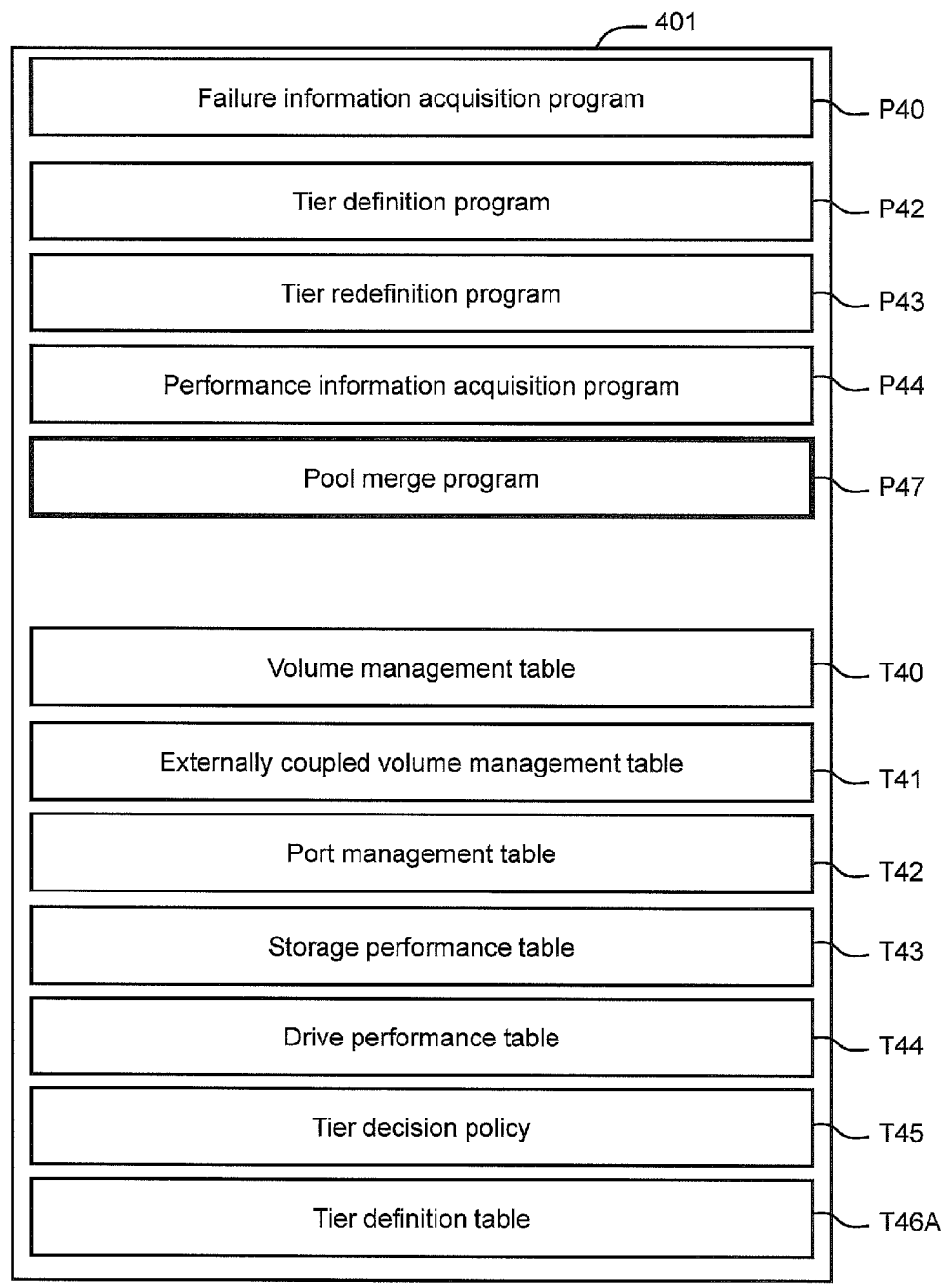
FIG. 47 is an illustration showing the contents of the memory of the management server.

FIG. 47 shows the storage contents of the memory 401 of the management server 40 related to this example. These storage contents differ from the storage contents (FIG. 43) of the memory of the fourth example in that a pool merge program P47 is provided instead of the pool creation program P46.

Figure 48:
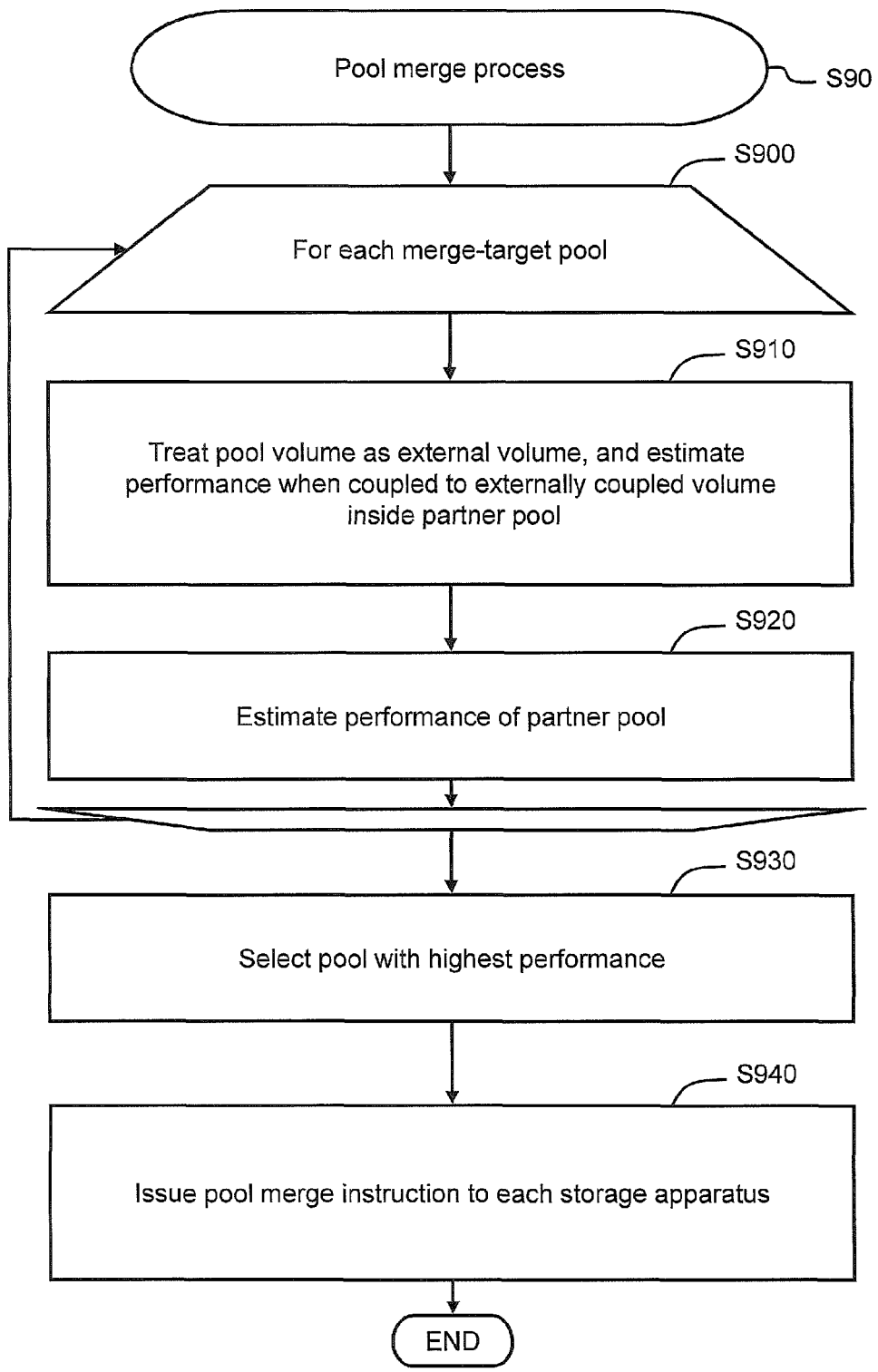
FIG. 48 is a flowchart of a process for merging multiple pools into a single pool.

FIG. 48 is a flowchart showing a pool merge process. The process for merging the pools (P90) is realized by the microprocessor 400 of the management server 40 executing the pool merge program P47.

The management server 40 carries out a process (S910) for assessing the performance of the externally coupled volume in a case where this volume has been merged with a partner pool, and a process (S920) for estimating the performance of the post-merge partner pool for each merge-target pool (S900).

First of all, the management server 40 estimates the performance of the externally coupled volume in a case where a volume in the target storage apparatus has been coupled to the externally coupled volume in the partner storage apparatus (S910). A description of the method for estimating the performance of the externally coupled volume was given using the second example, and as such will be omitted.

In an explanation using the example of FIG. 46, it will be assumed that the volumes 230 (VOL21, VOL22) of the second storage apparatus 20 are treated as external volumes that are coupled to externally coupled volumes 130V (VOL3, VOL4) in the first storage apparatus 10. The performance of the externally couple volumes 130V (VOL3, VOL 4) of the first storage apparatus 10 is predicted in this assumed configuration. Although omitted from the drawing, the same as hereinabove, it is assumed that the volumes 130 (VOL1, VOL2) in the first storage apparatus 10 are treated as external volumes that are coupled to the externally coupled volumes in the second storage apparatus 20. Then, the performance of the respective externally coupled volumes in this assumed second storage apparatus 20 is predicted.

Next, the management server 40 estimates the pool performance in a case where the externally coupled volumes for which the performance was predicted in S910 have been registered in the partner pool (S920). In the previous example, the performance of the first pool is predicted in a case where a volume 230 of the second storage apparatus 20 has been added to the first pool using the external coupling function. In a case where the target pool is the second pool of the second storage apparatus 20, the performance of the second pool is predicted in a case where a volume 130 of the first storage apparatus 10 has been added to the second pool using the external coupling function.

Furthermore, when predicting the pool performance, both the performance of the internal volume and the performance of the externally coupled volume are taken into account. For example, the performance of a pool comprising a 3000 IOPS internal volume, a 600 IOPS internal volume, a 900 IOPS externally coupled volume, and a 150 IOPS externally coupled volume would be the total value thereof, i.e. 4650 IOPS.

The management server 40 selects the pool, which will have the highest post-merge pool performance, as the pool to be kept (the merge-destination pool) (S930).

For example, it is assumed that the post-merge performance of the first pool 131 in a case where the second pool 231 has been merged with the first pool 131 is 4560 IOPS, and, alternatively, that the performance of the post-merge second pool 231 in a case where the first pool 131 has been merged with the second pool 231 is 4000 IOPS. In accordance with this, the management server 40 selects the first pool 131 as the merge-destination pool and merges the second pool 231 with the first pool 131.

Furthermore, the configuration may be such that the merge-destination pool is decided by taking into account the performance of the storage apparatus (for example, the cache capacity, and so forth) as well as the pool performance.

The management server 40 issues to each storage apparatus an instruction needed to merge the pool that was not selected with the selected pool, causing the pools to be merged (S940). That is, the management server 40 uses the external coupling function to couple a volume in the pool to be merged with an externally coupled volume in the merge-destination pool. In addition, the management server 40 can also convert a pool management table and a virtual volume management table and store these tables in the controller that will manage the merge-destination pool. This makes it possible for a virtual volume created based on the absorbed pool to also be used in the merge-destination pool.

Furthermore, the configuration may also be such that the result of the pool performance estimate is displayed in the select merged pool screen G50 as shown in FIG. 50 and selected by the user.

FIG. 49 shows the configuration of a tier definition table T46A related to this example. Compared to the table shown in FIG. 37, the tier definition table T46A of this example comprises a volume ID column C469, but the number of hops column C468 has been deleted. However, pool performance may be estimated by managing the number of hops in this example as well.

FIG. 50 shows the screen G50 for selecting the merge-destination pool. Information related to the merge-destination pool (the pool that will be kept following the merge), and information related to the merge-source pool (the pool that will disappear following the merge) are displayed in all combinations in the screen G50. This screen G50 is not limited to the items shown in FIG. 50, and user determination items may be increased by displaying the capacity of the storage apparatus cache memory and the like.

The user selects one desired combination from among the multiple combinations of merge-destination pools and merge-source pools, and operates the merge button. The management server 40 sends an instruction for realizing the user-desired pool merge to the respective storage apparatuses. In addition, the management server 40 updates the table(s) in which changes will occur pursuant to the pool merge of the respective tables.

Example 6

Figure 51:
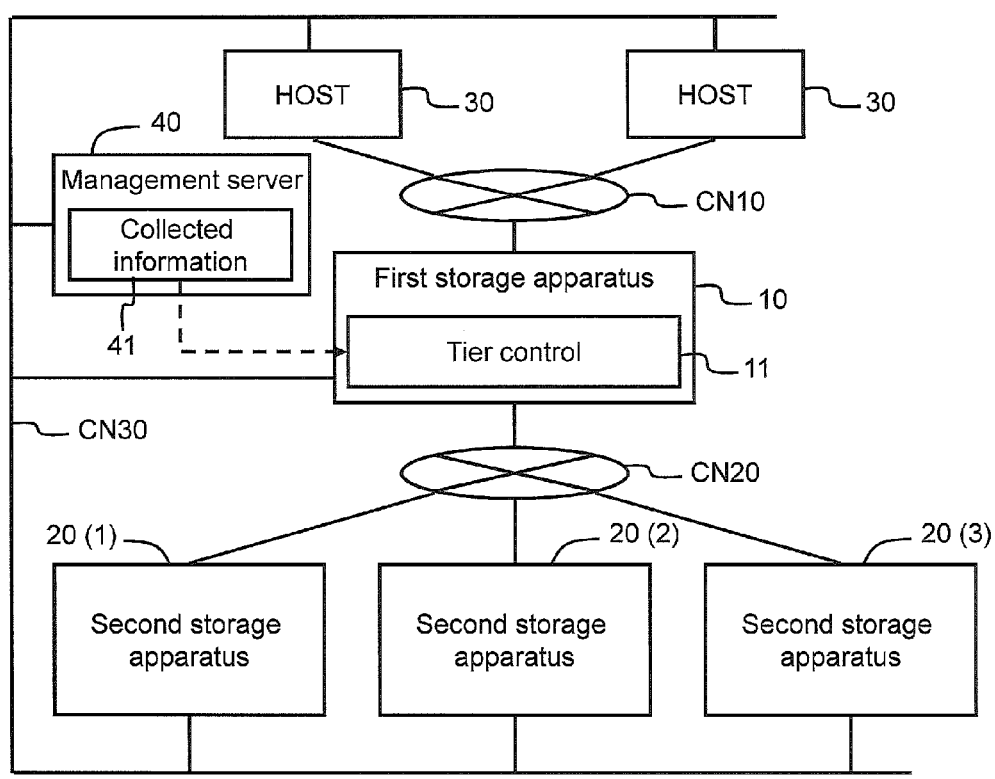
FIG. 51 is a diagram of an entire computer system comprising a storage system related to a sixth example.

FIG. 51 is a block diagram of the configuration of an entire computer system related to a sixth example. In this example, the management server 40 comprises a performance information acquisition function 41, and the first storage apparatus 10 comprises a tier control function 11.

The tier control function 11 of the first storage apparatus 10 decides the tier to which a pool volume should be allocated based on performance information obtained from the performance information acquisition function 41 of the management server 40, and controls a page migration between tiers.

Furthermore, the present invention is not limited to the embodiment explained hereinabove. A person with ordinary skill in the art will be able to make various additions and changes without departing from the scope of the present invention. For example, the third through the sixth examples can be combined with either the first or the second example, the third and the fourth examples can be combined, and each of the examples can be combined as needed. The third example can be combined with the fourth and the fifth examples. Combinations other than these stated combinations are also possible, and these combinations will also be included within the scope of the present invention.

In addition, this embodiment can also be expressed as a computer program (or a medium for recording a computer program) as described below.

"A computer program for causing a computer to function as a first storage control apparatus, which is communicatably coupled via a communication path to at least one second storage control apparatus, the computer program causing the computer to respectively realize:

a function for creating a pool, which is divided into multiple different tiers, and which has at least one pool volume disposed in each tier;

a function for creating and controlling a virtual volume based on the pool;

a command processing function for processing a command with respect to the virtual volume;

an information acquisition function for acquiring prescribed performance information related to the performance of the pool volume; and a tier control function for deciding which of the respective tiers to associate the pool volume with based on the acquired prescribed performance information."

REFERENCE SIGNS LIST

1, 10 First storage apparatus
2, 20 Second storage apparatus
3, 30 Host computer
4, 40 Management server
1A, 5, 50 Switch
60 Relay storage apparatus
133 Virtual volume
1B, 131 Pool
1K, 132 Tier
1H, 130 Internal volume
1J, 130V Externally coupled volume
2A, 230 External volume

The invention claimed is:

1. A first storage control apparatus, which is communicatably coupled via a communication path to at least one second storage control apparatus, the first storage control apparatus comprising:

a pool, which is divided into multiple different tiers, and which has at least one pool volume disposed in each of the tiers;

a virtual volume, which is created based on the pool;

a command processing part configured to process a command with respect to the virtual volume;

an information acquisition part configured to acquire prescribed performance information related to performance of the pool volume; and a tier control part configured to decide which of the tiers the pool volume is associated with, based on the acquired prescribed performance information, wherein at least one pool volume of the respective pool volumes is associated with a logical volume in the at least one second storage control apparatus via the communication path, the command processing part is configured to convert, from among commands to the virtual volume, a command corresponding to a logical volume in the at least one second storage control apparatus to a command for use in the at least one second storage control apparatus, and to send this converted command to the at least one second storage control apparatus, and the information acquisition part is configured to acquire, as the prescribed performance information, information related to the logical volume in the at least one second storage control apparatus and information related to the performance of the at least one second storage control apparatus.

2. A first storage control apparatus according to claim 1, wherein the tier control part is configured to decide to which tier of the respective tiers in the pool the logical volume of the at least one second storage control apparatus should belong, based on the prescribed performance information and a preset policy.

3. A first storage control apparatus according to claim 2, wherein the tier control part, in a case where unknown information is included in the prescribed performance information, comprises an inference part configured to infer the unknown information.

4. A first storage control apparatus according to claim 3, wherein the inference part is configured to send a read command prepared for testing purposes to the at least one second storage control apparatus, and to infer the unknown information based on a response time of the at least one second storage control apparatus.

5. A first storage control apparatus according to claim 3, wherein the tier control part, either in a case where there is unknown information or in a case where the unknown information cannot be inferred, is configured to cause the pool volume associated with the logical volume of the at least one second storage control apparatus to belong to the tier with the lowest performance of the respective tiers.

6. A first storage control apparatus according to claim 1, further comprising a data migration part configured to migrate data stored in the virtual volume between the tiers, wherein
a virtual data storage area, to which data has been written from among virtual data storage areas in the virtual volume, is associated with a real storage area of the pool volume in any tier of the respective tiers, and
the data migration part is configured to change the real storage area associated with the virtual data storage area between the tiers in accordance with a utilization status of the virtual data storage area.

7. A first storage control apparatus according to claim 6, wherein the data migration part, in a case where the association-destination of the virtual data storage area changes from a migration-source real storage area to a migration-destination real storage area in a higher level tier, is configured to compare the performance of a migration-source pool volume in which the migration-source real storage area exists with the performance of a migration-destination pool volume in which the migration-destination real storage area exists, and
in a case where the migration-destination pool volume is determined to have higher performance than the migration-source pool volume, the data migration part is configured to change the association-destination of the virtual data storage area from the migration-source storage area to the migration-destination storage area.

8. A first storage control apparatus according to claim 1, wherein the tier control part is configured to monitor a drop in performance in each of the pool volumes, and to
exercise control such that a pool volume, in which a performance drop has been detected, from among the respective pool volumes is either made to belong to the tier having the lowest performance of the respective tiers, or is not used as a data migration-destination pool volume.

9. A first storage control apparatus according to claim 8, wherein the tier control part, in a case where the drop in performance of the pool volume has been eliminated, is configured to exercise control so as to return the pool volume to an original tier from the lowest performance tier.

10. A first storage control apparatus according to claim 1, wherein the prescribed performance information is information needed for using a policy created beforehand for deciding with which of the respective tiers the pool volume is to be associated.

11. A first storage control apparatus according to claim 10, wherein the information acquisition part is configured to acquire, as the prescribed performance information, information denoting the type of storage device that provides a physical storage area to the pool volume and information denoting a configuration of a RAID (Redundant Arrays of Inexpensive Disks) group including the storage device.

12. A first storage control apparatus according to claim 10, wherein the information acquisition part, in a case where the pool volume is associated with the logical volume in the at least one second storage control apparatus, is configured to acquire a status of the communication path as the prescribed performance information.

13. A first storage control apparatus according to claim 1, further comprising a management apparatus, which is coupled to the first storage control apparatus and the at least one second storage control apparatus,
wherein the information acquisition part and the tier control part are provided in the management apparatus.

14. A management method for managing, by a management apparatus, a storage system in which a first storage control apparatus and a second storage control apparatus are coupled via a communication path, wherein
the first storage control apparatus has:
a pool, which is divided into multiple different tiers, and which has at least one pool volume disposed in each of the tiers;
a virtual volume, which is created based on the pool; and
a first control part for controlling the pool and the virtual volume,
wherein at least one pool volume is associated via the communication path with a logical volume in the second storage control apparatus,
the storage system control method comprising, in managing of the management apparatus:
acquiring, as prescribed performance information related to the pool volume, information related to the logical volume in the second storage control apparatus and information related to the performance of the second storage control apparatus;
deciding with which of the respective tiers the pool volume, which is associated with the logical volume in the second storage control apparatus is to associate, based on the acquired prescribed performance information and a preset policy;
sending a read command for prepared testing purposes to the second storage control apparatus in a case where unknown information is included in the prescribed performance information, and inferring the unknown information based on a response time of the second storage control apparatus; and
in a case where the unknown information cannot be inferred, causing the pool volume associated with logical volume in the second storage control apparatus to belong to the tier having the lowest performance of the respective tiers.

* * * * *